United States Patent
Owen et al.

(10) Patent No.: US 12,514,853 B2
(45) Date of Patent: Jan. 6, 2026

(54) THERAPEUTIC DENDRIMER

(71) Applicant: Starpharma Pty Ltd, Abbotsford (AU)

(72) Inventors: David James Owen, Abbortsford (AU); Brian Devlin Kelly, Abbotsford (AU); Christine Elisabet Dietinger, Abbotsford (AU)

(73) Assignee: STARPHARMA PTY LTD., Abbotsford (AU)

( * ) Notice: Subject to any disclaimer, the term of this patent is extended or adjusted under 35 U.S.C. 154(b) by 1194 days.

(21) Appl. No.: 17/295,378

(22) PCT Filed: Nov. 20, 2019

(86) PCT No.: PCT/AU2019/051274
§ 371 (c)(1),
(2) Date: May 19, 2021

(87) PCT Pub. No.: WO2020/102852
PCT Pub. Date: May 28, 2020

(65) Prior Publication Data
US 2022/0023290 A1    Jan. 27, 2022

(30) Foreign Application Priority Data

Nov. 20, 2018 (AU) ................................ 2018904431
May 20, 2019 (AU) ................................ 2019901708
Sep. 10, 2019 (AU) ................................ 2019903358

(51) Int. Cl.
| | | |
|---|---|---|
| A61K 31/4745 | (2006.01) | |
| A61K 31/502 | (2006.01) | |
| A61K 39/395 | (2006.01) | |
| A61K 47/59 | (2017.01) | |
| A61K 47/60 | (2017.01) | |
| A61P 35/00 | (2006.01) | |
| C07D 491/22 | (2006.01) | |

(52) U.S. Cl.
CPC ........ *A61K 31/4745* (2013.01); *A61K 31/502* (2013.01); *A61K 39/3955* (2013.01); *A61K 47/595* (2017.08); *A61P 35/00* (2018.01); *C07D 491/22* (2013.01)

(58) Field of Classification Search
CPC .......... A61K 2039/505; A61K 2300/00; A61K 31/4745; A61K 31/502; A61K 39/3955; A61K 47/595; A61K 47/60; A61K 47/645; A61K 47/641; A61P 35/00; C07D 491/22; C07K 16/2818; C07K 16/2863; C07K 16/2803; C07K 16/2827
See application file for complete search history.

(56) References Cited

U.S. PATENT DOCUMENTS

2018/0326081 A1    11/2018    Owen et al.

FOREIGN PATENT DOCUMENTS

| WO | 2007/048190 A1 | 5/2007 |
|---|---|---|
| WO | 2008/034120 A2 | 3/2008 |
| WO | 2012/167309 A1 | 12/2012 |
| WO | 2015/184510 A1 | 12/2015 |
| WO | 2017/156183 A1 | 9/2017 |
| WO | 2020/014750 A1 | 1/2020 |
| WO | 2020/107078 A1 | 6/2020 |
| WO | 2021/056077 A1 | 4/2021 |

OTHER PUBLICATIONS

International Search Report and Written Opinion for Application No. PCT/AU2019/051274, dated Jan. 28, 2020, 13 pages.
England et al., Tumour regression and improved gastrointestinal tolerability from controlled release of SN-38 from novel polyoxazoline-modified dendrimers. J Control Release. Feb. 10, 2017;247:73-85.
Fox et al., Synthesis and in vivo antitumor efficacy of PEGylated poly(l-lysine) dendrimer-camptothecin conjugates. Mol Pharm. Sep.-Oct. 2009;6(5):1562-72.
Goldberg et al., G3.5 PAMAM dendrimers enhance transepithelial transport of SN38 while minimizing gastrointestinal toxicity. J Control Release. Mar. 30, 2011;150(3):318-25.
Hirotsu et al., Dendrimer. Drug Delivery System. Sep. 25, 2017;32(4):341-342.
Mehta et al., Reducing Dendrimer Generation and PEG Chain Length Increases Drug Release and Promotes Anticancer Activity of PEGylated Polylysine Dendrimers Conjugated with Doxorubicin via a Cathepsin-Cleavable Peptide Linker. Mol Pharm. Oct. 1, 2018;15(10):4568-4576.
Vijayalakshmi et al., Carboxyl-terminated PAMAM-SN38 conjugates: synthesis, characterization, and in vitro evaluation. Bioconjug Chem. Oct. 20, 2010;21(10):1804-10.
Zhao et al., Novel prodrugs of SN38 using multiarm poly(ethylene glycol) linkers. Bioconjug Chem. Apr. 2008;19(4):849-59.
Zhou et al., Molecularly precise dendrimer-drug conjugates with tunable drug release for cancer therapy. Angew Chem Int Ed Engl. Oct. 6, 2014;53(41):10949-55.

*Primary Examiner* — Sun Jae Yoo
(74) *Attorney, Agent, or Firm* — McCarter & English, LLP

(57) ABSTRACT

Provided herein are dendrimers comprising: a core unit, five generations of building units which are lysine residues or analogues thereof, first terminal groups comprising a residue of a camptothecin active covalently attached to a diglycolyl linker group, and second terminal groups comprising a PEG group. Also provided herein are pharmaceutical compositions comprising the dendrimer, and methods and uses of the dendrimers in therapy of disorders such as cancers. Processes for making the dendrimers and intermediates are also provided.

22 Claims, 10 Drawing Sheets

THERAPEUTIC DENDRIMER

RELATED APPLICATIONS

This Application is a U.S. national stage application filed under 35 USC 371 based on International Patent Application No. PCT/AU2019/051274, filed on Nov. 20, 2019, which claims priority to Australian Patent Application No. 2018904431, filed on Nov. 20, 2018, Australian Patent Application No. 2019901708, filed on May 20, 2019, and Australian Patent Application No. 2019903358, filed on Sep. 10, 2019, the entire contents of each of these applications are incorporated herein by reference in their entirety.

FIELD

The present disclosure generally relates to the delivery of camptothecin active agents, by means of drug-dendrimer conjugates. The dendrimers include a core and building units, and the outermost generation of building units including a camptothecin active attached via a cleavable linker group. The present disclosure also relates to pharmaceutical compositions and methods of treatment comprising the drug-dendrimer conjugates, and to processes and synthetic intermediates for producing the drug-dendrimer conjugates.

BACKGROUND

Formulating a pharmaceutically active agent for delivery to its intended site of action can pose a number of significant challenges, associated with issues such as poor aqueous solubility, low bioavailability, instability under biological conditions, rapid in vivo degradation, lack of efficacy, lack of targeting to the site of action, and toxicity.

A number of approaches have been developed to try and address such issues, including the use of complex formulations aimed to improve bioavailability and/or control release of the active agent in vivo, e.g., involving the use of solubilising excipients, polymeric matrices or encapsulation in liposomes or micelles. However, controlling the release of the pharmaceutically active agent can remain problematic. In some cases, the carrier degrades rapidly, releasing the pharmaceutically active agent before it has reached the target organ. In other cases, the release of the pharmaceutically active agent from the carrier is slowed to the extent that a therapeutic dose of drug in the body or in the target organ may not be attained. Further, such compositions may present stability and manufacturing challenges.

Oncology agents are an important class of pharmaceuticals, and there have been significant advances in the treatment of cancer in recent decades. However, a number of oncology agents are associated with severe side effects due to their cytotoxic properties, providing a narrow therapeutic window, and limiting the dosage regimen that can be used and potentially also limiting the efficacy of the treatment.

One class of oncology drugs are camptothecins. Camptothecin and structurally related compounds such as SN-38 are topoisomerase 1 inhibitors. However, a known issue with SN-38 is that, whilst the compound has high topoisomerase 1 inhibitory activity, formulation is hampered by poor aqueous solubility, and clinical use would be limited by high toxicity and rapid clearance. Irinotecan is a prodrug, containing a dipiperidylcarbamate group at the C-10 position, and when used in vivo, irinotecan is metabolised in the liver and plasma to release the active compound SN-38. Irinotecan has been approved for clinical use as a therapy for treatment of several cancers. Irinotecan has shown activity in leukemia, lymphoma, colorectal, lung, ovarian, cervical, pancreatic, stomach, and breast cancers. However, irinotecan still has rapid clearance and significant side effects, most notably gastrointestinal toxicities, causing diarrhoea, vomiting, abdominal pain, anorexia, and haematological toxicities such as neutropenia, leukopenia, and thrombocytopenia. Marketed irinotecan carries a black box warning for diarrhoea and myelosuppression. In addition, irinotecan is metabolised in the liver to the active metabolite SN-38 by carboxylesterases, and then glucuronidated to the inactive SN-38G, however, the conversion and enzyme activity is highly variable amongst patients. Another issue with camptothecins is the hydrolysis of the lactone ring at pH >6 to the inactive carboxylate form which reduces its efficacy.

Research has also been carried out into identifying improved formulations of irinotecan, in order to further address some of the shortcomings of that active agent. For example, Onivyde® is an injectable liposomal irinotecan product containing liposomes of approximately 110 nm diameter dispersed in a formulation buffer, which is critical to control lipid degradation. This liposomal formulation also carries a black box warning for neutropenia and severe diarrhoea.

Many solubilisation strategies have also been applied to attempt to overcome these issues. For example, conjugation to polyethylene glycol) by Nektar (NKTR-102) (which failed its phase 3 study in metastatic breast cancer), Enzon (EZN2208) and Prolynx (PL038) (PEG) provides a relatively aqueous-soluble conjugate. Another approach is the use of small micelles or liposomes such as NK-012 (Nippon Kayaku), SN2310 emulsion (Ocogenex), and Irinophore (Champions Oncology), with and without conjugation to a lipophilic carrier. Other approaches have been SN-38 triblock co-polymers (Mahidol University, Thailand), a DSPC/cholesterol nanoparticle, Hyaluranon-Ironotecan (Alchemia, failed its phase 3 study in colorectal cancer), CRLX101, a cyclodextrin-conjugated CPT-11 (Cerulean) and poly-1-hydroxymethylethylene hydroxymethyl-formalXMT1001 (Mersana) which failed in multiple phase 2 studies. These approaches have largely been unsuccessful in the clinic due to lack of efficacy or grade 3 and 4 neutropenia.

PAMAM-SN-38 dendrimers have been studied in vitro for oral delivery (Goldberg et al, J Control Release, 2011, 150(3), p 318-325). England et al (J Control Release, 2017, 247, p 73-85) generated dendrimers conjugated via random sites on the dendrimer to the C10-position of SN-38, and only with about 8% drug loading. Fox et al (Mol. Pharm., 2009, 6(5), p 1562-1572) describe irinotecan conjugated via carboxylate on glycine or alanine to an aspartic or glutamic acid surface dendrimer with 4-6% irinotecan loading.

There remains a need for alternative and/or improved oncology therapies which provide effective means of delivering prolonged efficacious levels of active pharmaceutical agents, with low levels of side effects and good therapeutic window. There is also a need for therapies which provide for consistent and controlled release of therapeutic agent. Such therapies may lead to better patient outcomes and better patient compliance.

There also remains a need to provide medicines in a controlled and consistent manner, under practical manufacturing conditions, in order to provide good yields of active ingredient, with well-understood and reproducible properties.

SUMMARY

The subject matter of the present disclosure is predicated in part on the surprising discovery that camptothecin actives, such as SN-38, when conjugated to a dendrimer, result in drug-dendrimer conjugates that provide improved efficacy and/or pharmacokinetic properties of the drug.

Accordingly, in a first aspect there is provided a dendrimer comprising:

i) a core unit (C); and ii) building units (BU), each building unit being a lysine residue or an analogue thereof;

wherein the core unit is covalently attached to two building units via amide linkages, each amide linkage being formed between a nitrogen atom present in the core unit and the carbon atom of an acyl group present in a building unit;

the dendrimer being a five generation building unit dendrimer;

wherein building units of different generations are covalently attached to one another via amide linkages formed between a nitrogen atom present in one building unit and the carbon atom of an acyl group present in another building unit;

the dendrimer further comprising:

iii) a plurality of first terminal groups (T1) comprising a residue of a camptothecin active covalently attached to a diacyl linker group of formula

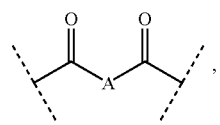

wherein A is a $C_2$-$C_{10}$ alkylene group which is optionally interrupted by O, S, NH, or N(Me), or in which A is a heterocycle selected from the group consisting of tetrahydrofuran, tetrahydrothiophene, pyrrolidine and N-methylpyrrolidine; and iv) a plurality of second terminal groups (T2) comprising a PEG or PEOX group;

wherein at least one half of the outer building units have one nitrogen atom covalently attached to a first terminal group and have one nitrogen atom covalently attached to a second terminal group;

or a pharmaceutically acceptable salt thereof.

In some embodiments, the core unit is formed from a core unit precursor comprising two amino groups.

In some embodiments, the core unit is:

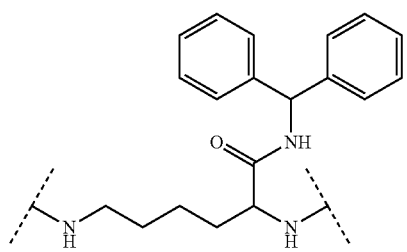

In some embodiments, the building units are each:

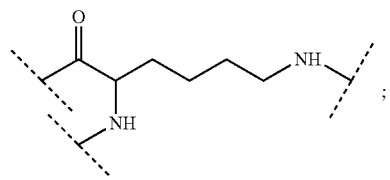

wherein the acyl group of each building unit provides a covalent attachment point for attachment to the core or to a previous generation building unit; and wherein each nitrogen atom provides a covalent attachment point for covalent attachment to a subsequent generation building unit, a first terminal group or a second terminal group.

In some embodiments, the building units are each:

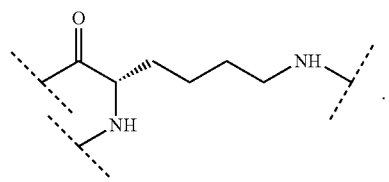

In some embodiments, the dendrimer has five complete generations of building units.

In some embodiments, the diacyl linker is selected from the group consisting of

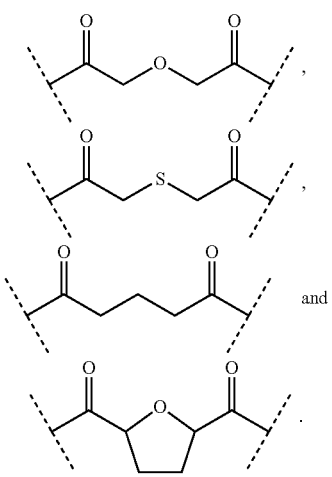

and

In some embodiments, the diacyl linker is

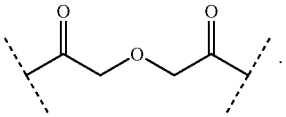

In some embodiments, the residue of a camptothecin active is a residue of SN-38 which is attached to the diacyl linker through the C-10 or C-20 position.

In some embodiments, the residue of SN-38 is

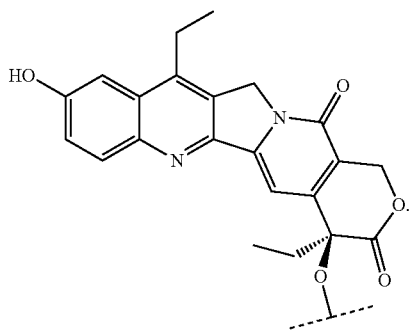

In some embodiments, the residue of a camptothecin active has the substructure:

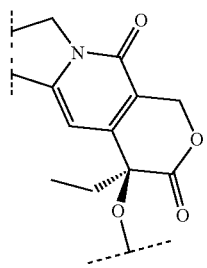

and is covalently attached to the diacyl linker group via the oxygen atom present on the lactone ring; and wherein the diacyl linker is

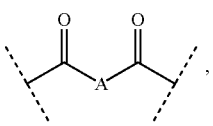

wherein A is a $C_2$-$C_{10}$ alkylene group which is interrupted by O, S, NH, or N(Me), or in which A is a heterocycle selected from the group consisting of tetrahydrofuran, tetrahydrothiophene, pyrrolidine and N-methylpyrolidine.

In some embodiments, each first terminal group (T1) is:

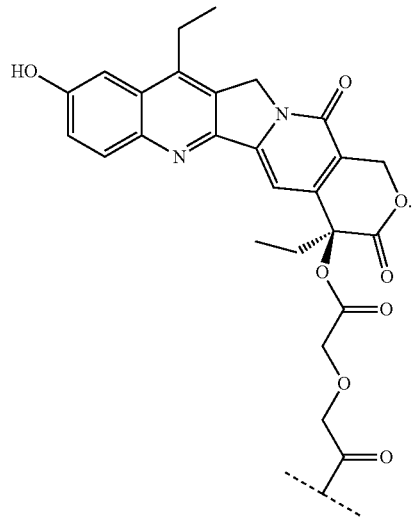

In some embodiments, the residue of a camptothecin active has the substructure:

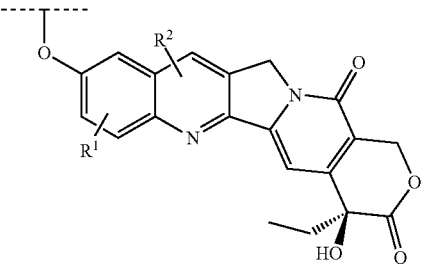

in which
R$^1$ is selected from the group consisting of hydrogen, $C_{1-6}$ alkyl, —OR$^3$, and —$C_{1-6}$ alkyl-N(R$^3$)$_2$;
R$^2$ is selected from the group consisting of hydrogen, $C_{1-6}$ alkyl, —OR$^3$, and —$C_{1-6}$ alkyl-N(R$^3$)$_2$;
each R$^3$ is independently selected from hydrogen and $C_{1-6}$ alkyl;
wherein the residue of a camptothecin active is covalently attached to the diacyl linker group via the oxygen atom present on the phenyl ring; and wherein the diacyl linker is

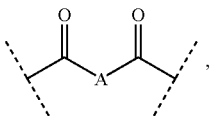

wherein A is a $C_2$-$C_{10}$ alkylene group.

In some embodiments, the second terminal groups comprise PEG groups having an average molecular weight of at least 750 Daltons.

In some embodiments, the second terminal groups comprise PEG groups having an average molecular weight in the range of from 1500 to 2500 Daltons.

In some embodiments, the second terminal groups comprise PEG groups having an average molecular weight in the range of from 1800 to 2200 Daltons.

In some embodiments, the PEG group is a methoxy-terminated PEG.

In some embodiments, the dendrimer has from 28 to 32 surface units, the surface units comprising an outer building unit attached to a first terminal group and attached to a second terminal group.

In some embodiments, at least 40% of the nitrogen atoms present in the outer building units are each covalently attached to a first terminal group; and at least 40% of the nitrogen atoms present in the outer building units are each covalently attached to a second terminal group.

In some embodiments, the five generations of building units are complete generations, and wherein the outer generation of building units provides 64 nitrogen atoms for covalent attachment to a first terminal group or a second terminal, wherein from 28 to 32 first terminal groups are covalently attached to one of said nitrogen atoms, and wherein from 28 to 32 second terminal groups are each covalently attached to one of said nitrogen atoms.

In some embodiments, no more than one fifth of the nitrogen atoms present in said outer generation of building units are unsubstituted.

In some embodiments, the dendrimer is any of the Example dendrimers.

In some embodiments, the % release of camptothecin active from the dendrimer in PBS at pH 7.4 and at 37° C. following incubation for 6 hours is in the range of from 10 to 50%.

In some embodiments, the dendrimer is in combination with a further active.

In some embodiments, the further active is an immunotherapy agent.

In some embodiments, the further active is a PD-1 or PD-L1 inhibitor.

In some embodiments, the immunotherapy agent is selected from the group consisting of pembrolizumab, nivolumab, atezolizumab, avelumab, durvalumab, and cemiplimab.

In some embodiments, the immunotherapy agent is pembrolizumab.

In some embodiments, the further active is a PARP inhibitor.

In some embodiments, the PARP inhibitor is olaparib.

In some embodiments, the further active is an EGFR inhibitor.

In some embodiments, the EGFR inhibitor is an EGFR antibody.

In some embodiments, the EGFR antibody is cetuximab.

In a further aspect, there is provided a composition comprising a plurality of dendrimers or pharmaceutically acceptable salts thereof,
wherein the dendrimers are as defined herein,
the mean number of first terminal groups per dendrimer in the composition is in the range of from 24 to 32, and
the mean number of second terminal groups per dendrimer in the composition is in the range of from 24 to 32.

In some embodiments, the mean number of first terminal groups per dendrimer is in the range of from 28 to 32 and/or the mean number of second terminal groups per dendrimer is in the range of from 28 to 32.

In some embodiments, the composition is a pharmaceutical composition, and wherein the composition comprises a pharmaceutically acceptable excipient.

In some embodiments, the dendrimer or pharmaceutical composition is for use in the treatment of cancer.

In a further aspect, there is provided a method of treating cancer comprising administering to a subject in need thereof a therapeutically effective amount of a dendrimer as described herein or a pharmaceutical composition as described herein.

In a further aspect, there is provided use of a dendrimer as described herein or of a composition as described herein, in the manufacture of a medicament for the treatment of cancer.

In some embodiments, the cancer is selected from the group consisting of colorectal cancer, pancreatic cancer, breast cancer, ovarian cancer, prostate cancer, lung cancer and cervical cancer.

In some embodiments, the therapeutically effective amount of the dendrimer is in the range of from 2 to 50 mg/m$^2$ body surface area.

In some embodiments, the dendrimer is administered in combination with a further anti-cancer drug.

In some embodiments, the further anti-cancer drug is an immunotherapy agent.

In some embodiments, the immunotherapy agent is a PD-1 or PD-L1 inhibitor.

In some embodiments, the immunotherapy agent is selected from the group consisting of pembrolizumab, nivolumab, atezolizumab, avelumab, durvalumab, and cemiplimab.

In some embodiments, the immunotherapy agent is pembrolizumab.

In some embodiments, the further anti-cancer drug is a PARP inhibitor.

In some embodiments, the further anti-cancer drug is olaparib.

In some embodiments, the further anti-cancer drug is an EGFR inhibitor.

In some embodiments, the EGFR inhibitor is an EGFR antibody.

In some embodiments, the EGFR antibody is cetuximab.

In some embodiments, the dendrimer is any of the Example dendrimers.

In some embodiments, administration of the dendrimer provides at least 2 times the therapeutic drug exposure (AUC) of camptothecin active, in comparison to the direct administration of an equivalent dose of free camptothecin active.

In some embodiments, administration of the dendrimer provides enhanced clinical efficacy in comparison to administration of an equivalent dose of free camptothecin active.

In some embodiments, administration of the dendrimer provides a reduced incidence of a side effect in comparison to administration of an equivalent dose of free camptothecin active.

In a further aspect, there is provided a process for producing a dendrimer as described herein, comprising:

a)

a1) reacting a camptothecin active intermediate which is:

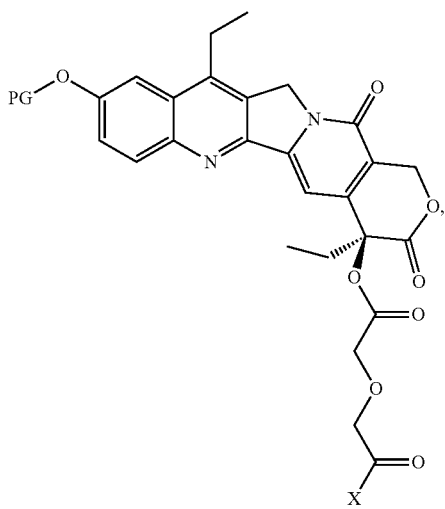

wherein X is —OH or a leaving group, or wherein X together with the C(O) group to which it is attached forms a carboxylate salt; and wherein PG is a protecting group;

with a dendrimeric intermediate which comprises:
i) a core unit (C); and
ii) building units (BU), each building unit being a lysine residue or an analogue thereof;
wherein the core unit is covalently attached to two building units via amide linkages, each amide linkage being formed between a nitrogen atom present in the core unit and the carbon atom of an acyl group present in a building unit;

the dendrimer being a five generation building unit dendrimer;

wherein building units of different generations are covalently attached to one another via amide linkages formed between a nitrogen atom present in one building unit and the carbon atom of an acyl group present in another building unit;

the dendrimer further comprising:
a plurality of second terminal groups (T2) each comprising a PEG or PEOX group;
wherein at least one half of the outer building units have one nitrogen atom covalently attached to a second terminal group, and have one unsubstituted nitrogen atom available for reaction with the first intermediate;

or a salt thereof;

under amide coupling conditions; and a2) subjecting the product of step a1) to deprotection conditions to remove protecting group PG.

or b)

b1) reacting a surface unit intermediate which is:

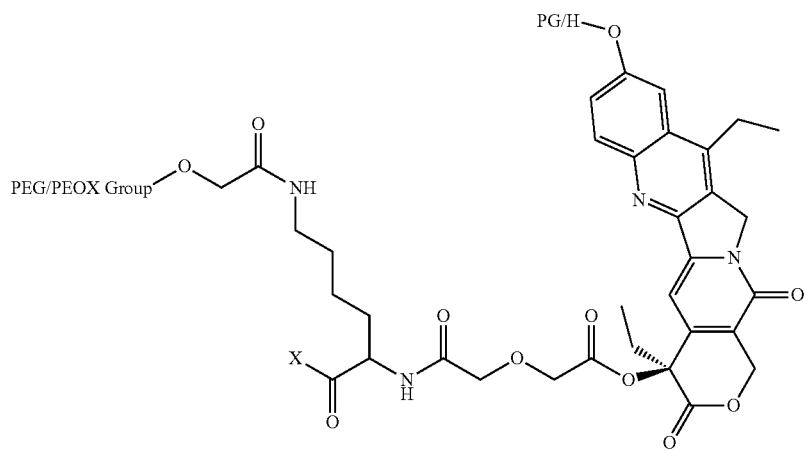

wherein PEG Group is a PEG-containing group, PEOX is a PEOX-containing group;
X is —OH or a leaving group, or wherein X together with the C(O) group to which it is attached forms a carboxylate salt; and wherein PG is a protecting group;

with a dendrimeric intermediate comprising:
i) a core unit (C); and
ii) building units (BU), each building unit being a lysine residue or an analogue thereof;
wherein the core unit is covalently attached to two building units via amide linkages, each amide linkage being formed between a nitrogen atom present in the core unit and the carbon atom of an acyl group present in a building unit;

the dendrimeric intermediate being a four generation building unit dendrimeric intermediate;

wherein building units of different generations are covalently attached to one another via amide linkages formed between a nitrogen atom present in one building unit and the carbon atom of an acyl group present in another building unit;

and wherein nitrogen atoms present in the outer building units of the dendrimeric intermediate are unsubstituted;

or a salt thereof;

under amide coupling conditions; and b2) where the surface unit intermediate comprises a protecting group PG, subjecting the product of step b1) to deprotection conditions to remove PG.

In a further aspect, there is provided an intermediate for producing a dendrimer which is

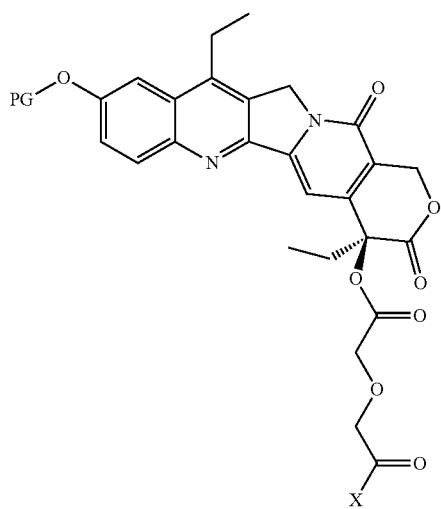

wherein X is —OH or a leaving group, or wherein X together with the C(O) group to which it is attached forms a carboxylate salt; and wherein PG is a protecting group.

In a further aspect, there is provided an intermediate for producing a dendrimer which is wherein PEG Group is a PEG-containing group, PEOX is a PEOX-containing group;

X is —OH or a leaving group, or wherein X together with the C(O) group to which it is attached forms a carboxylate salt; and wherein PG is a protecting group.

It will be appreciated that further aspects, embodiments, and examples, are described herein, which may include one or more of the embodiments or features as described above.

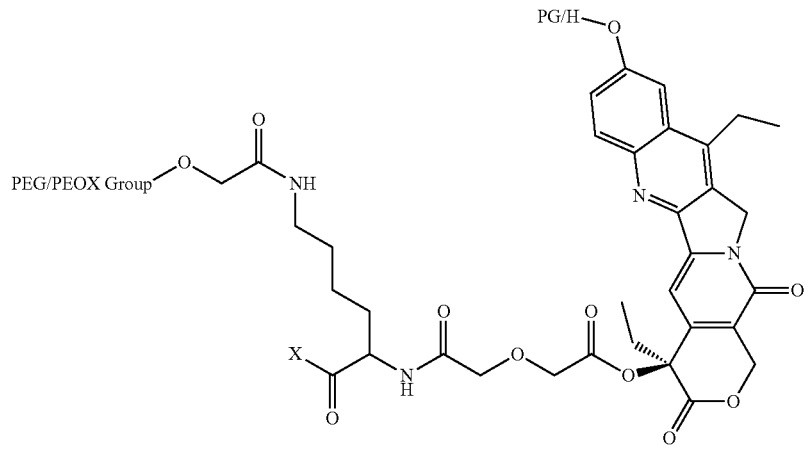

Figure 14:
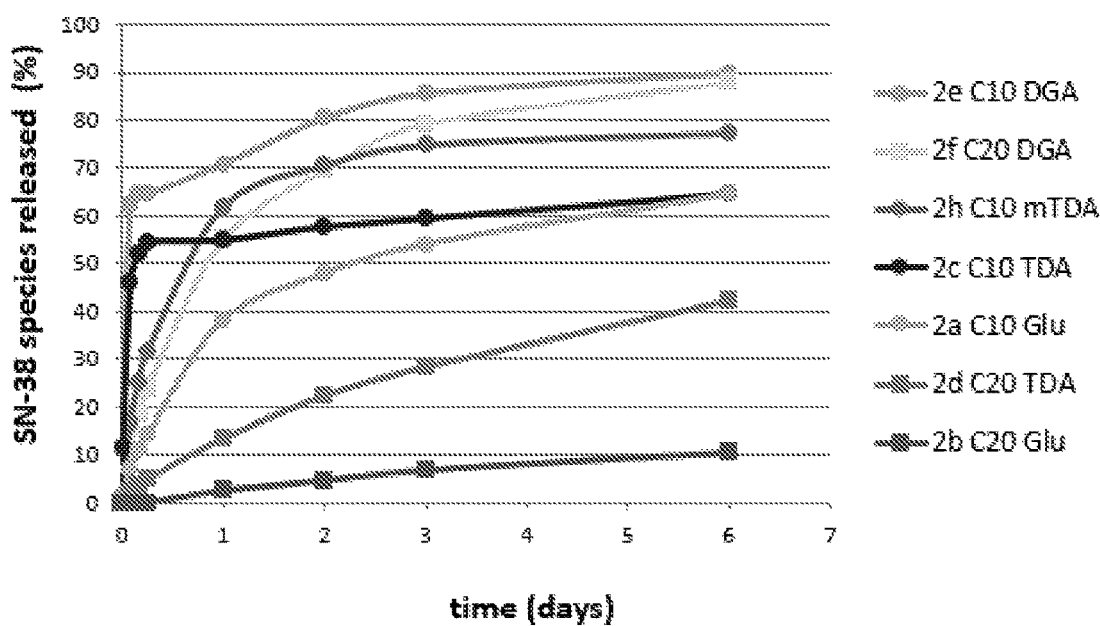

FIG. 14 shows the release of SN-38 species from dendrimers in PBS/DMA over days.

Figure 15:
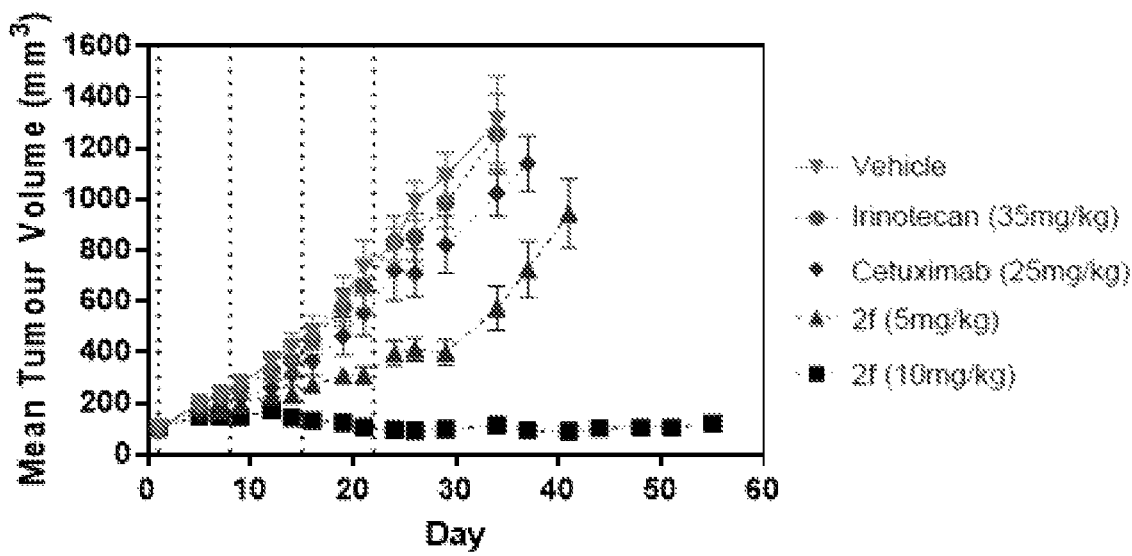
Figure 17:
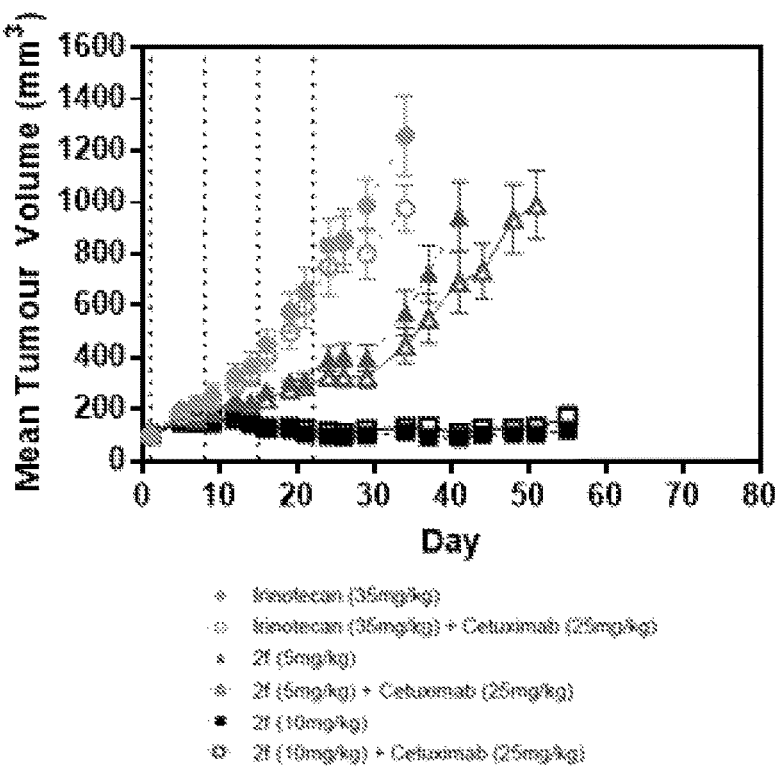

FIGS. 15 and 17 show the efficacy of vehicle, irinotecan, cetuximab and example dendrimer 2f, alone and in combination against HT-29 cell line xenografts in mice.

Figure 16:
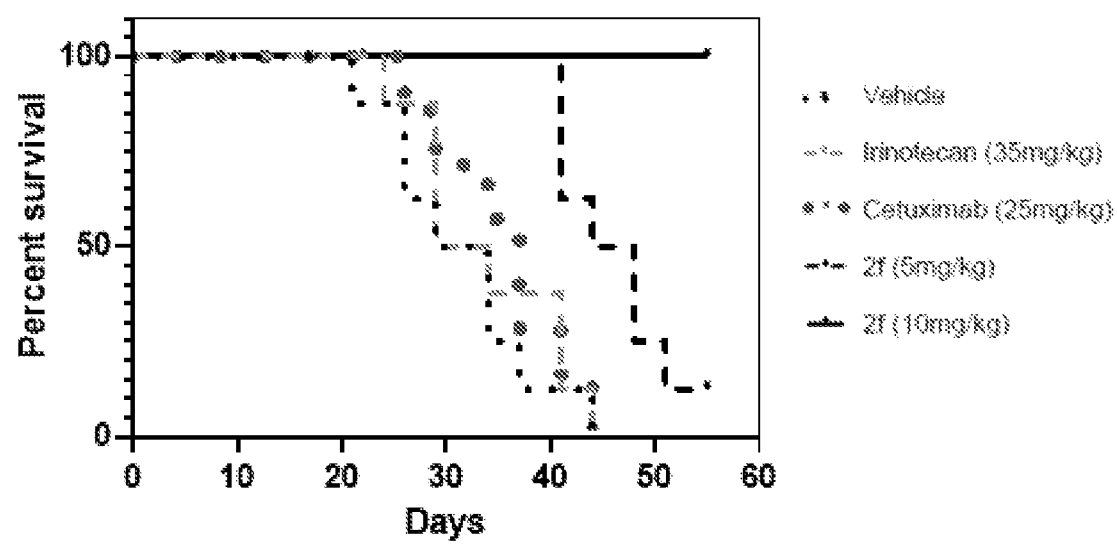
Figure 18:
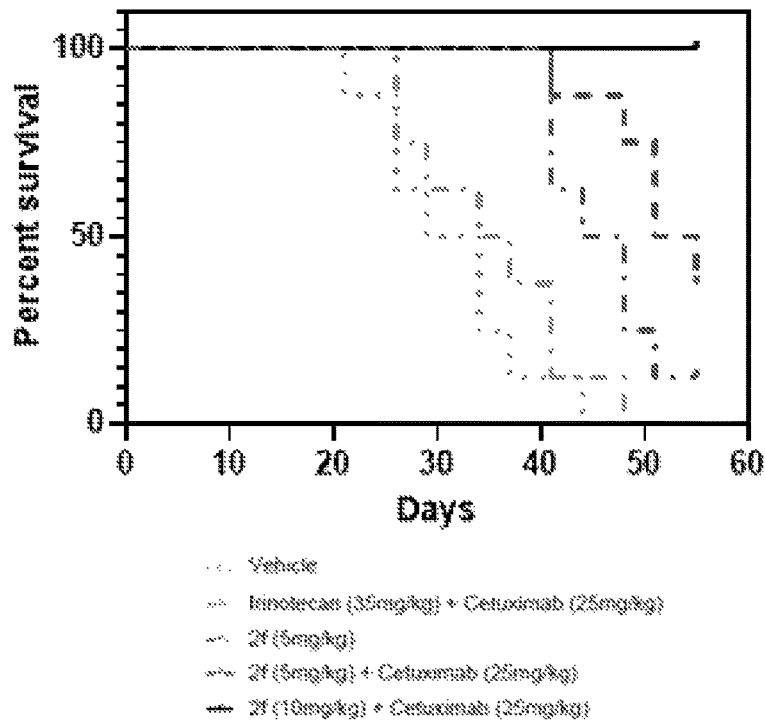

FIGS. 16 and 18 show Kaplan-Meier survival curves of data shown in FIGS. 15 and 17.

Figure 19:
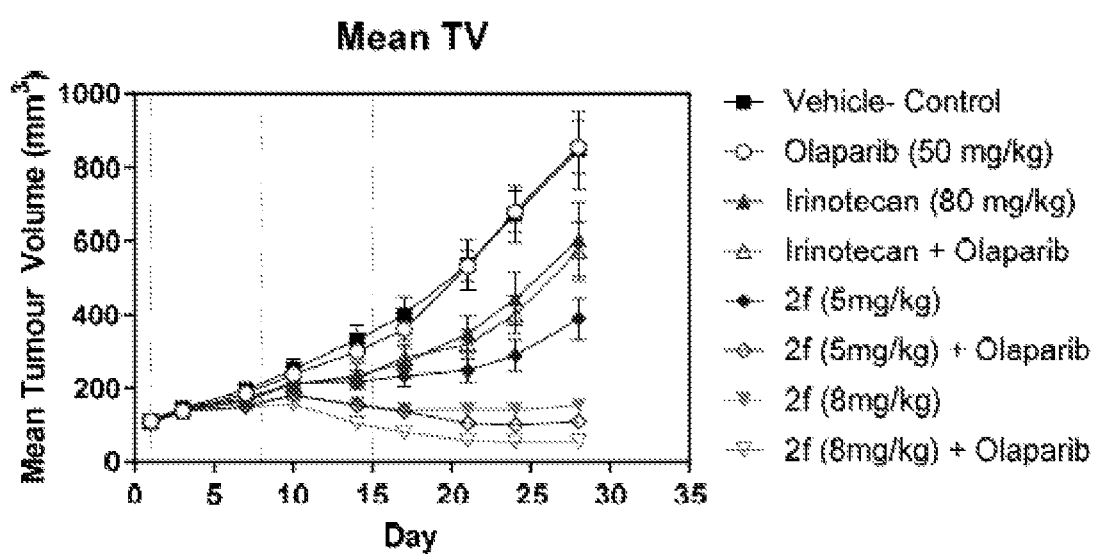

FIG. 19 shows the efficacy of vehicle, olaparib, irinotecan and example dendrimer 2f, alone and in combination against HT-29 cell line xenografts in mice.

DETAILED DESCRIPTION

General Definitions

Unless specifically defined otherwise, all technical and scientific terms used herein shall be taken to have the same meaning as commonly understood by one of ordinary skill in the art (e.g., chemistry, biochemistry, medicinal chemistry, polymer chemistry, and the like).

As used herein, the term "and/or", e.g., "X and/or Y" shall be understood to mean either "X and Y" or "X or Y" and shall be taken to provide explicit support for both meanings or for either meaning.

As used herein, the term about, unless stated to the contrary, refers to +/−20%, more preferably +/−10%, of the designated value.

As used herein, the terms "a", "an" and "the" include both singular and plural aspects, unless the context clearly indicates otherwise.

As used herein, the term "subject" refers to any organism that is susceptible to a disease or condition. For example, the subject can be an animal, a mammal, a primate, a livestock animal (e.g, sheep, cow, horse, pig), a companion animal (e.g, dog, cat), or a laboratory animal (e.g., mouse, rabbit, rat, guinea pig, hamster). In one example, the subject is a mammal. In one embodiment, the subject is human. In one embodiment, the subject is a non-human animal.

As used herein, the term "treating" includes alleviation of symptoms associated with a specific disorder or condition. For example, as used herein, the term "treating cancer" includes alleviating symptoms associated with cancer. In one embodiment, the term "treating cancer" refers to a reduction in cancerous tumour size. In one embodiment, the term "treating cancer" refers to an increase in progression-free survival. As used herein, the term "progression-free survival" refers to the length of time during and after the treatment of cancer that a patient lives with the disease, i.e., cancer, but does not have a recurrence or increase in symptoms of the disease.

As used herein, the term "prevention" includes prophylaxis of the specific disorder or condition. For example, as used herein, the term "preventing cancer" refers to preventing the onset or duration of the symptoms associated with cancer. In one embodiment, the term "preventing cancer" refers to slowing or halting the progression of the cancer. In one embodiment, the term "preventing cancer" refers to slowing or preventing metastasis.

The term "therapeutically effective amount", as used herein, refers to a dendrimer being administered in an amount sufficient to alleviate or prevent to some extent one or more of the symptoms of the disorder or condition being treated. The result can be the reduction and/or alleviation of the signs, symptoms, or causes of a disease or condition, or any other desired alteration of a biological system. In one embodiment, the term "therapeutically effective amount" refers to a dendrimer being administered in an amount sufficient to result in a reduction in cancerous tumour size. In one embodiment, the term "therapeutically effective amount" refers to a dendrimer being administered in an amount sufficient to result in an increase in progression-free survival. The term, an "effective amount", as used herein, refers to an amount of a dendrimer effective to achieve a desired pharmacologic effect or therapeutic improvement without undue adverse side effects or to achieve a desired pharmacologic effect or therapeutic improvement with a reduced side effect profile. Therapeutically effective amounts may for example be determined by routine experimentation, including but not limited to a dose escalation clinical trial. The term "therapeutically effective amount" includes, for example, a prophylactically effective amount. In one embodiment, a prophylactically effective amount is an amount sufficient to prevent metastasis. It is understood that "an effective amount" or "a therapeutically effective amount" can vary from subject to subject, due to variation in metabolism of the compound and any of age, weight, general condition of the subject, the condition being treated, the severity of the condition being treated, and the judgment of the prescribing physician. An appropriate "effective amount" in any individual case may be determined by one of ordinary skill in the art using routine experimentation.

As used herein, the term "alkyl" refers to a monovalent straight-chain (i.e. linear) or branched saturated hydrocarbon group. In one example, an alkyl group contains from 1 to 10 carbon atoms ((i.e. $C_{1-10}$alkyl). In one example, an alkyl group contains from 1 to 6 carbon atoms (i.e. $C_{1-6}$ alkyl). Examples of alkyl groups include methyl, ethyl, propyl (e.g, n-propyl, iso-propyl), butyl (e.g, n-butyl, sec-butyl, tert-butyl), pentyl and hexyl groups.

As used herein, the term "alkylene" refers to a divalent straight-chain (i.e. linear) or branched saturated hydrocarbon group. In one example, an alkylene group contains from 2 to carbon atoms ((i.e. $C_{2-10}$ alkylene). In one example, an alkylene group contains from 2 to 6 carbon atoms (i.e. $C_{2-6}$ alkylene). Examples of alkylene groups include, for example, —$CH_2CH_2$—, —$CH_2CH_2CH_2$—, —$CH_2CH(CH_3)$—, —$CH_2CH_2CH_2CH_2$—, —$CH_2CH(CH_3)CH_2$—, and the like.

Suitable salts of the dendrimers include those formed with organic or inorganic acids or bases. As used herein, the phrase "pharmaceutically acceptable salt" refers to pharmaceutically acceptable organic or inorganic salts. Exemplary acid addition salts include, but are not limited to, sulfate, citrate, acetate, oxalate, chloride, bromide, iodide, nitrate, bisulfate, phosphate, acid phosphate, isonicotinate, lactate, salicylate, acid citrate, tartrate, oleate, tannate, pantothenate, bitartrate, ascorbate, succinate, maleate, gentisinate, fumarate, gluconate, glucuronate, saccharate, formate, benzoate, glutamate, methanesulfonate, ethanesulfonate, benzenesulfonate, p-toluenesulfonate, and pamoate (i.e., 1,1'-methylene-bis-(2-hydroxy-3-naphthoate)) salts. Exemplary base addition salts include, but are not limited to, ammonium salts, alkali metal salts, for example those of potassium and sodium, alkaline earth metal salts, for example those of calcium and magnesium, and salts with organic bases, for example dicyclohexylamine, N-methyl-D-glucomine, morpholine, thiomorpholine, piperidine, pyrrolidine, a mono-, di- or tri-lower alkylamine, for example ethyl-, tert-butyl-, diethyl-, diisopropyl-, triethyl-, tributyl- or dimethyl-propylamine, or a mono-, di- or trihydroxy lower alkylamine, for example mono-, di- or triethanolamine. A pharmaceutically acceptable salt may involve the inclusion of another molecule such as an acetate ion, a succinate ion or other counterion. The counterion may be any organic or inorganic moiety that stabilizes the charge on the parent compound. Furthermore, a pharmaceutically acceptable salt may have more than one charged atom in its structure. Instances where multiple charged atoms are part of the pharmaceutically acceptable salt can have multiple counter ions. Hence, a pharmaceutically acceptable salt can have one or more charged atoms and/or one or more counterion. It will also be appreciated that non-pharmaceutically acceptable salts also fall within the scope of the present disclosure since these may be useful as intermediates in the preparation of pharmaceutically acceptable salts or may be useful during storage or transport.

Those skilled in the art of organic and/or medicinal chemistry will appreciate that many organic compounds can form complexes with solvents in which they are reacted or from which they are precipitated or crystallized. These complexes are known as "solvates". For example, a complex with water is known as a "hydrate". As used herein, the phrase "pharmaceutically acceptable solvate" or "solvate" refer to an association of one or more solvent molecules and a compound of the present disclosure. Examples of solvents that form pharmaceutically acceptable solvates include, but are not limited to, water, isopropanol, ethanol, methanol, DMSO, ethyl acetate, acetic acid, and ethanolamine.

As used herein, the term "dendrimer" refers to a molecule containing a core and dendrons attached to the core. Each dendron is made up of generations of branched building units resulting in a branched structure with increasing number of branches with each generation of building units. A "dendrimer", including a drug-dendrimer conjugate, may include pharmaceutically acceptable salts or solvates as defined supra.

As used herein, the term "building unit" refers to a branched molecule which is a lysine residue or an analogue thereof having three functional groups, one for attachment to the core or a previous generation of building units and at least two functional groups for attachment to the next generation of building units or forming the surface of the dendrimer molecule.

As used herein, the term "attached" refers to a connection between chemical components by way of covalent bonding. The term "covalent bonding" is used interchangeably with the term "covalent attachment".

Dendrimers

In a first aspect there is provided a dendrimer comprising:

i) a core unit (C); and ii) building units (BU), each building unit being a lysine residue or an analogue thereof;

wherein the core unit is covalently attached to two building units via amide linkages, each amide linkage being formed between a nitrogen atom present in the core unit and the carbon atom of an acyl group present in a building unit;

the dendrimer being a five generation building unit dendrimer;

wherein building units of different generations are covalently attached to one another via amide linkages formed between a nitrogen atom present in one building unit and the carbon atom of an acyl group present in another building unit;

the dendrimer further comprising:

iii) a plurality of first terminal groups (T1) comprising a residue of a camptothecin active covalently attached to a diacyl linker group of formula

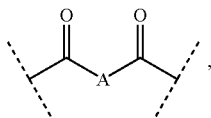

wherein A is a $C_2$-$C_{10}$ alkylene group which is optionally interrupted by O, S, NH, or N(Me), or in which A is a heterocycle selected from the group consisting of tetrahydrofuran, tetrahydrothiophene, pyrrolidine and N-methylpyrrolidine; and iv) a plurality of second terminal groups (T2) comprising a PEG or PEOX group;

wherein at least one half of the outer building units have one nitrogen atom covalently attached to a first terminal group and have one nitrogen atom covalently attached to a second terminal group;

or a pharmaceutically acceptable salt thereof.

The core unit (C) of the dendrimer is covalently attached to two building units via amide linkages, each amide linkage being formed between a nitrogen atom present in the core unit and the carbon atom of an acyl group present in a building unit. Accordingly, the core unit may for example be formed from a core unit precursor comprising two amino groups. Any suitable diamino-containing molecule may be used as the core unit precursor. In some embodiments, the core unit is:

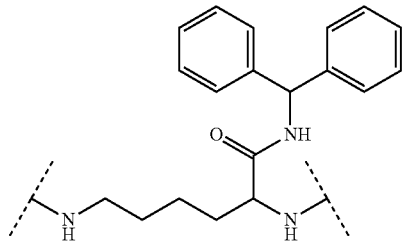

and may, for example, be formed from a core unit precursor:

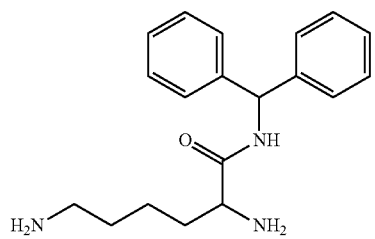 [SMILES: NCCCCC(N)C(=O)NC(c1ccccc1)c1ccccc1]

having two reactive (amino) nitrogens.

The building units (BU) are lysine residues or analogues thereof, and may be formed from suitable building unit precursors, e.g., lysine or lysine analogues containing appropriate protecting groups. Lysine analogues have two amino nitrogen atoms for bonding to a subsequent generation of building units and an acyl group for bonding to a previous generation of building units or a core. Examples of suitable building units include

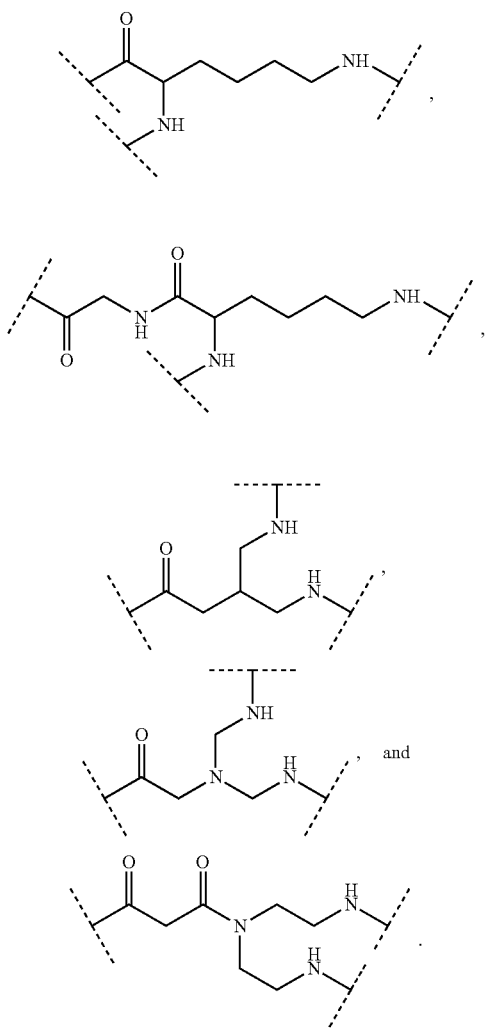

wherein the acyl group of each building unit provides a covalent attachment point for attachment to the core or to a previous generation building unit; and wherein each nitrogen atom provides a covalent attachment point for covalent attachment to a subsequent generation building unit, a first terminal group or a second terminal group.

In some preferred embodiments, the building units are each:

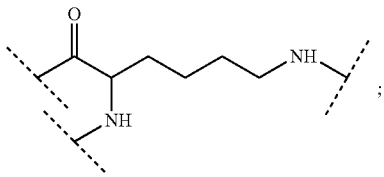

wherein the acyl group of each building unit provides a covalent attachment point for attachment to the core or to a previous generation building unit; and wherein each nitrogen atom provides a covalent attachment point for covalent attachment to a subsequent generation building unit, a first terminal group or a second terminal group.

In some preferred embodiments, the building units are each:

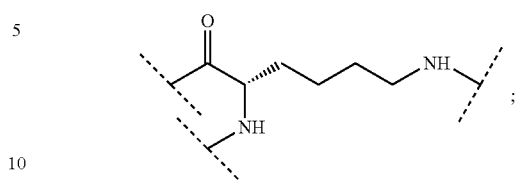

wherein the acyl group of each building unit provides a covalent attachment point for attachment to the core or to a previous generation building unit; and wherein each nitrogen atom provides a covalent attachment point for covalent attachment to a subsequent generation building unit, a first terminal group or a second terminal group.

The outermost generation of building units ($BU_{outer}$) may be formed by lysine or lysine analogue building units as used in the other generations of building units (BU) as described above. The outermost generation of building units ($BU_{outer}$) is the generation of building units that is outermost from the core of the dendrimer, i.e., no further generations of building units are attached to the outermost generation of building units ($BU_{outer}$).

It will be appreciated that the dendrons of the dendrimer may for example be synthesised to the required number of generations through the attachment of building units (BU) accordingly. In some embodiments each generation of building units (BU) may be formed of the same building unit, for example all of the generations of building units may be lysine building units. In some other embodiments, one or more generations of building units may be formed of different building units to other generations of building units.

The dendrimer is a five generation building unit dendrimer. A five generation building unit dendrimer is a dendrimer having a structure which includes five building units which are covalently linked to each another, for example in the case where the building units are lysines, it may comprise the substructure:

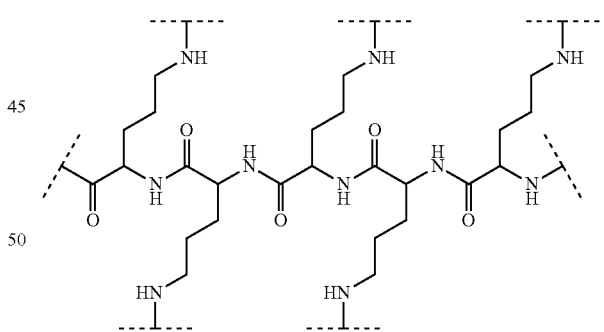

In some embodiments, the dendrimer has five complete generations of building units. With a core having two reactive amine groups, such a dendrimer will comprise 62 building units (i.e. core unit+2 BU+4 BU+8 BU+16 BU+32 BU). However, it will be appreciated that, due to the nature of the synthetic process for producing the dendrimers, one or more reactions carried out to produce the dendrimers may not go fully to completion. Accordingly, in some embodiments, the dendrimer may comprise incomplete generations of building units. For example, a population of dendrimers may be obtained, in which the dendrimers have a distribution of numbers of building units per dendrimer. In some embodiments, a population of dendrimers is obtained which has a mean number of building units per dendrimer of at least 55, or at least 56, or at least 57, or at least 58, or at least 59, or at least 60. In some embodiments, a population of dendrimers is obtained in which at least 60%, at least 70%, at least 80%, at least 90% or at least 95% of the dendrimers have 55 or more building units. In some embodiments, a population of dendrimers is obtained in which at least 60%, at least 70%, at least 80%, at least 90% or at least 95% of the dendrimers have 60 or more building units.

Each reactive (amino) group of the core represents a conjugation site for a dendron comprising building units.

In some embodiments, each generation of building units in each dendron (X) may be represented by the formula $[BU]_2^{(b-1)}$, wherein b is the generation number. A dendron (X) having five complete generations of building units is represented as $[BU]_1$-$[BU]_2$-$[BU]_4$-$[BU]_8$-$[BU]_{16}$.

Camptothecins

The dendrimer comprises a plurality of first terminal groups (T1) comprising a residue of a camptothecin active covalently attached to a diacyl linker group of formula

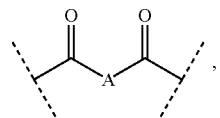

wherein A is a $C_2$-$C_{10}$ alkylene group which is optionally interrupted by O, S, NH, or N(Me), or in which A is a heterocycle selected from the group consisting of tetrahydrofuran, tetrahydrothiophene, pyrrolidine and N-methylpyrrolidine.

Camptothecin is a topoisomerase 1 inhibitor having the structure:

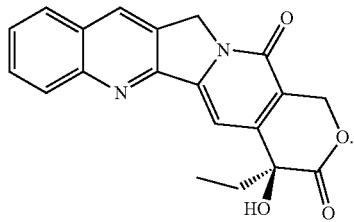 [SMILES: CC[C@@]1(O)C(=O)OCc2c1cc1n(c2=O)Cc2cc3ccccc3nc2-1]

A family of structurally-related compounds also having topoisomerase inhibitory activity has also been identified. In one embodiment, a camptothecin active is a compound having the substructure:

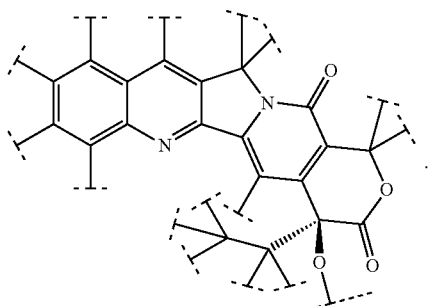

Examples of camptothecin actives (the residue of which may form part of the first terminal group) include SN-38, irinotecan (CPT-11), topotecan, silatecan, cositecan, exatecan, lurtotecan, gimatecan, belotecan and rubitecan. In some embodiments, the residue of a camptothecin active is attached to the diacyl linker through the C-10 or C-20 position. In some embodiments, the residue of a camptothecin active has the substructure:

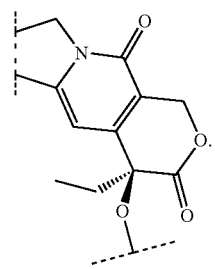

In some embodiments, the residue of a camptothecin active has the substructure:

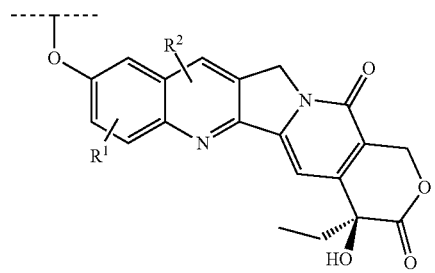

in which $R^1$ is selected from the group consisting of hydrogen, $C_{1-6}$ alkyl, —$OR^3$, and —$C_{1-6}$ alkyl-$N(R^3)_2$; $R^2$ is selected from the group consisting of hydrogen, $C_{1-6}$ alkyl, —$OR^3$, and —$C_{1-6}$ alkyl-$N(R^3)_2$; each $R^3$ is independently selected from hydrogen and $C_{1-6}$ alkyl. In some embodiments, the first terminal group comprises a residue of a camptothecin active which is a residue of SN-38. SN-38 has the structure:

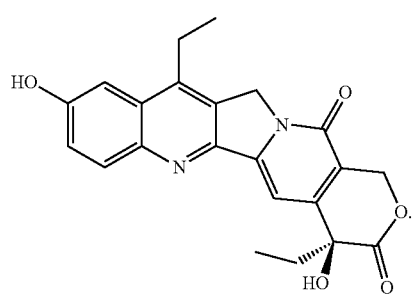 [SMILES: CCc1c2c(nc3ccc(O)cc13)-c1cc3c(c(=O)n1C2)COC(=O)[C@]3(O)CC]

In some embodiments, the residue of a camptothecin active is a residue of SN-38 which is attached to the diacyl linker through the C-10 or C-20 position. In some preferred embodiments, the residue of SN-38 is

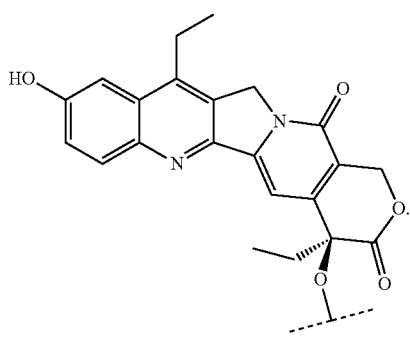

In other embodiments, the residue of SN-38 is

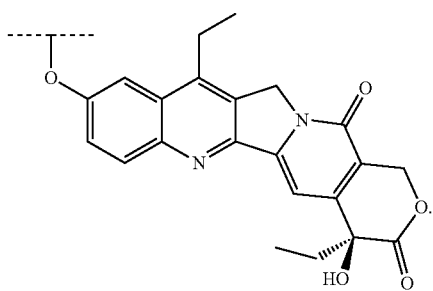

Upon in vivo administration, typically the dendrimer releases the camptothecin active (e.g., SN-38).

The residue of a camptothecin active is covalently attached to a diacyl linker group of formula

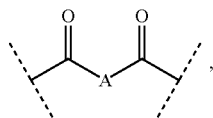

wherein A is a $C_2$-$C_{10}$ alkylene group which is optionally interrupted by O, S, NH, or N(Me), or in which A is a heterocycle selected from the group consisting of tetrahydrofuran, tetrahydrothiophene, pyrrolidine and A-methyl pyrrolidine. In some embodiments, the diacyl linker is

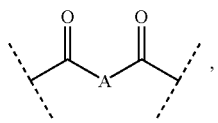

wherein A is a $C_2$-$C_{10}$ alkylene group which is interrupted by O, S, NH, or N(Me), or in which A is a heterocycle selected from the group consisting of tetrahydrofuran, tetrahydrothiophene, pyrrolidine and N-methylpyrolidine. In some embodiments, the diacyl linker is

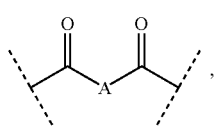

wherein A is a $C_2$-$C_{10}$ alkylene group which is interrupted by O, S, NH, or N(Me). In some embodiments, the diacyl linker is

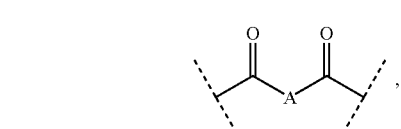

wherein A is a $C_2$-$C_6$ alkyl group which is interrupted by O, S, NH, or N(Me). In some embodiments, the diacyl linker is

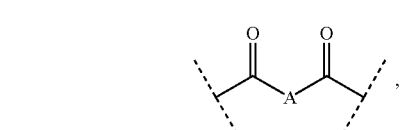

wherein A is a straight chain $C_2$-$C_6$ alkyl group which is interrupted by O, S, NH, or N(Me). In some embodiments, the diacyl linker is

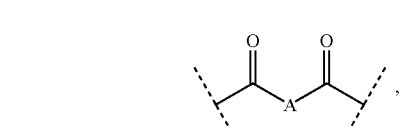

wherein A is a $C_2$-$C_6$ alkyl group which is uninterrupted by O, S, NH. In some embodiments, the diacyl linker is

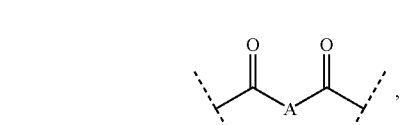

wherein A is a straight chain $C_2$-$C_6$ alkyl group which is uninterrupted by O, S, NH. In some embodiments, the diacyl linker is

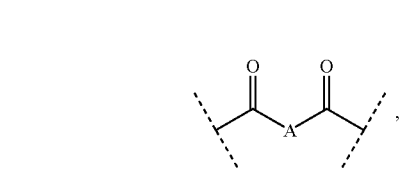

wherein A is a heterocycle selected from the group consisting of tetrahydrofuran, tetrahydrothiophene, pyrrolidine and N-methylpyrolidine. In some embodiments, the diacyl linker is selected from the group consisting of

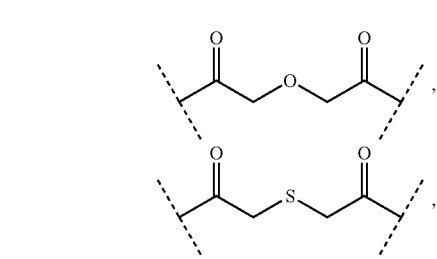

-continued

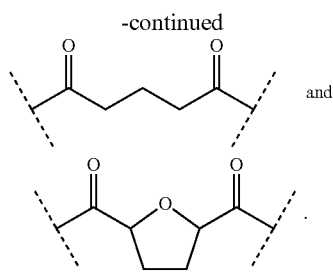

and

In some embodiments, the diacyl linker is selected from the group consisting of

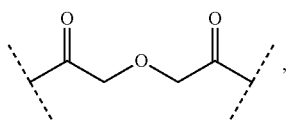,

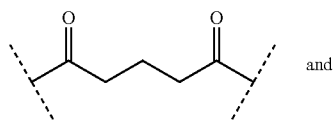 and

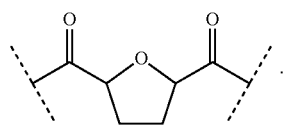.

In some embodiments, the diacyl linker is

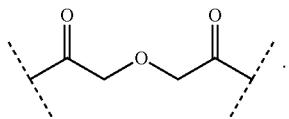.

The residue of a camptothecin active is typically covalently attached to the diacyl linker via an ester linkage formed between an oxygen atom present as part of the camptothecin active side-chain and a carbon atom of an acyl group present as part of the diacyl linker. The other acyl group of the diacyl linker forms an amide linkage with a nitrogen atom present in an outer building unit. In some embodiments, the residue of a camptothecin active has the substructure:

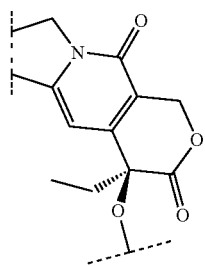

and is covalently attached to the diacyl linker group via the oxygen atom present on the lactone ring; and wherein the diacyl linker is

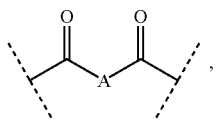, wherein A is a $C_2$-$C_{10}$ alkylene group which is interrupted by O, S, NH, or N(Me), or in which A is a heterocycle selected from the group consisting of tetrahydrofuran, tetrahydrothiophene, pyrrolidine and N-methylpyrrolidine. In some embodiments, the residue of a camptothecin active has the substructure:

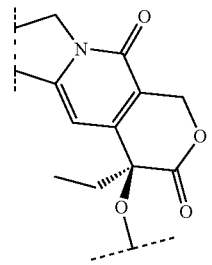

and is covalently attached to the diacyl linker group via the oxygen atom present on the lactone ring; and the diacyl linker is

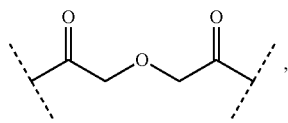,

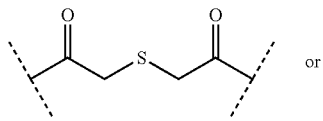 or

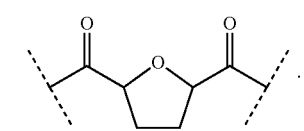.

In some embodiments, each first terminal group (T1) is:

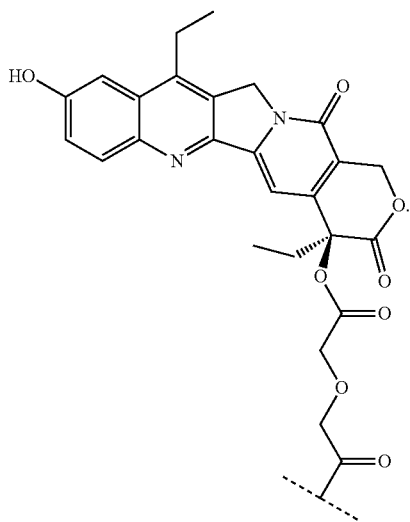

In some embodiments, the residue of a camptothecin active has the substructure:

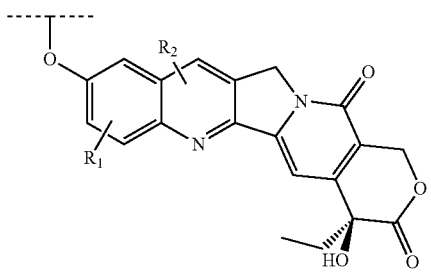

in which
R$^1$ is selected from the group consisting of hydrogen, C$_{1-6}$ alkyl, —OR$^3$, and —C$_{1-6}$alkyl-N(R$^3$)$_2$;
R$^2$ is selected from the group consisting of hydrogen, C$_{1-6}$ alkyl, —OR$^3$, and —C$_{1-6}$alkyl-N(R$^3$)$_2$;
each R$^3$ is independently selected from hydrogen and C$_{1-6}$ alkyl;
and the residue of a camptothecin active is covalently attached to the diacyl linker group via the oxygen atom present on the phenyl ring; and wherein the diacyl linker is

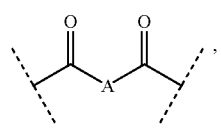

wherein A is a C$_2$-C$_6$ alkylene group. In some embodiments, the residue of a camptothecin active has the substructure:

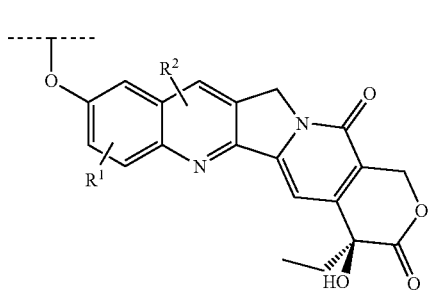

in which R$^1$ is selected from the group consisting of hydrogen, C$_{1-6}$alkyl, —OR$^3$, and —C$_{1-6}$alkyl-N(R$^3$)$_2$; R$^2$ is selected from the group consisting of hydrogen, C$_{1-6}$alkyl, —OR$^3$, and —C$_{1-6}$alkyl-N(R$^3$)$_2$; each R$^3$ is independently selected from hydrogen and C$_{1-6}$alkyl; and the residue of a camptothecin active is covalently attached to the diacyl linker group via the oxygen atom present on the phenyl ring; and wherein the diacyl linker is

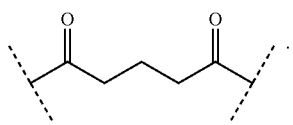

In some embodiments, each first terminal group (T1) is:

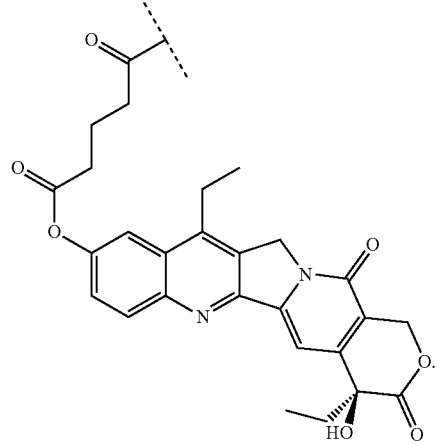

The inventors have found that, by the combination of particular cleavable linker groups, with specific hydroxyl groups present in the camptothecin structure, that controlled and consistent release of camptothecin active can be achieved, leading to good biological activity and good pharmacokinetic properties. For example, the C-20 site of camptothecin actives is more sterically hindered than the C-10 position and C-20 constructs are thermodynamically less favourable than the corresponding C-10 constructs. However, linker groups have been identified which release drug from the dendrimer at a desirable rate, which can be conjugated with the camptothecin active in high yield, and which can also be used to achieve good levels of loading of camptothecin active onto the dendrimer.

Second Terminal Group

The dendrimer comprises a plurality of second terminal groups (T2) each comprising a PEG or a PEOX group. The second terminal group T2 is a pharmacokinetic modifying agent. A pharmacokinetic modifying agent is an agent that can modify or modulate the pharmacokinetic profile of the dendrimer or the pharmaceutically active agent (i.e. the camptothecin active) that the dendrimer is delivering. The pharmacokinetic modifying agent may modulate the absorption, distribution, metabolism, excretion and/or toxicity of the dendrimer of the pharmaceutically active agent. The pharmacokinetic modifying agent (T2) may influence the rate of release of the pharmaceutically active agent, either by slowing or increasing the rate in which the active agent is released from the dendrimer by either chemical (e.g., hydrolysis) or enzymatic degradation pathways. The pharmacokinetic modifying agent (T2) may change the solubility profile of the dendrimer, either increasing or decreasing the solubility of the dendrimer in a pharmaceutically acceptable carrier. The pharmacokinetic modifying agent (T2) may assist the dendrimer in delivering the pharmaceutically active agent to specific tissues (e.g., tumours). The pharmacokinetic modifying agent (T2) may extend the pharmaceutically active agent half-life by reducing clearance of the dendrimer.

In one embodiment the second terminal group comprises a PEG group. A PEG group is a polyethylene glycol group, i.e. a group comprising repeat units of the formula —$CH_2CH_2O$—. PEG materials used to produce the dendrimer of the present disclosure typically contain a mixture of PEGs having some variance in molecular weight (i.e., ±10%), and therefore, where a molecular weight is specified, it is typically an approximation of the average molecular weight of the PEG composition. For example, the term "$PEG_{-2100}$" refers to polyethylene glycol having an average molecular weight of approximately 2100 Daltons, i.e. ±approximately 10% ($PEG_{1890}$ to $PEG_{2310}$). The term "$PEG_{-2300}$" refers to polyethylene glycol having an average molecular weight of approximately 2300 Daltons, i.e. ±approximately 10% ($PEG_{2070}$ to $PEG_{2530}$). Three methods are commonly used to calculate MW averages: number average, weight average, and z-average molecular weights. As used herein, the phrase "molecular weight" is intended to refer to the weight-average molecular weight which can be measured using techniques well-known in the art including, but not limited to, NMR, mass spectrometry, matrix-assisted laser desorption ionization time of flight (MALDI-TOF), gel permeation chromatography or other liquid chromatography techniques, light scattering techniques, ultracentrifugation and viscometry.

In some embodiments, the second terminal groups comprise PEG groups having an average molecular weight of between about 200 and 5000 Daltons. In some embodiments, the second terminal groups comprise PEG groups having an average molecular weight of at least 750 Daltons. In some embodiments, the second terminal groups comprise PEG groups having an average molecular weight in the range of from 1000 to 2500 Daltons. In some embodiments, the second terminal groups comprise PEG groups having an average molecular weight in the range of from 1500 to 2500 Daltons. In some embodiments, the second terminal groups comprise PEG groups having an average molecular weight in the range of from 1900 to 2300 Daltons. In some embodiments, the second terminal groups comprise PEG groups having an average molecular weight in the range of from 2100 to 2500 Daltons. In some embodiments, the second terminal groups comprise PEG groups having an average molecular weight of about 1900, about 2000, about 2100, about 2200, about 2300, about 2400 or about 2500 Daltons.

In some embodiments, the PEG group has a polydispersity index (PDI) of between about 1.00 and about 1.50, between about 1.00 and about 1.25, or between about 1.00 and about 1.10. In some embodiments, the PEG group has a polydispersity index (PDI) of about 1.05. The term "polydispersity index" refers to a measure of the distribution of molecular mass in a given polymer sample. The polydispersity index (PDI) is equal to the weight average molecular weight ($M_w$) divided by the number average molecular weight ($M_n$) and indicates the distribution of individual molecular masses in a batch of polymers. The polydispersity index (PDI) has a value equal to or greater than one, but as the polymer approaches uniform change length and average molecular weight, the polydispersity index (PDI) will be closer to one.

Where the second terminal groups comprise a PEG group, the PEG groups may be linear or branched. If desired, an end-capped PEG group may be used. In some embodiments, the PEG group is a methoxy-terminated PEG.

In one embodiment the second terminal group comprises a PEOX group. A PEOX group is a polyethyloxazoline group, i.e. a group comprising repeat units of the formula

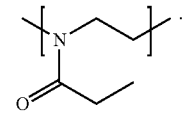

PEOX groups are so named since they can be produced by polymerisation of ethyloxazoline. PEOX materials used to produce the dendrimer of the present disclosure typically contain a mixture of PEOXs having some variance in molecular weight (i.e., ±10%), and therefore, where a molecular weight is specified, it is typically an approximation of the average molecular weight of the PEOX composition. In some embodiments, the second terminal groups comprise PEOX groups having an average molecular weight of at least 750 Daltons, at least 1000 Daltons, or at least 1500 Daltons. In some embodiments, the second terminal groups comprise PEOX groups having an average molecular weight in the range of from 750 Daltons to 2500 Daltons, or from 1000 Daltons to 2000 Daltons. If desired, an end-capped PEOX group may be used. In some embodiments, the PEOX group is a methoxy-terminated PEOX.

The second terminal group may be attached to the outer building unit via any suitable means. In some embodiments, a linking group is used to attach the PEG group or PEOX group to the outer building unit.

The second terminal groups are typically attached via use of a second terminal group precursor which contains a reactive group that is reactive with an amine group, such as a reactive acyl group (which can form an amide bond), or an aldehyde (which can form an amine group under reductive amination conditions).

In some embodiments, the second terminal groups each comprise a PEG group covalently attached to a PEG linking group (L1) via an ether linkage formed between a carbon atom present in the PEG group and an oxygen atom present in the PEG linking group, and each second terminal group is covalently attached to a building unit via an amide linkage formed between a nitrogen atom present in a building unit and the carbon atom of an acyl group present in the PEG linking group. In some embodiments, the second terminal groups are each

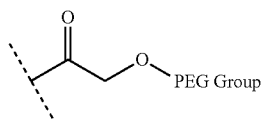

and wherein the PEG group is a methoxy-terminated PEG having an average molecular weight in the range of from about 1750 to 2500 Daltons.

In some embodiments, the second terminal groups each comprise a PEOX group covalently attached to a PEOX linking group (LE) via a linkage formed between a nitrogen atom present in the PEOX group and a carbon atom present in the PEOX linking group, and each second terminal group is covalently attached to a building unit via an amide linkage formed between a nitrogen atom present in a building unit and the carbon atom of an acyl group present in the PEOX linking group. In some embodiments, the second terminal groups are each

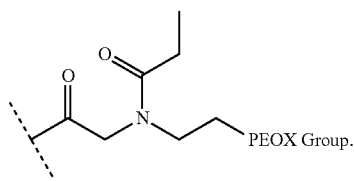

In the dendrimers of the present disclosure, at least one half of the outer building units have one nitrogen atom covalently attached to a first terminal group and have one nitrogen atom covalently attached to a second terminal group. The dendrimers can thus be considered to have controlled stoichiometry and/or topology. For example, the dendrimers are typically produced using synthetic processes that allow for a high degree of control over the number and arrangement of first and second terminal groups present on the dendrimers. The dendrimers may be synthesised using orthogonal protecting groups to allow for conjugation of the terminal groups to the outer building unit in a predefined or controlled manner. In some embodiments at least two thirds of the outer building units have one nitrogen atom covalently attached to a first terminal group and have one nitrogen atom covalently attached to a second terminal group. In some embodiments, at least 75%, at least 80%, at least 85%, or at least 90%, of the outer building units have one nitrogen atom covalently attached to a first terminal group and have one nitrogen atom covalently attached to a second terminal group. In some embodiments, each functionalised outer building unit contains one first terminal group and one second terminal group.

In some embodiments, the dendrimer comprises surface units comprising an outer building unit attached to a first terminal group and a second terminal group, the surface units having the structure:

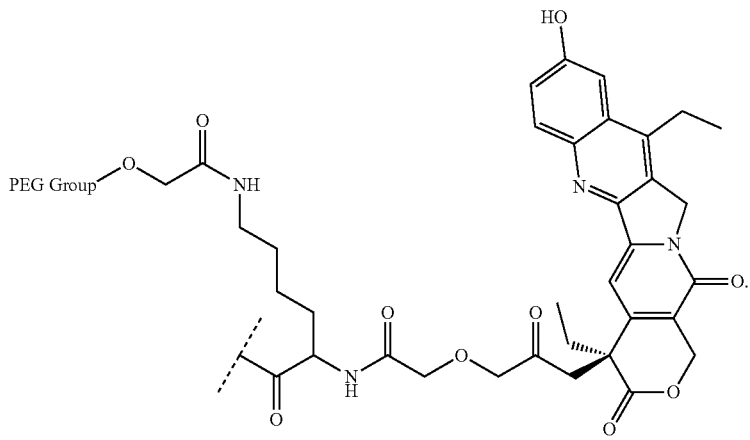

Within those embodiments, in some examples the PEG group is a methoxy-terminated PEG having an average molecular weight in the range of from about 1500 to 2500 Daltons.

The building units are lysine residues or analogues. Lysine has an alpha-nitrogen atom (a nitrogen which is attached to a carbon atom which is α- to the carbon atom which is part of the carbonyl group present in lysine) and an epsilon-nitrogen atom (a nitrogen which is attached to a carbon atom which is s- to the carbon atom which is part of the carbonyl group present in lysine).

In many cases, a population of dendrimers which has been functionalised at the dendrimer surface contain a random stoichiometry and topology of functional groups. For example, reaction of a population of dendrimer molecules containing, e.g., 64 reactive surface groups with one or more reactive functional groups may result in a diverse population of functionalised dendrimer products, with some dendrimer products containing higher numbers of functional groups than others. In cases where there are multiple different surface groups available for reaction with a reactive functional group, a wide distribution of dendrimer products having different surface topologies may also be obtained.

In the present case, in some embodiments the dendrimer has controlled stoichiometry and/or controlled topology with regard to the first terminal groups and second terminal groups. For example, in some embodiments alpha-nitrogen atoms of outer building units are attached to first terminal groups and epsilon-nitrogen atoms of outer building units are attached to second terminal groups. In other embodiments, epsilon-nitrogen atoms of outer building units are attached to first terminal groups and alpha-nitrogen atoms of outer building units are second terminal groups.

The present dendrimer scaffolds, intermediates, and processes, allow for high loadings of camptothecin active to be incorporated into the dendrimer. Such dendrimers are also considered to facilitate therapeutically effective levels of camptothecin active to be released over an extended period of time following administration, and thus may decrease the frequency and/or number of administrations required.

Drug loading (% w/w) can be calculated by multiplying the molecular weight of the camptothecin active (e.g., SN-38) by the number of camptothecin active molecules loaded on to the dendrimer, divided by the total molecular weight of the construct. In some embodiments, the dendrimer has a loading of camptothecin active of at least 10%, at least 11%, at least 12%, at least 13% w/w, or between 10% and 20%, or between 12% and 15%.

In some embodiments, the dendrimer has from 24 to 32, from 26 to 32, from 28 to 32, from 30 to 32, from 24 to 30, from 26 to 30, from 28 to 30, from 26 to 30, from 26 to 28, or from 28 to 30 surface units, the surface units comprising an outer building unit attached to a first terminal group and attached to a second terminal group.

In some embodiments, from 26 to 32, or from 27 to 32, or from 28 to 32 first terminal groups are covalently attached to nitrogen atoms present on outer building units. In some embodiments, from 26 to 32, or from 27 to 32, or from 28 to 32 first terminal groups are covalently attached to alpha-nitrogen atoms present on outer building units In some embodiments, from 26 to 32, or from 27 to 32, or from 28 to 32 second terminal groups are covalently attached to nitrogen atoms present on outer building units. In some embodiments, from 26 to 32, or from 27 to 32, or from 28 to 32 second terminal groups are covalently attached to epsilon-nitrogen atoms present on outer building units.

In some embodiments, at least 40% of the nitrogen atoms present in the outer building units are each covalently attached to a first terminal group. In some embodiments, at least 45% of the nitrogen atoms present in the outer building units are each covalently attached to a first terminal group. In some embodiments, about 50% of the nitrogen atoms present in the outer building units are each covalently attached to a first terminal group.

In some embodiments, at least 40% of the nitrogen atoms present in the outer building units are each covalently attached to a second terminal group. In some embodiments, at least 45% of the nitrogen atoms present in the outer building units are each covalently attached to a second terminal group. In some embodiments, about 50% of the nitrogen atoms present in the outer building units are each covalently attached to a second terminal group.

In some embodiments, at least 40% of the nitrogen atoms present in the outer building units are each covalently attached to a first terminal group; and at least 40% of the nitrogen atoms present in the outer building units are each covalently attached to a second terminal group. In some embodiments, at least 45% of the nitrogen atoms present in the outer building units are each covalently attached to a first terminal group; and at least 45% of the nitrogen atoms present in the outer building units are each covalently attached to a second terminal group. In some embodiments, about 50% of the nitrogen atoms present in the outer building units are each covalently attached to a first terminal group; and about 50% of the nitrogen atoms present in the outer building units are each covalently attached to a second terminal group.

In some embodiments, the five generations of building units are complete generations, and wherein the outer generation of building units provides 64 nitrogen atoms for covalent attachment to a first terminal group or a second terminal, wherein from 26 to 32 first terminal groups are covalently attached to one of said nitrogen atoms, and wherein from 26 to 32 second terminal groups are each covalently attached to one of said nitrogen atoms.

In some embodiments, no more than one quarter of the nitrogen atoms present in the outer generation of building units are unsubstituted. In some embodiments, no more than one fifth of the nitrogen atoms present in said outer generation of building units are unsubstituted. In some embodiments, no more than one sixth of the nitrogen atoms present in said outer generation of building units are unsubstituted. In some embodiments, no more than one eighth of the nitrogen atoms present in said outer generation of building units are unsubstituted. In some embodiments, no more than one tenth of the nitrogen atoms present in said outer generation of building units are unsubstituted.

In some embodiments, no more than 20 nitrogen atoms present in the outer generation of building units are unsubstituted. In some embodiments, no more than 10 nitrogen atoms present in the outer generation of building units are unsubstituted. In some embodiments, no more than 5 nitrogen atoms present in the outer generation of building units are unsubstituted. In some embodiments, no more than 3 nitrogen atoms present in the outer generation of building units are unsubstituted. In some embodiments, no more than 2 nitrogen atoms present in the outer generation of building units are unsubstituted. In some embodiments, no more than 1 nitrogen atom present in the outer generation of building units are unsubstituted. In some embodiments, substantially all of the nitrogen atoms present in the outer generation of building units are substituted.

It will be appreciated that, in addition to the camptothecin active and the PEG or PEOX group, further terminal groups can be attached to the dendrimer. Thus, in some embodiments, the dendrimer comprises one or more third terminal groups. In some embodiments, the third terminal group comprises a residue of a further therapeutic agent, such as a therapeutic agent which is not a camptothecin active. For example, the third terminal group may comprise a residue of a further therapeutic agent which is a chemotherapeutic agent, a chemosensitising agent, or an immune modulator. The residue of a further therapeutic agent may be attached via a linker (e.g., a cleavable linker), for example. At least one half of the outer building units have one nitrogen atom covalently attached to a first terminal group and have one nitrogen atom covalently attached to a second terminal group. In some embodiments, where the dendrimer comprises one or more third terminal groups, the third terminal groups may be attached to the nitrogen atom of an outer building unit which is not covalently attached to a first or second terminal group.

In some embodiments alpha-nitrogen atoms of outer building units are attached to third terminal groups. In some embodiments, epsilon-nitrogen atoms of outer building units are attached to third terminal groups.

Conjugate

In some embodiments the dendrimer has: a core unit formed from a core unit precursor comprising two amino groups; building units which are each

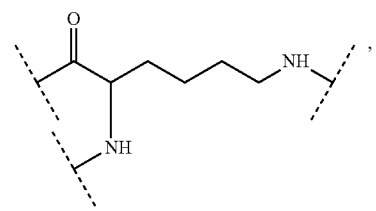

wherein the acyl group of each building unit provides a covalent attachment point for attachment to the core or to a previous generation building unit; and wherein each nitrogen atom provides a covalent attachment point for covalent attachment to a subsequent generation building unit, a first terminal group or a second terminal group; a diacyl linker selected from the group consisting of

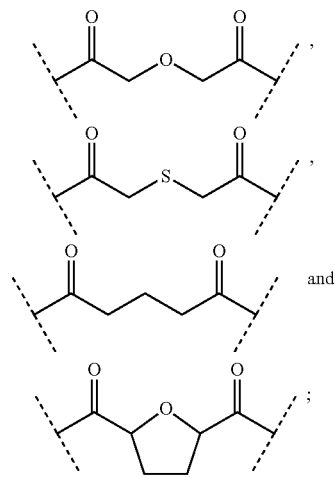

and a residue of a camptothecin active which is a residue of SN-38 which is attached to the diacyl linker through the C-10 or C-20 position.

In some embodiments, the dendrimer has: a core unit which is

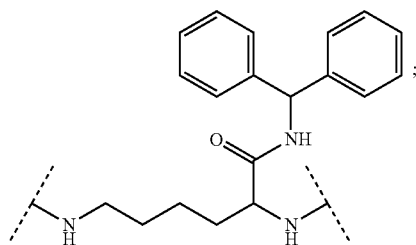

building units which are each

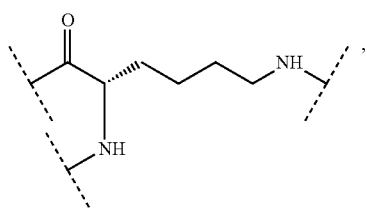

wherein the acyl group of each building unit provides a covalent attachment point for attachment to the core or to a previous generation building unit; and wherein each nitrogen atom provides a covalent attachment point for covalent attachment to a subsequent generation building unit, a first terminal group or a second terminal group; a diacyl linker selected from the group consisting of

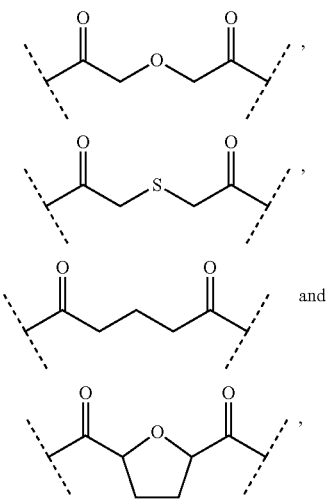

and a residue of a camptothecin active which is a residue of SN-38 which is attached to the diacyl linker through the C-10 or C-20 position.

In some embodiments the dendrimer has: a core unit formed from a core unit precursor comprising two amino groups; building units which are each

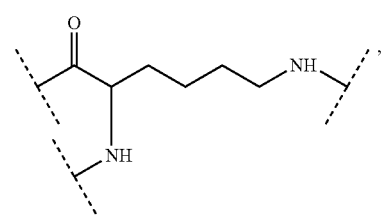

wherein the acyl group of each building unit provides a covalent attachment point for attachment to the core or to a previous generation building unit; and wherein each nitrogen atom provides a covalent attachment point for covalent attachment to a subsequent generation building unit, a first terminal group or a second terminal group; a diacyl linker selected from the group consisting of

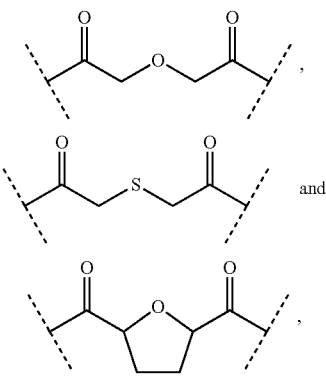

and a residue of a camptothecin active which is

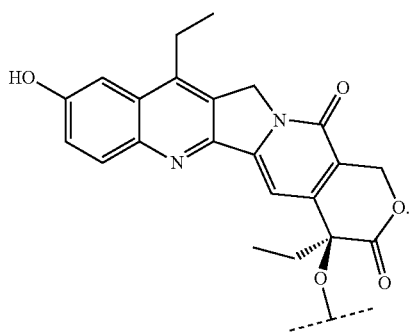

In some embodiments the dendrimer has: a core unit which is

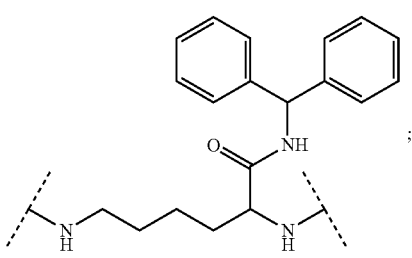

building units which are each

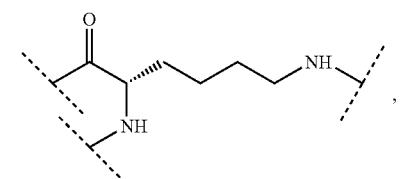

wherein the acyl group of each building unit provides a covalent attachment point for attachment to the core or to a previous generation building unit; and wherein each nitrogen atom provides a covalent attachment point for covalent attachment to a subsequent generation building unit, a first terminal group or a second terminal group; a diacyl linker which is

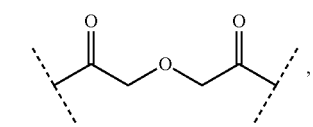

and a residue of a camptothecin active which is

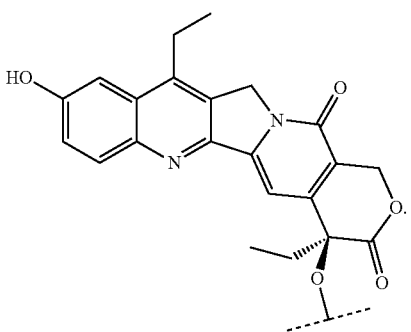

In some embodiments the dendrimer has: a core unit which is

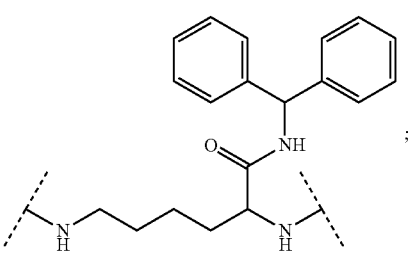

building units which are each

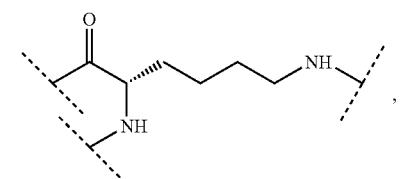

wherein the acyl group of each building unit provides a covalent attachment point for attachment to the core or to a previous generation building unit; and wherein each nitrogen atom provides a covalent attachment point for covalent attachment to a subsequent generation building unit, a first terminal group or a second terminal group; a diacyl linker which is

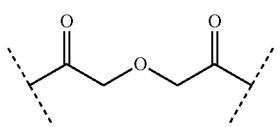

and a residue of a camptothecin active which is
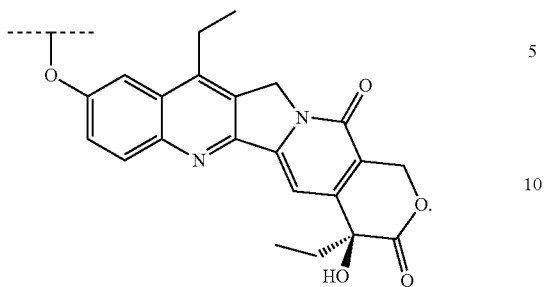
In some embodiments, the dendrimer is:

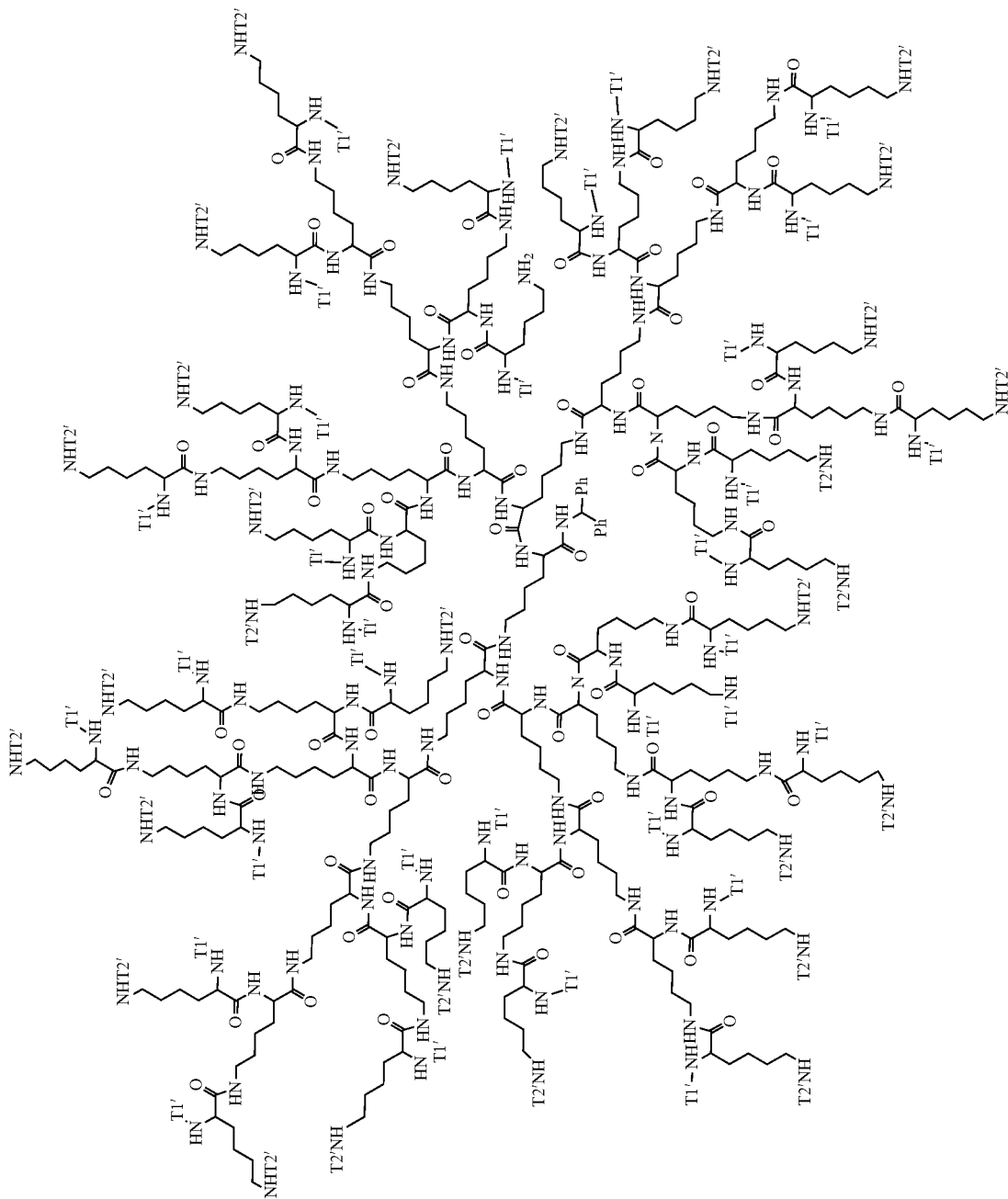

in which T1' represents a first terminal group which is

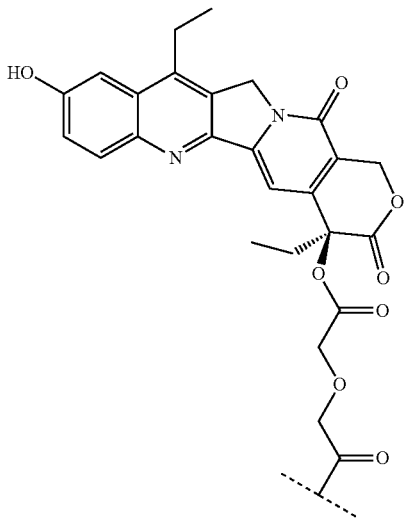

or T1' represents H, wherein less than 5 of TT are H; and T2' represents a second terminal group which is

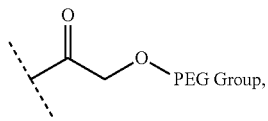

wherein the PEG group is a methoxy-terminated PEG having an average molecular weight in the range of from about 1500 to 2500 Daltons, or T2' represents H, and wherein less than 5 of T2' are H.

In some embodiments, the dendrimer has a molecular weight in the range of from 50 to 300 kDa. In some embodiments, the dendrimer has a molecular weight in the range of from 60 to 200 kDa. In one example, the dendrimer has a molecular weight in the range of from 70 to 150 kDa. In one example, the dendrimer has a molecular weight in the range of 100 to 120 kDa In some embodiments, the % release of camptothecin active from the dendrimer in PBS buffer/DMA 9:1 (v/v) at pH 7.4 and at 37° C. following incubation for 6 hours is in the range of from 10 to 50%. In some embodiments, the % release of camptothecin active from the dendrimer in PBS buffer/DMA 9:1 (v/v) at pH 7.4 and at 37° C. following incubation for 6 hours is in the range of from 15 to 40%. In some embodiments, the % release of camptothecin active from the dendrimer in PBS buffer/DMA 9:1 (v/v) at pH 7.4 and at 37° C. following incubation for 6 hours is in the range of from 20 to 30%. In some embodiments, the 50% release of camptothecin active from the dendrimer in PBS buffer/DMA 9:1 (v/v) at pH 7.4 and at 37° C. following incubation is in the range of from 1 to 72 hours. In some embodiments, the 50% release of camptothecin active from the dendrimer in PBS buffer/DMA 9:1 (v/v) at pH 7.4 and at 37° C. is in the range of from 5 to 60 hours. In some embodiments, the 50% release of camptothecin active from the dendrimer in PBS buffer/DMA 9:1 (v/v) at pH 7.4 and at 37° C. is in the range of from 10 to 24 hours. In some embodiments, the 50% release of camptothecin active from the dendrimer in rat plasma/PBS (5:1 v/v) at 37° C. following incubation is in the range of from 1 to 72 hours. In some embodiments, the 50% release of camptothecin active from the dendrimer in rat plasma/PBS (5:1 v/v) at 37° C. is in the range of from 1 to 24 hours. In some embodiments, the 50% release of camptothecin active from the dendrimer in rat plasma/PBS (5:1 v/v) at 37° C. is in the range of from 2 to 20 hours. In some embodiments, the 50% release of camptothecin active from the dendrimer in rat plasma/PBS (5:1 v/v) at 37° C. is in the range of from 3 to 10 hours.

In some embodiments, the dendrimer is any of the dendrimers described in the Examples below.

Compositions

In some embodiments, the dendrimer is presented as a composition, preferably a pharmaceutical composition.

It will be appreciated that there may be some variation in the molecular composition between the dendrimers present in a given composition, as a result of the nature of the synthetic process for producing the dendrimers. For example, as discussed above one or more synthetic steps used to produce a dendrimer may not proceed fully to completion, which may result in the presence of dendrimers which do not all comprise the same number of first terminal groups or second terminal groups, or which contain incomplete generations of building units.

Accordingly, there is provided a composition comprising a plurality of dendrimers or pharmaceutically acceptable salts thereof, wherein the dendrimers are as defined herein, the mean number of first terminal groups per dendrimer in the composition is in the range of from 24 to 32, and the mean number of second terminal groups per dendrimer in the composition is in the range of from 24 to 32. In some embodiments, the mean number of first terminal groups per dendrimer is in the range of from 26 to 32, and wherein the mean number of second terminal groups per dendrimer is in the range of from 26 to 32. In some embodiments, the mean number of first terminal groups per dendrimer is in the range of from 28 to 32, and wherein the mean number of second terminal groups per dendrimer is in the range of from 28 to 32. In some embodiments, the mean number of first terminal groups per dendrimer is in the range of from 29 to 32, and wherein the mean number of second terminal groups per dendrimer is in the range of from 29 to 32. In some embodiments, the mean number of first terminal groups per dendrimer is in the range of from 30 to 32, and wherein the mean number of second terminal groups per dendrimer is in the range of from 30 to 32. In some embodiments, the composition is a pharmaceutical composition, and the composition comprises a pharmaceutically acceptable excipient.

In some embodiments, at least 50%, at least 60%, at least 70%, at least 80%, at least 90%, or at least 95% of the dendrimers contain at least 26 first terminal groups. In some embodiments, at least 50%, at least 60%, at least 70%, at least 80%, at least 90%, or at least 95% of the dendrimers contain at least 28 first terminal groups. In some embodiments, at least 50%, at least 60%, at least 70%, at least 80%, at least 90%, or at least 95% of the dendrimers contain at least 30 first terminal groups.

In some embodiments, at least 50%, at least 60%, at least 70%, at least 80%, at least 90%, or at least 95% of the dendrimers contain at least 26 second terminal groups. In some embodiments, at least 50%, at least 60%, at least 70%, at least 80%, at least 90%, or at least 95% of the dendrimers contain at least 28 second terminal groups. In some embodiments, at least 50%, at least 60%, at least 70%, at least 80%, at least 90%, or at least 95% of the dendrimers contain at least 30 second terminal groups.

In some embodiments, at least 50%, at least 60%, at least 70%, at least 80%, at least 90%, or at least 95% of the dendrimers contain at least 26 first terminal groups and at least 26 second terminal groups. In some embodiments, at least 50%, at least 60%, at least 70%, at least 80%, at least 90%, or at least 95% of the dendrimers contain at least 28 first terminal groups and at least 28 second terminal groups. In some embodiments, at least 50%, at least 60%, at least 70%, at least 80%, at least 90%, or at least 95% of the dendrimers contain at least 30 first terminal groups and at least 30 second terminal groups.

The present disclosure also provides pharmaceutical formulations or compositions, both for veterinary and for human medical use, which comprise the dendrimers of the present disclosure or a pharmaceutically acceptable salt thereof, with one or more pharmaceutically acceptable carriers, and optionally any other therapeutic ingredients, stabilisers, or the like. The carrier(s) must be pharmaceutically acceptable in the sense of being compatible with the other ingredients of the formulation and not unduly deleterious to the recipient thereof. The compositions of the present disclosure may also include polymeric excipients/additives or carriers, e.g., polyvinylpyrrolidones, derivatised celluloses such as hydroxymethylcellulose, hydroxyethylcellulose, and hydroxypropylmethylcellulose, Ficolls (a polymeric sugar), hydroxy ethyl starch (HES), dextrates (e.g, cyclodextrins, such as 2-hydroxypropyl-β-cyclodextrin and sulfobutylether-β-cyclodextrin), polyethylene glycols, and pectin. The compositions may further include diluents, buffers, citrate, trehalose, binders, disintegrants, thickeners, lubricants, preservatives (including antioxidants), inorganic salts (e.g, sodium chloride), antimicrobial agents (e.g, benzalkonium chloride), sweeteners, antistatic agents, sorbitan esters, lipids (e.g, phospholipids such as lecithin and other phosphatidylcholines, phosphatidylethanolamines, fatty acids and fatty esters, steroids (e.g, cholesterol)), and chelating agents (e.g, EDTA, zinc and other such suitable cations). Other pharmaceutical excipients and/or additives suitable for use in the compositions according to the present disclosure are listed in "Remington: The Science & Practice of Pharmacy", 19.sup.th ed., Williams & Williams, (1995), and in the "Physician's Desk Reference", 52.sup.nd ed., Medical Economics, Montvale, N.J. (1998), and in "Handbook of Pharmaceutical Excipients", Third Ed., Ed. A. H. Kibbe, Pharmaceutical Press, 2000.

The dendrimers of the present disclosure may be formulated in compositions including those suitable for intranasal delivery, inhalation to the lung, by aerosol, or parenteral (including intraperitoneal, intravenous, subcutaneous, or intramuscular injection) administration. The compositions may conveniently be presented in unit dosage form and may be prepared by any of the methods well known in the art of pharmacy. All methods include the step of bringing the dendrimer into association with a carrier that constitutes one or more accessory ingredients. In general, the compositions are prepared by bringing the dendrimer into association with a liquid carrier to form a solution or a suspension, or alternatively, bring the dendrimer into association with formulation components suitable for forming a solid, optionally a particulate product, and then, if warranted, shaping the product into a desired delivery form. Solid formulations of the present disclosure, when particulate, will typically comprise particles with sizes ranging from about 1 nanometer to about 500 microns. In general, for solid formulations intended for intravenous administration, particles will typically range from about 1 nm to about 10 microns in diameter. The composition may contain dendrimer of the present disclosure that are nanoparticulate having a particulate diameter of below 1000 nm, for example, between 5 and 1000 nm, especially 5 and 500 nm, more especially 5 to 400 nm, such as 5 to 50 nm and especially between 5 and 20 nm. In one example, the composition contains dendrimers with a mean size of between 5 and 20 nm. In some embodiments, the dendrimer is poly dispersed in the composition, with PDI of between 1.01 and 1.8, especially between 1.01 and 1.5, and more especially between 1.01 and 1.2. In some embodiments, the dendrimer is polydispersed in the composition with a PDI of about 1.1. In one example, the dendrimer is monodispersed in the composition.

In some preferred embodiments, the composition is formulated for parenteral delivery. For example, in one embodiment, the formulation may be a sterile, lyophilized composition that is suitable for reconstitution in an aqueous vehicle prior to injection.

In one embodiment, a formulation suitable for parenteral administration conveniently comprises a sterile aqueous preparation of the dendrimer, which may for example be formulated to be isotonic with the blood of the recipient.

In some embodiments, the composition is formulated for intraperitoneal delivery. Any suitable means of delivery may be used. For example, in some embodiments delivery may be by lavage or aerosol. In one embodiment the composition is formulated for intraperitoneal delivery, and is for treatment of cancers in the peritoneal cavity, which include malignant epithelial tumors (e.g., ovarian cancer), and peritoneal carcinomatosis (e.g, gastrointestinal especially colorectal, gastric, gynecologic cancers, and primary peritoneal neoplasms).

Pharmaceutical formulations are also provided which are suitable for administration as an aerosol, by inhalation. These formulations comprise a solution or suspension of the desired dendrimer or a salt thereof. The desired formulation may be placed in a small chamber and nebulized. Nebulization may be accomplished by compressed air or by ultrasonic energy to form a plurality of liquid droplets or solid particles comprising the dendrimers or salts thereof.

As discussed below, the dendrimers of the present disclosure may for example be administered in combination with one or more additional pharmaceutically active agents. In some embodiments, the dendrimer is provided in combination with a further active. In some embodiments, a composition is provided which comprises a dendrimer as defined herein or a pharmaceutically acceptable salt thereof, one or more pharmaceutically acceptable carriers, and one or more additional pharmaceutically active agents, e.g., an additional anti-cancer/oncology agent, such as a small molecule cytotoxic, a checkpoint inhibitor, or an antibody therapy. Not only can the dendrimers of the present disclosure be administered with other chemotherapy drugs but may also be administered in combination with other medications such as corticosteroids, anti-histamines, analgesics and drugs that aid in recovery or protect from hematotoxicity, for example, cytokines.

In some embodiments, the composition is formulated for parenteral infusion as part of a chemotherapy regimen. In these embodiments, the composition may for example be substantially free or entirely free of solubilisation excipients, especially solubilisation excipients such as a polyethoxylated castor oil (e.g., such as that sold under the trade name Cremophor® or Kolliphor®), or a polyethoxylated sorbitan monooleate (such as that sold under the trade name polysorbate 80®). Solubilisation excipients are additives which aid dissolution of the dendrimer in the solvent or solvents. In one embodiment the composition is substantially free or entirely free of a polyethoxylated castor oil (e.g., such as that sold under the trade name Cremophor® or Kolliphor®) and a polyethoxylated sorbitan monooleate (e.g., such as polysorbate 80®). In one embodiment, the composition is substantially or entirely free of a solubilisation excipient. By avoiding the use of certain solubilisation excipients, the composition of dendrimer is less likely to cause side effects such as acute or delayed hypersensitivity including life-threatening anaphylaxis and/or severe fluid retention, and/or remove the need for steroid pre-treatment.

Methods of Use

The dendrimers of the present disclosure may be used to treat or prevent any disease, disorder or symptom that the unmodified pharmaceutically active agent can be used to treat or prevent. Accordingly, there is also provided a dendrimer or pharmaceutical composition as described herein for use in therapy.

In some embodiments, the dendrimer is used in a method of treating or preventing cancer, for example for suppressing the growth of a tumour. In some embodiments the dendrimer is for use in the treatment of cancer. There is also provided a method of treating cancer comprising administering to a subject in need thereof a therapeutically effective amount of the dendrimer. There is also provided use of a dendrimer as defined herein, or of a composition as defined herein, in the manufacture of a medicament for the treatment of cancer.

In some embodiments, the cancer is a solid tumour. The cancer may be a primary or metastatic tumour. In some embodiments the cancer is a primary tumour. In some embodiments the cancer is a metastatic tumour.

In some embodiments, the cancer is a cancer associated with a BRCA1 and/or BRCA2 mutation.

In some embodiments, the cancer is selected from the group consisting of colorectal cancer, gastric cancer, esophageal cancer, pancreatic, cancer, breast cancer, ovarian cancer, prostate cancer, lung cancer and cervical cancer. In some embodiments the cancer is metastatic carcinoma of the colon or rectum. In some embodiments the cancer is metastatic adenocarcinoma of the pancreas. In some embodiments the cancer is metastatic carcinoma of the ovary. In some embodiments the cancer is non-small cell or small cell lung cancer. In some embodiments the cancer is stage IV-B, recurrent, or persistent carcinoma of the cervix. In some embodiments, the cancer is metastatic carcinoma of stomach. In some embodiments the cancer is metastatic carcinoma of esophagus.

In some embodiments, the dendrimer which is used in therapy (e.g., in cancer therapy) has a core which is:

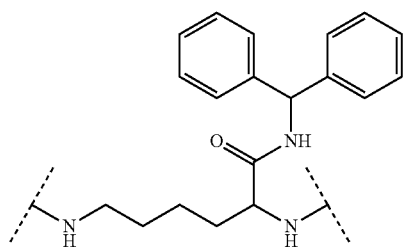

In some embodiments, the dendrimer which is used in therapy (e.g., in cancer therapy) has building units which are each:

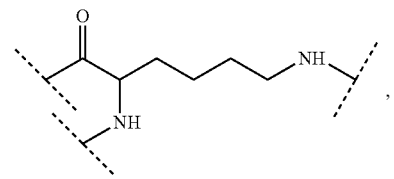

more preferably

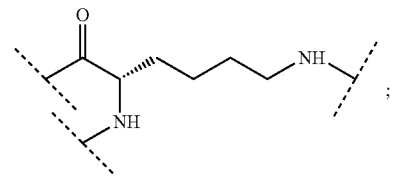

wherein the acyl group of each building unit provides a covalent attachment point for attachment to the core or to a previous generation building unit; and wherein each nitrogen atom provides a covalent attachment point for covalent attachment to a subsequent generation building unit, a first terminal group or a second terminal group.

In some embodiments, the dendrimer which is used in therapy (e.g, in cancer therapy) has first terminal groups (T1) which are each:

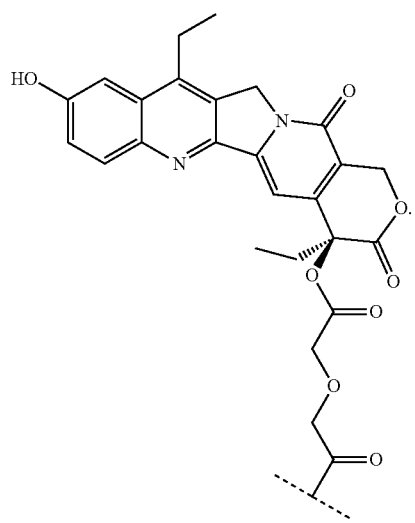

In some embodiments, the dendrimer used in therapy (e.g., in cancer therapy) has second terminal groups which are each

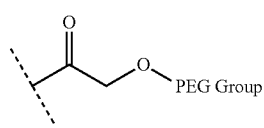

and wherein the PEG group is a methoxy-terminated PEG having a mean molecular weight in the range of from about 1500 to 2500 Daltons.

In some embodiments, the dendrimer used in therapy (e.g., in cancer therapy) has from 26 to 32 first terminal groups, and from 26 to 32 second terminal groups.

In some embodiments, the dendrimer used in therapy (e.g, in cancer therapy) is:

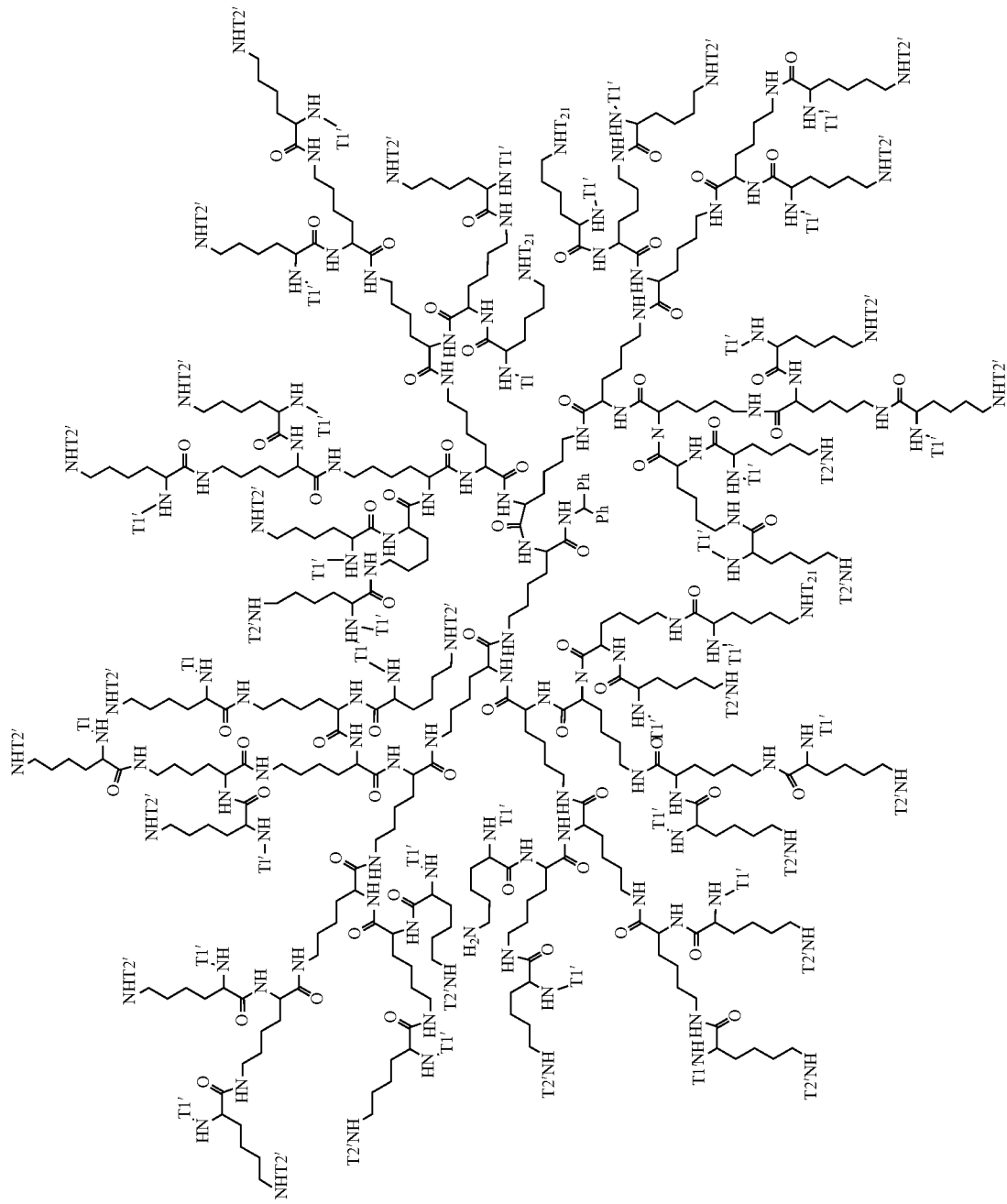

in which T1' represents a first terminal group which is

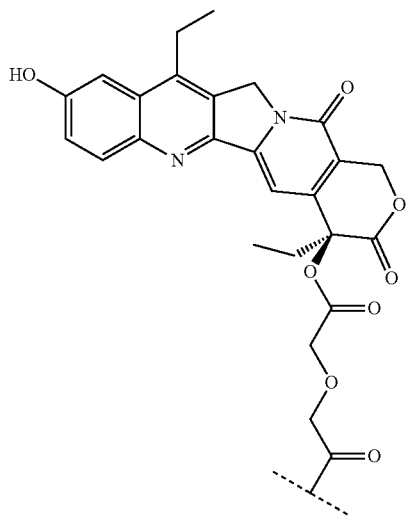

or T1' represents H, wherein less than 5 of T1' are H; and T2' represents a second terminal group which is

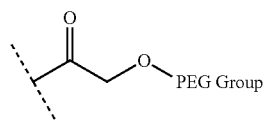

wherein the PEG group is a methoxy-terminated PEG having an average molecular weight in the range of from about 1500 to 2500 Daltons, or T2' represents H, and wherein less than 5 of T2' are H.

In some embodiments, the dendrimer used in therapy (e.g., cancer therapy) is any of the dendrimers described in the Examples below.

Combinations

Drugs are often co-administered with other drugs in combination therapy, especially during chemotherapy. Accordingly, in some embodiments the dendrimer is administered in combination with one or more further pharmaceutically active agents, for example one or more further anti-cancer agents/drugs. The dendrimer and the one or more further pharmaceutically active agents may be administered simultaneously, subsequently or separately. For example, they may be administered as part of the same composition, or by administration of separate compositions. The one or more further pharmaceutically active agents may for example be anti-cancer agents for therapy of colorectal cancer, stomach cancer, pancreas cancer, prostate cancer or breast cancer.

One particular example of a group of further anti-cancer drugs is immunotherapy agents. As would be understood by the person skilled in the art, the phrase 'immunotherapy agent' refers to an agent that directs the immune response to attack tumour cells, thereby improving the immune system's natural ability to fight the disease. In some embodiments, the further pharmaceutically active agent is an immunotherapy agent. Accordingly, in some embodiments, the dendrimer is administered in combination with one or more immunotherapy agents. Cancer cells express tumour antigens, which are detected by antibody proteins in the immune system. While normal antibodies bind to external pathogens, modified immunotherapy agents bind to the tumour antigens and mark them for the immune system to inhibit and/or kill. In some embodiments, the immunotherapy agent is an antibody.

One form of immunotherapy is checkpoint inhibitor therapy. The therapy targets immune checkpoints, which are key regulators of the immune system that when stimulated can dampen the immune response to an immunologic stimulus. Some cancers can protect themselves from attack by stimulating immune checkpoint targets. Checkpoint inhibitor therapy can block inhibitory checkpoints, thereby restoring immune system function. In some embodiments, the immunotherapy targets an immune checkpoint protein. Of the immune checkpoint proteins, programmed cell death protein 1 (PD-1) receptor is expressed on the surface of activated T cells, and its ligands, PD-L1 and PD-L2 are commonly expressed on the surface of dendritic cells or macrophages. Immunotherapy agents that block, or inhibit, the binding of PD-L1 and/or PD-L2 on tumour cells to PD-1 on a T cell prevent the tumour from evading the immune response. In some embodiments, the immunotherapy agent is an agent that binds to PD-1, PD-L1, CTL4, CD52, and/or CD20. In some embodiments, the immunotherapy is a PD-1 inhibitor and/or a PD-L1 inhibitor. In one example, the immunotherapy agent is a PD-1 inhibitor. In one example, the immunotherapy agent is a PD-L1 inhibitor. In one example, the immunotherapy agent is a CTL4 inhibitor. In one example, the immunotherapy agent is a CD52 inhibitor. In one example, the immunotherapy agent is a CD20 inhibitor.

Several PD-1 and PD-L1 inhibitors have been approved for the treatment of various cancers, including:

pembrolizumab (Keytruda®) is approved for melanoma, including advanced melanoma in patients who carry a BRAF mutation, metastatic non-small cell lung cancer, and head and neck squamous cell carcinoma;

nivolumab (Opdivo®) is approved for treatment in inoperable or metastatic melanoma, squamous cell lung cancer, renal cell carcinoma, and Hodgkin's lymphoma;

atezolizumab (Tecentriq®) is approved for the treatment of lung cancer, bladder cancer, small cell lung cancer, and triple-negative breast cancer;

avelumab (Bavencio®) is approved for the treatment of non-small cell lung carcinoma, gastric cancer, Merkel-cell carcinoma, and is currently in clinical trials for the treatment of bladder cancer, stomach cancer, head and neck cancer, mesothelioma, ovarian cancer, and renal cancer;

durvalumab (Imfinzi®) is approved for the treatment of locally advanced or metastatic urothelial carcinoma, and is currently in clinical trials for the treatment of non-small cell lung cancer, advanced metastatic urotherlial bladder cancer, and recurrent head and neck cancer; and cemiplimab (Libtayo®) is approved for the treatment of squamous cell skin cancer, myeloma, lung cancer, and metastatic cutaneous squamous cell carcinoma.

Several PD-1 and PD-L1 inhibitors are being trialled for use in the treatment of various cancers, including spartalizumab, camrelizumab, sintilimab, tislelizumab, and toripalimab. Further, several PD-1 and PD-L1 inhibitors are in the experimental phase of development, including KN035, CK-301, AUNP12, CA-170, and BMS-986189.

Accordingly, in some embodiments, the immunotherapy agent is selected from the group consisting of pembrolizumab, nivolumab, atezolizumab, avelumab, durvalumab, and cemiplimab. In one example, the immunotherapy agent is pembrolizumab. In one example, the immunotherapy agent is nivolumab. In one example, the immunotherapy agent is atezolizumab. In one example, the immunotherapy agent is avelumab. In one example, the immunotherapy agent is durvalumab. In one example, the immunotherapy agent is cemiplimab. The immunotherapy agent may also be a combination of any two or more of the above-mentioned immunotherapy agents. For example, the immunotherapy agent may be a combination of pembrolizumab and nivolumab.

The immunotherapy agent may be administered in accordance with any suitable conventional means. Typically, the immunotherapy agent is administered in accordance with the Product Information for that immunotherapy agent. When used in combination with the dendrimers of the present application, the dosage of the immunotherapy agent may be the same as that for the immunotherapy agent monotherapy, or may be different (e.g., decreased dosage). In some embodiments, the dosage of the immunotherapy agent when used in combination with a dendrimer is the same as that for the immunotherapy agent monotherapy. In some embodiments, the dosage of the immunotherapy agent when used in combination with a dendrimer is different to that for the immunotherapy agent monotherapy (e.g., a lower dosage). The person skilled in the art will appreciate that the dosage of the immunotherapy agent, as well as the relevant dosage regimen/schedule, may be adjusted accordingly.

For example, when administered as an immunotherapy agent monotherapy, pembrolizumab is administered as a 200 mg intravenous infusion over 30 minutes every three weeks. When administered in combination with a dendrimer, the dosage of pembrolizumab may be the same as that for pembrolizumab monotherapy, or the dosage of pembrolizumab may be different to that for pembrolizumab monotherapy.

Accordingly, in some embodiments the dendrimer is administered in combination with any one or more of pembrolizumab, nivolumab, atezolizumab, avelumab, durvalumab, and cemiplimab. In some embodiments, the dendrimer is administered in combination with nivolumab. In some embodiments, the dendrimer is administered in combination with atezolizumab. In some embodiments, the dendrimer is administered in combination with avelumab. In some embodiments, the dendrimer is administered in combination with durvalumab. In some embodiments, the dendrimer is administered in combination with cemiplimab.

In the treatment of cancer, an immunotherapy agent may be administered in combination with radiotherapy. Accordingly, in some embodiments, the dendrimers, or compositions comprising the dendrimers, are administered in combination with an immunotherapy agent (such as pembrolizumab) and in combination with radiotherapy. The radiotherapy may be administered to the patient prior to, simultaneously with, or following the administration of the dendrimer according to the present disclosure.

Another example of a group of further anti-cancer drugs is poly ADP ribose polymerase (PARP) inhibitors. The PARP enzymes are a family of proteins involved in a number of cellular processes, including but not limited to, DNA repair, genomic stability, and programmed cell death. As a consequence, inhibition of PARP enzymes presents as an attractive anticancer target. In some embodiments, the further anti-cancer drug is a PARP inhibitor.

Several PARP inhibitors are presently known, a selection of which have been approved for marketing. For example, olaparib, rucaparib, niraparib and talazoparib have all been approved by the US FDA. Accordingly, in some embodiments, the further anti-cancer drug is olaparib. In some embodiments, the further anti-cancer drug is rucaparib. In some embodiments, the further anti-cancer drug is niraparib. In some embodiments, the further anti-cancer drug is talazoparib.

When administered alone as a chemotherapeutic, olaparib is administered orally as a tablet or capsule comprising 100 mg or 150 mg olaparib. The recommended daily dosage of olaparib is 300 mg taken twice daily, resulting in an equivalent total daily dose of 600 mg. When used in combination with the dendrimers of the present application, the daily dosage of olaparib may be the same as that for olaparib monotherapy, or may be different (e.g., decreased daily dosage). In some embodiments, the daily dosage of olaparib when used in combination with a dendrimer is the same as that for olaparib monotherapy. In some embodiments, the daily dosage of olaparib when used in combination with a dendrimer is different to that for olaparib monotherapy (e.g., a lower dosage). In some embodiments, the daily dosage of olaparib when used in combination with a dendrimer is 600 mg. In some embodiments, the daily dosage of olaparib when used in combination with a dendrimer is about 600 mg. In some embodiments, the daily dosage of olaparib when used in combination with a dendrimer is less than 600 mg. In some embodiments, the daily dosage of olaparib is less than about 600, 500, 400, 300, 200, 100 or 50 mg. In some embodiments, the daily dosage of olaparib is between about 50 and 600 mg, 100 and 600 mg, 200 and 600 mg, or 300 and 600 mg. In some embodiments, the daily dosage of olaparib is between about 300 and 600 mg. In some embodiments, the daily dosage of olaparib is in the range of from 300 to 500 mg, from 300 to 400 mg, from 200 to 500 mg, from 200 to 400 mg, from 200 to 300 mg, from 100 to 500 mg, from 100 to 400 mg, from 100 to 300 mg, or from 100 to 200 mg.

In some embodiments, the daily dosage of olaparib when used in combination with a dendrimer is about 8 mg/kg. In some embodiments, the daily dosage of olaparib when used in combination with a dendrimer is less than 8 mg/kg. In some embodiments, the daily dosage of olaparib is less than about 8, 7, 6, 5, 4, 3 or 2 mg/kg. In some embodiments, the daily dosage of olaparib is between about 2 and 8 mg/kg, 3 and 8 mg/kg, 4 and 8 mg/kg, 5 and 8 mg/kg, 6 and 8 mg/kg, 2 and 7 mg/kg, 3 and 7 mg/kg, 4 and 7 mg/kg, 5 and 7 mg/kg, 2 and 6 mg/kg, 3 and 6 mg/kg, 4 and 6 mg/kg, 2 and 5 mg/kg, 3 and 5 mg/kg, or 2 and 4 mg/kg. The person skilled in the art will appreciate that the daily dosage of olaparib may be adjusted accordingly.

The agents of the combination therapy may involve individual dosage regimens. For example, the dendrimer may require administration at intervals different to those in which the further anti-cancer agent, i.e., the PARP inhibitor (e.g, olaparib) requires administration. In some embodiments, a therapeutically effective amount of the dendrimer is administered to a subject in need thereof at a predetermined frequency. In some embodiments, the dendrimer is administered to a subject in need thereof according to a dosage regimen in which the dendrimer is administered once per one to four weeks. In some embodiments, the dendrimer is administered to a subject in need thereof according to a dosage regimen in which the dendrimer is administered once per three to four weeks. In some embodiments, the PARP inhibitor is administered to a subject in need thereof according to a dosage regimen in which the PARP inhibitor is administered one, two, three, four or five times daily. In some embodiments, the PARP inhibitor is administered one time daily. In some embodiments, the PARP inhibitor is administered two times daily. In some embodiments, the PARP inhibitor is administered three times daily. In some embodiments, the PARP inhibitor is administered on a weekly schedule consisting of 5 days on and 2 days off. In some embodiments, the 2 days off are sequential. In some embodiments, olaparib is administered to a subject in need thereof according to a dosage regimen in which olaparib is administered one, two, or three times daily. In some embodiments, olaparib is administered once daily. In some embodiments, olaparib is administered twice daily. In some embodiments, olaparib is administered three times daily. In some embodiments, olaparib is administered on a weekly schedule consisting of 5 days on and 2 days off. In some embodiments, the 2 days off are sequential.

The PARP inhibitor may be administered according to any conventional means. Further, the PARP inhibitor does not necessarily need to be administered via the same route as the dendrimer. In some embodiments, the PARP inhibitor is administered orally. In some embodiments, the dendrimer is administered intravenously. In some embodiments, the dendrimer is administered intravenously and the PARP inhibitor is administered orally. In some embodiments, olaparib is administered orally. In some embodiments, the dendrimer is administered intravenously and olaparib is administered orally.

Other PARP inhibitors in addition to olaparib, rucaparib, niraparib and talazoparib are known, and the use of such other PARP inhibitors in combination with the dendrimer also forms part of the present disclosure. For example, veliparib, CEP9722, E7016, iniparib, and 3-aminobenzamide, are known PARP inhibitors. In some embodiments, the further anti-cancer drug is veliparib. In some embodiments, the further anti-cancer drug is CEP9722. In some embodiments, the further anti-cancer drug is E7016. In some embodiments, the further anti-cancer drug is iniparib. In some embodiments, the further anti-cancer drug is 3-aminobenzamide.

Olaparib, also known as AZD-2281, MK-7339, and Lynparza®, is an FDA-approved targeted therapy for cancer. It is particularly useful for its use in treating cancers in patients with hereditary BRCA1 or BRCA2 mutations, which cancers include, but are not limited to, some ovarian, breast, and prostate cancers. In some embodiments, the combination of dendrimer and PARP inhibitor (e.g., olaparib) is used in treating cancers associated with BRCA1 mutations. In some embodiments, the combination is used in treating cancers associated with BRCA2 mutations. In some embodiments, the combination is used in treating cancers associated with homologous recombination repair mutation (HRRm) or homologous recombination deficiency (HRD). HRR genes include BRCA1/2, BRIP1, ATM, RAD54L and CDK12. In some embodiments, the combination is used in treating solid tumours. In some embodiments, the combination is used in treating homologous recombination repair mutation (HRRm) or homologous recombination deficiency (HRD) positive (eg HRD score ≥42, Myriad MyChoice HRD) solid cancers. In some embodiments, the combination is used in treating ovarian cancers. In some embodiments, the combination is used in treating breast cancers. In some embodiments, the combination is used in treating prostate cancers. In some embodiments, the combination is used in treating pancreatic cancers. In some embodiments, the combination is used in treating colorectal cancers. In some embodiments, the combination is used in treating gastric cancers. In some embodiments, the combination is used in treating small cell lung or non-small cell lung cancers. In some embodiments, the further anti-cancer drug is olaparib, and the combination is used in the treatment of ovarian cancers. In some embodiments, the further anti-cancer drug is olaparib, and the combination is used in the treatment of breast cancers. In some embodiments, the further anti-cancer drug is olaparib, and the combination is used in the treatment of prostate cancers.

In the treatment of cancer, PARP inhibitors may be administered in combination with radiotherapy. Accordingly, in some embodiments, the dendrimers, or compositions comprising the dendrimers, are administered in combination with a PARP inhibitor (such as olaparib) and in combination with radiotherapy. The radiotherapy may be administered to the patient prior to, simultaneously with, or following the administration of the dendrimer according to the present disclosure.

Examples of further pharmaceutically active agents include, but are not limited to, chemotherapeutic and cytotoxic agents, tyrosine kinase inhibitors, checkpoint inhibitors, EGFR inhibitors and monoclonal antibody therapies. In some embodiments, the EGFR inhibitor is an EGFR antibody. An example of an EFGR antibody is cetuximab. Cetuximab is an anti-epidermal growth factor receptor (EGFR, also known as ErbB-1 or HER-1) antibody. It is indicated for the treatment of patients with EGFR expressing, RAS wild-type metastatic colorectal cancer together with irinotecan and for head and neck squamous cell carcinoma. Other EGFR antibodies, include necitumumab (squamous nSCLC in combination with gemcitabine and cisplatin) and panitumumab. Cetuximab is given at 400 mg/m$^2$ initial dose followed by 250 mg/m$^2$ weekly administered 1 hour prior to irinotecan, platinum-based therapy with fluorouracil or FOLFIRI. Cochrane review (2016) report that patients given cetuximab combined with chemotherapy did not delay further lung cancer spread and did not extend life compared with chemotherapy alone. In first-line setting, the phase III CRYSTAL trial (Cetuximab Combined with Irinotecan in First-Line Therapy for Metastatic Colorectal Cancer) demonstrated that cetuximab improved the standard chemotherapy regimen, in particular reduced the risk of progression (8.9 vs 8 months, HR 0.85; p=0.048), enhanced tumour response (46.9% vs 38.7%, OR 1.40; p=0.004) and radical resection (R0) of metastasis with curative intent (p=0.002). However, OS analysis did not show a statistically significant different between treatments groups (19.9 vs 18.6; HR 0.93, p=0.31). However, the present inventors have demonstrated that, when administered in combination with a camptothecin-containing dendrimer of the present disclosure, the combination of cetuximab and dendrimer provides improved properties in an HT-29 cell mouse xenograft colorectal cancer model in mice. Examples of other EGFR inhibitors include tyrosine kinase inhibitors such as neratinib (HER2+ breast cancer), Osimertinib (T790M+ NSCLC), erlotinib (mPC or NSCLC), gefitinib (NSCLC or metastatic cancers), and lapatinib (HER2+ breast cancer), vandetanib (thyroid cancer) and Dacomitinib (m NSCLC). In some embodiments, the dendrimer is administered in combination with an EGFR inhibitor (e.g, an EGFR antibody, such as cetuximab) and the combination is for treating, e.g., colorectal cancer.

For treating colorectal cancer, the dendrimer may be administered with, for example, 5-fluorouracil and/or and folinic acid, leucovorin, cetuximab, bevacizumab, capecitabine, or platinates, including cisplatin. Examples of further pharmaceutically active agents suitable for various indications include:

temozolomide, anlotinib, cyclophosphamide, niraparib, for Ewing's sarcoma;

anlotinib, ramucirumab, apatinib, cisplatin, rucaparib, for esophageal cancer;

veliparib, DS-8201a, Trastuzumab, for breast cancer;

alisertib, cyclophosphamide, cisplatin, bevacizumab, temozolomide, for neuroblastoma;

enzalutamide, for prostate cancer;

erlotinib for pancreatic cancer.

Dose

It will be appreciated that a therapeutically effective amount refers to a dendrimer being administered in an amount sufficient to alleviate or prevent to some extent one or more of the symptoms of the disorder or condition being treated. A therapeutically effective amount of dendrimer may be referred to based on, for example, the amount of dendrimer administered. Alternatively, it may be determined based on the amount of camptothecin active (e.g, SN-38) which the dendrimer is theoretically capable of delivering, e.g, based on the loading of camptothecin active on the dendrimer.

The dendrimer may be administered by any suitable route, including for example, the dendrimer may be administered intravenously. Irinotecan is normally administered as an IV infusion over 30-90 minutes. In some embodiments, the dendrimer is delivered as an IV bolus. In some embodiments the dendrimer is administered IV over a time a period in the range of from 0.5 minutes to 90 minutes, or in the range from 0.5 minutes to 60 minutes, or in the range of from 0.5 minutes to 15 minutes, or in the range of from 0.5 minutes to 5 minutes. In another example, the dendrimer may be administered intraperitoneally. The route of administration may for example be targeted to the disease or disorder which the subject has. For example, in some embodiments the disease or disorder may be an intra-abdominal malignancy such as a gynecological or gastrointestinal cancer, and the dendrimer may be administered intraperitoneally. In some embodiments the dendrimer may be for treatment of a cancer of the peritoneal cavity, such as a malignant epithelial tumors (e.g., ovarian cancer) or peritoneal carcinomatosis (eg gastrointestinal especially colorectal, gastric, gynecologic cancers, and primary peritoneal neoplasms), and the dendrimer is administered intraperitoneally.

In some embodiments, the amount of dendrimer administered is sufficient to deliver between 2 and 100 mg of active agent/$m^2$, between 2 and 50 mg of active agent/$m^2$, between 2 and 40 mg of active agent/$m^2$, between 2 and 30 mg of active agent/$m^2$, between 2 and 25 mg of active agent/$m^2$, between 2 and 20 mg of active agent/$m^2$, between 5 and 50 mg of active agent/$m^2$, between 10 to 40 mg of active agent/$m^2$ between 15 and 35 mg of active agent/$m^2$, between 10 and 20 mg/$m^2$, between 20 and 30 mg/$m^2$, or between 25 and 35 mg of active agent/$m^2$. A dose of active agent of 10 mg/kg in a mouse should be approximately equivalent to a human dose of 30 mg/$m^2$ (FDA guidance 2005). (To convert human mg/kg dose to mg/$m^2$, the figure may be multiplied by 37, FDA guidance 2005).

In some embodiments, a therapeutically effective amount of the dendrimer is administered to a subject in need thereof at a predetermined frequency. In some embodiments, the dendrimer is administered to a subject in need thereof according to a dosage regimen in which the dendrimer is administered once per one to four weeks. In some embodiments, the dendrimer is administered to a subject in need thereof according to a dosage regimen in which the dendrimer is administered once per three to four weeks.

It has been surprisingly found that a dendrimer of the present disclosure which comprises a residue of a camptothecin active, i.e. SN-38, has increased efficacy in comparison to the direct administration of irinotecan, a clinically approved prodrug of SN-38. Examples of irinotecan therapies include Camptosar® and Onivyde®. As used herein, the terms "unconjugated" and "released" refer to a drug, i.e. camptothecin active, which has dissociated or been cleaved from a dendrimer. This dissociation or cleaving may occur in vivo following administration of the drug-dendrimer conjugate.

As discussed above, the dendrimer may be administered in combination with a further active agent, for example an EGFR inhibitor such as cetuximab, a PARP inhibitor such as olaparib, or an immunotherapy agent such as pembrolizumab. Typically, for such combinations, the dose of each agent which is administered is lower than the dose of monotherapy required to achieve a therapeutic or prophylactic effect. In some embodiments, when administered in combination with cetuximab, the dose of dendrimer is sufficient to deliver between about 2 and about 100 mg of active agent/$m^2$, between about 2 and about 50 mg of active agent/$m^2$, between about 2 and about 40 mg of active agent/$m^2$, between about 2 and about 30 mg of active agent/$m^2$, between about 2 and about 25 mg of active agent/$m^2$, between about 2 and about 20 mg of active agent/$m^2$, between about 5 and about 50 mg of active agent/$m^2$, between about 10 and about 40 mg of active agent/$m^2$, between about 15 and about 35 mg of active agent/$m^2$, between about 10 and about 20 mg/$m^2$, between about 20 and about 30 mg/$m^2$, or between about 25 and about 35 mg of active agent/$m^2$, and the dose of cetuximab is in the range of from about 50 mg/$m^2$ to about 400 mg/$m^2$, for example in the range of from about 50 mg/$m^2$ to about 250 mg/$m^2$, or in the range of from about 50 mg/$m^2$ to about 150 mg/$m^2$. In some embodiments, when olaparib is administered in combination with the dendrimer, the dose of dendrimer is sufficient to deliver between about 2 and about 100 mg of active agent/$m^2$, between about 2 and about 50 mg of active agent/$m^2$, between about 2 and about 40 mg of active agent/$m^2$, between about 2 and about 30 mg of active agent/$m^2$, between about 2 and about 25 mg of active agent/$m^2$, between about 2 and about 20 mg of active agent/$m^2$, between about 5 and about 50 mg of active agent/$m^2$, between about 10 and about 40 mg of active agent/$m^2$, between about 15 and about 35 mg of active agent/$m^2$, between about 10 and about 20 mg/$m^2$, between about 20 and about 30 mg/$m^2$, or between about 25 and about 35 mg of active agent/$m^2$, and/or the dose of olaparib is between about 200 mg/day and about 600 mg/day, between about 400 mg/day and about 600 mg/day, or between about 200 mg/day and about 400 mg/day. In some embodiments, when pembrolizumab is administered in combination with the dendrimer, the dose of dendrimer is sufficient to deliver between about 2 and about 100 mg of active agent/$m^2$, between about 2 and about 50 mg of active agent/$m^2$, between about 2 and about 40 mg of active agent/$m^2$, between about 2 and about 30 mg of active agent/$m^2$, between about 2 and about 25 mg of active agent/$m^2$, between about 2 and about 20 mg of active agent/$m^2$, between about 5 and about 50 mg of active agent/$m^2$, between about 10 and about 40 mg of active agent/$m^2$, between about 15 and about 35 mg of active agent/$m^2$, between about 10 and about 20 mg/$m^2$, between about 20 and about 30 mg/$m^2$, or between about 25 and about 35 mg of active agent/$m^2$, and/or the dose of pembrolizumab is between about 100 mg/day and about 400 mg/day, or between about 100 mg/day and about 200 mg/day.

When the dendrimer is administered in combination, e.g., with an EGFR inhibitor such as cetuximab, with a PARP inhibitor such as olaparib, or an immunotherapy agent such as pembrolizumab, it may for example be administered sequentially. In some embodiments, the further therapeutic agent (e.g, an EGFR inhibitor such as cetuximab, a PARP inhibitor such as olaparib, or an immunotherapy agent such as pembrolizumab), is administered before the dendrimer is administered. For example, it may be administered at least 15 minutes, at least 30 minutes, at least 45 minutes beforehand. It may for example be administered no more than 24 hours, no more than 12 hours, no more than 6 hours, no more than 3 hours, no more than 2 hours, or no more than 90 minutes beforehand. In some embodiments, the further therapeutic agent (e.g, an EGFR inhibitor such as cetuximab, a PARP inhibitor such as olaparib, or an immunotherapy agent such as pembrolizumab) is administered about 1 hour prior to administration of the dendrimer.

Pharmacokinetics, Efficacy and Side Effects

In some embodiments, the dendrimers of the present disclosure provide one or more of increased therapeutic drug exposure (AUC), an increased half-life ($t_{1/2}$), an increased $T_{max}$, a decreased $C_{max}$, and/or reduced toxicity, in comparison to administration of an equivalent amount of the unconjugated (e.g, "free") drug. By way of example, topotecan is a camptothecin active having the following structure:

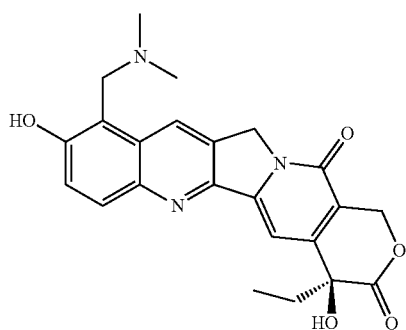 [SMILES: CC[C@@]1(O)C(=O)OCc2c1cc1n(c2=O)Cc2cc3c(CN(C)C)c(O)ccc3nc2-1]

and which has been approved for treatment of ovarian cancer and lung cancer under the trade name Hycamtin®. Comparisons may for example be made following administration of a dendrimer comprising topotecan as the camptothecin active, and following administration of an equivalent amount of unconjugated drug (e.g, of Hycamtin®). The term "equivalent amount" in this context refers to administration of a dose of dendrimer which, if all camptothecin active present as part of the dendrimer were released, would provide the same number of moles of camptothecin active as in a dose of unconjugated drug being administered.

In some embodiments, the dendrimers of the present disclosure provide one or more of increased therapeutic drug exposure (AUC), an increased half-life ($t_{1/2}$), an increased $T_{max}$, a decreased $C_{max}$, and/or reduced toxicity, in comparison to administration of an equivalent amount of a small molecule prodrug form of the unconjugated drug. For example, as discussed above, irinotecan is a prodrug of the camptothecin active SN-38. Comparisons may for example be made following administration of a dendrimer comprising SN-38 as the camptothecin active, and following administration of an equivalent amount of irinotecan (e.g., of Camptosar®). The term "equivalent amount" in this context refers to administration of a dose of dendrimer which, if all SN-38 present as part of the dendrimer were released, would provide the same number of moles of free SN-38 as would be provided by a dose of irinotecan, assuming all of the irinotecan prodrug was cleaved to SN-38.

In some embodiments, the dendrimers of the present disclosure comprise a residue of SN-38, and provide one or more of increased therapeutic drug exposure (AUC), an increased half-life ($t_{1/2}$), an increased $T_{max}$, a decreased $C_{max}$, and/or reduced toxicity of free SN-38, in comparison to administration of an equivalent dose of irinotecan.

In some embodiments, the dendrimers of the present disclosure comprise a residue of SN-38, and provide one or more of increased therapeutic drug exposure (AUC), an increased half-life ($t_{1/2}$), an increased $T_{max}$, a decreased $C_{max}$, and/or reduced toxicity of free SN-38, in comparison to administration of an equivalent dose of SN-38 e.g., of free SN-38). In some embodiments, the dendrimer comprises a residue of SN-38, and is administered in an amount of dendrimer which contains an equivalent or greater amount of SN-38 compared to the amount of SN-38 provided by administration of the maximum tolerated dose of irinotecan, and provide one or more of increased therapeutic drug exposure (AUC), an increased half-life ($t_{1/2}$), an increased $T_{max}$, a decreased $C_{max}$, and/or reduced toxicity of free SN-38, in comparison to administration of an equivalent maximum tolerated dose of irinotecan.

In some embodiments, the dendrimer comprises a residue of SN-38, and is administered in an amount of dendrimer which contains an equivalent or lesser amount of SN-38 compared to the amount of SN-38 provided by administration of the maximum tolerated dose of irinotecan, and provide one or more of increased therapeutic drug exposure (AUC), an increased half-life ($t_{1/2}$), an increased $T_{max}$, a decreased $C_{max}$, and/or reduced toxicity of free SN-38, in comparison to administration of an equivalent maximum tolerated dose of irinotecan.

In some embodiments, the dendrimer comprises a residue of SN-38, and is administered in an amount of dendrimer which contains an equivalent or greater amount of SN-38 compared to the maximum tolerated dose of SN-38, and provide one or more of increased therapeutic drug exposure (AUC), an increased half-life ($t_{1/2}$), an increased $T_{max}$, a decreased $C_{max}$, and/or reduced toxicity of free SN-38, in comparison to administration of an equivalent maximum tolerated dose of SN-38.

In some embodiments, the dendrimer comprises a residue of SN-38, and is administered in an amount of dendrimer which contains an equivalent or lesser amount of SN-38 compared to the maximum tolerated dose of SN-38, and provide one or more of increased therapeutic drug exposure (AUC), an increased half-life ($t_{1/2}$), an increased $T_{max}$, a decreased $C_{max}$, and/or reduced toxicity of free SN-38, in comparison to administration of an equivalent maximum tolerated dose of SN-38.

In some embodiments, administration of the dendrimer provides at least two times the therapeutic drug exposure (AUC) of free camptothecin active, in comparison to the direct administration of an equivalent dose of camptothecin active (e.g., free camptothecin active).

In some embodiments, the dendrimer comprises a residue of SN-38, and administration of the dendrimer provides at least two times the therapeutic drug exposure (AUC) of free SN-38, in comparison to the direct administration of an equivalent dose of irinotecan.

In some embodiments, the dendrimer comprises SN-38, and is administered in an amount which provides at least two times the therapeutic drug exposure (AUC) of free SN-38, in comparison to administration of an equivalent amount of irinotecan administered at its maximum tolerated dose.

In some embodiments, the dendrimer comprises SN-38, and is administered in an amount which provides at least two times the therapeutic drug exposure (AUC) of free SN-38, in comparison to administration of an equivalent amount of SN-38 administered at its maximum tolerated dose.

The beneficial properties of the dendrimer, which release free SN-38 gradually over time, allow for therapeutically effective concentrations of active to be sustained over a long period but without having a high $C_{max}$. This means that the dendrimers typically have an improved side effect/toxicity profile compared with administration of an equivalent amount of SN-38 or irinotecan itself, and may permit dosing of dendrimer in amounts which contain a greater amount of camptothecin active (e.g., SN-38) bound to the dendrimer, than that provided by administering the maximum tolerated dose of SN-38 or irinotecan.

Oncology drugs often have significant side effects that are due to systemic toxicity such as hematologic toxicity, neurological toxicity, cardiotoxicity, hepatotoxicity, nephrotoxicity, ototoxicity and gastrointestinal toxicity. For example, camptothecins such as irinotecan may cause adverse effects such as: diarrhoea, myelosuppression, neutropenia, neutropenic fever, neutropenic infection, leukopenia, thrombocytopenia, lymphopenia, hypersensitivity, renal impairment, renal failure, pulmonary toxicity (dyspnea, cough, pneumonia, interstitial lung disease), teratogenicity, nausea, vomiting, dehydration, abdominal pain, septic shock, constipation, anorexia, mucositis, anemia, asthenia, pain, fever, infection, dizziness, somnolence, confusion, vasodilatation, hypotension, thromboembolic events, abnormal bilirubin, rash, alopecia or decreasing body weight.

In some embodiments, administration of the dendrimer provides a reduced incidence of a side effect and/or toxicity in comparison to administration of an equivalent dose of free camptothecin active. In some embodiments, the side effect is diarrhoea, and/or vomiting/nausea, and/or myelosuppression.

In some embodiments, the camptothecin active is a residue of SN-38, and administration of the dendrimer provides reduced incidence of a side effect and/or toxicity in comparison to administration of an equivalent dose of irinotecan. In some embodiments, the side effect is diarrhoea and/or myelosuppression.

The toxicity of a drug refers to the degree to which damage is caused to the organism and is measured by its effect off target. In oncology, one such measurement of toxicity in animal models is weight loss, which determines the maximum tolerated dose (MTD). In humans, toxicity is commonly determined by specified adverse events (AE), which typically identify the dose limiting toxicity. It will be appreciated that usually in oncology, there is a narrow therapeutic window and off-target toxicities are considered a normal side effect of killing tumour cells.

In some embodiments, administration of the dendrimer provides reduced toxicity in comparison to administration of an equivalent dose of free camptothecin active when used in a method of treatment of cancer, such as colorectal cancer, pancreatic, cancer, breast cancer, ovarian cancer, prostate cancer, lung cancer or cervical cancer. In some embodiments, the camptothecin active is SN-38, and administration of the dendrimer provides reduced toxicity in comparison to administration of an equivalent dose of irinotecan when used in a method of treatment of cancer, such as colorectal cancer, pancreatic, cancer, breast cancer, ovarian cancer, prostate cancer, lung cancer or cervical cancer.

In some embodiments, the dendrimer provides a reduction in toxicity as measured by the number of patients having a specified AE (e.g., diarrhoea, myelosuppression, neutropenia, neutropenic fever, neutropenic infection, leukopenia, thrombocytopenia, lymphopenia, hypersensitivity, renal impairment, renal failure, pulmonary toxicity (dyspnea, cough, pneumonia, interstitial lung disease), teratogenicity, nausea, vomiting, dehydration, abdominal pain, septic shock, constipation, anorexia, mucositis, anemia, asthenia, pain, fever, infection, dizziness, somnolence, confusion, vasodilatation, hypotension, thromboembolic events, abnormal bilirubin, rash, alopecia or decreasing body weight) by at least 10%, at least 20%, at least 30%, at least 40%, at least 50%, at least 60%, at least 70%, at least 80%, or at least 90%, in comparison to the direct administration of an equivalent dose of free camptothecin active or a reduction in the severity of an AE as measured by a reduction in the grade (Common Terminology Criteria for Adverse Events, "CTCAE") of the AE in at least 10%, at least 20%, at least 30%, at least 40%, at least 50%, at least 60%, at least 70%, at least 80%, or at least 90% of the patient population, in comparison to the direct administration of an equivalent dose of free camptothecin active.

In some embodiments, administration of the dendrimer provides less than 95%, less than 90%, less than 80%, less than 70%, less than 60%, less than 50%, less than 40%, less than 30%, less than 20%, or less than 10% of a toxicity in comparison to the direct administration of an equivalent dose of free camptothecin active, or a reduction in the severity of a toxicity in at least 10%, at least 20%, at least 30%, at least 40%, at least 50%, at least 60%, at least 70%, at least 80%, or at least 90% of the patient population, in comparison to the direct administration of an equivalent dose of free camptothecin active.

In some embodiments, the residue of a camptothecin active is a residue of SN-38, and the dendrimer provides a reduction in a toxicity as measured by the number of patients having a specified AE (e.g., diarrhoea, myelosuppression, neutropenia, neutropenic fever, neutropenic infection, leukopenia, thrombocytopenia, lymphopenia, hypersensitivity, renal impairment, renal failure, pulmonary toxicity (dyspnea, cough, pneumonia, interstitial lung disease), teratogenicity, nausea, vomiting, dehydration, abdominal pain, septic shock, constipation, anorexia, mucositis, anemia, asthenia, pain, fever, infection, dizziness, somnolence, confusion, vasodilatation, hypotension, thromboembolic events, abnormal bilirubin, rash, alopecia or decreasing body weight) by at least 10%, at least 20%, at least 30%, at least 40%, at least 50%, at least 60%, at least 70%, at least 80%, or at least 90%, in comparison to the direct administration of an equivalent dose of irinotecan, or a reduction in the severity of an AE as measured a reduction in the grade of the AE in at least 10%, at least 20%, at least 30%, at least 40%, at least 50%, at least 60%, at least 70%, at least 80%, or at least 90% of the patient population, in comparison to the direct administration of an equivalent dose of irinotecan.

In some embodiments, the residue of a camptothecin active is a residue of SN-38, and administration of the dendrimer provides less than 95%, less than 90%, less than 80%, less than 70%, less than 60%, less than 50%, less than 40%, less than 30%, less than 20%, or less than 10% of the incidence of a toxicity (e.g., diarrhoea, myelosuppression, neutropenia, neutropenic fever, neutropenic infection, leukopenia, thrombocytopenia, lymphopenia, hypersensitivity, renal impairment, renal failure, pulmonary toxicity (dyspnea, cough, pneumonia, interstitial lung disease), teratogenicity, nausea, vomiting, dehydration, abdominal pain, septic shock, constipation, anorexia, mucositis, anemia, asthenia, pain, fever, infection, dizziness, somnolence, confusion, vasodilatation, hypotension, thromboembolic events, abnormal bilirubin, rash, alopecia or decreasing body weight) in comparison to the direct administration of an equivalent dose of irinotecan.

A significant problem associated with the clinical use of irinotecan is its tendency to cause gastrointestinal toxicity. Frequent and often severe gastrointestinal toxicities, particularly diarrhea, have limited its more widespread use. Early symptoms of gastrointestinal toxicity include diarrhea, emesis, diaphoresis, and abdominal cramping. In fact, such symptoms have been reported in up to 80% of patients to which irinotecan is administered. The complex pharmacology and metabolism of irinotecan is believed responsible for the associated gastrointestinal toxicity. It is believed that irinotecan, a prodrug, is converted to its active form, SN-38, by carboxyl-esterases, which in humans are found predominantly in the liver. SN-38 is subsequently glucuronidated by hepatic uridine diphosphate glucuronosyltransferase-1A1 (UDP-GT 1A1) to SN-38-glucuronide (SN-38G). Both SN-38 and SN-38G are excreted via urine and bile. SN-38G, once in the intestinal lumen, is deconjugated by bacterial beta-glucuronidase back to SN-38. The free intestinal luminal SN-38, either from bile or SN-38G deconjugation, is considered to be responsible for irinotecan-induced diarrhea.

The use of the dendrimers containing a camptothecin active (e.g., SN-38), as described herein, may avoid gastrointestinal toxicity, or reduce the incidence of gastrointestinal toxicity in comparison to direct administration of irinotecan. This may be as a result of the ester being cleaved to release the free drug (i.e., SN-38), which may occur more predominantly outside of the liver, thus avoiding or reducing the tendency for biliary excretion.

Accordingly, in some embodiments, the residue of a camptothecin active is a residue of SN-38, and administration of the dendrimer provides a reduction in gastrointestinal toxicity and/or associated side-effects in comparison to the direct administration of an equivalent dose of free camptothecin active (e.g., irinotecan). In one example, the residue of a camptothecin active is a residue of SN-38, and administration of the dendrimer provides a reduction in gastrointestinal toxicity and/or associated side-effects as measured by the number of patients having gastrointestinal toxicity and/or associated side-effect, in comparison to the direct administration of an equivalent dose of free camptothecin active (e.g, irinotecan). In one example, the residue of a camptothecin active is a residue of SN-38, and administration of the dendrimer provides a reduction in gastrointestinal toxicity and/or associated side-effects in at least 5%, or at last 10%, or at least 20%, or at least 30%, or at least 40%, or at least 50%, or at least 60%, or at least 70%, or at least 80%, or at least 90% of patients, in comparison to the direct administration of an equivalent dose of free camptothecin active (e.g, irinotecan). In one example, the residue of a camptothecin active is a residue of SN-38, and administration of the dendrimer provides a reduction in a gastrointestinal toxicity symptom and/or associated side-effect selected from the group consisting of acute diarrhea, delayed diarrhea, emesis, diaphoresis, and abdominal cramping. In one example, the residue of a camptothecin active is a residue of SN-38, and administration of the dendrimer provides a reduction in a gastrointestinal toxicity symptom and/or associated side-effect selected from the group consisting of acute diarrhea, delayed diarrhea, emesis, diaphoresis, and abdominal cramping in at least 5%, or at last 10%, or at least 20%, or at least 30%, or at least 40%, or at least 50%, or at least 60%, or at least 70%, or at least 80%, or at least 90% of patients, in comparison to the direct administration of an equivalent dose of free camptothecin active (e.g, irinotecan). In one example, the residue of a camptothecin active is a residue of SN-38, and administration of the dendrimer provides a reduction in acute diarrhea in comparison to the direct administration of an equivalent dose of free camptothecin active (e.g, irinotecan). In one example, the residue of a camptothecin active is a residue of SN-38, and administration of the dendrimer provides a reduction in delayed diarrhea in comparison to the direct administration of an equivalent dose of free camptothecin active (e.g, irinotecan). In one example, the residue of a camptothecin active is a residue of SN-38, and administration of the dendrimer provides a reduction in emesis in comparison to the direct administration of an equivalent dose of free camptothecin active (e.g., irinotecan). In one example, the residue of a camptothecin active is a residue of SN-38, and administration of the dendrimer provides a reduction in diaphoresis in comparison to the direct administration of an equivalent dose of free camptothecin active (e.g., irinotecan). In one example, the residue of a camptothecin active is a residue of SN-38, and administration of the dendrimer provides a reduction in abdominal cramping in comparison to the direct administration of an equivalent dose of free camptothecin active (e.g, irinotecan).

The dendrimers of the present disclosure surprisingly achieve a sustained pharmacokinetic profile for unconjugated or released drug, resulting in a significantly increased AUC compared to an equivalent or normalised quantity of free drug. This sustained pharmacokinetic profile, and the associated increased released/unconjugated camptothecin active AUC indicates that the drug will be present in vivo at therapeutically effective levels for longer periods of time. It will be appreciated that exposure to the drug for a longer period of time is desirable as it may prolong the therapeutic effect of the drug and allow for reduced frequency of dosing. In some embodiments, the dendrimer provides increased therapeutic drug exposure/area under the curve (AUC) of camptothecin active in comparison to direct administration of an equivalent dose of free camptothecin active. In some embodiments, the residue of a camptothecin active is a residue of SN-38, and the dendrimer provides increased therapeutic drug exposure/area under the curve (AUC) of SN-38 in comparison to direct administration of an equivalent dose of irinotecan. AUC is the area under the curve in a plot of drug concentration in blood plasma versus time. The AUC represents the total drug exposure over time. It would be appreciated that the AUC is normally proportional to the total amount of drug delivered to the body. In some embodiments, the dendrimer achieves a more sustained in vivo pharmcokinetic profile for concentration levels of released SN-38, in comparison to the pharmacokinetic profile for concentration levels of SN-38 achieved on administration of an equivalent dose of free irinotecan.

In some embodiments, the dendrimer provides increased therapeutic drug exposure/area under the curve (AUC) of camptothecin active in comparison to direct administration of an equivalent dose of free camptothecin active. In some embodiments, the residue of camptothecin active is a residue of SN-38, and the dendrimer provides increased therapeutic drug exposure/area under the curve (AUC) of SN-38 in comparison to direct administration of an equivalent dose of irinotecan. In some embodiments, administration of the dendrimer provides at least 1.5 times, at least 2 times, at least 2.5 times, at least 3 times, at least 3.5 times, at least 4 times, at least 5 times, at least 10 times, or at least 15 times, the therapeutic drug exposure (AUC) of camptothecin active in comparison to the direct administration of an equivalent dose of free camptothecin active. In some embodiments, the residue of camptothecin is a residue of SN-38, and administration of the dendrimer provides at least 100, at least 200 ng/h/mL, at least 300 ng/h/mL, at least 400 ng/h/mL, at least 500 ng/h/mL, at least 600 ng/h/mL, at least 700 ng/h/mL, at least 800 ng/h/mL, at least 900 ng/h/mL, at least 1000 ng/h/mL, at least 2000 ng/h/mL, at least 3000 ng/h/mL, at least 5000 ng/h/mL, or at least 10000 ng/h/mL of free SN-38. In some embodiments, the residue of camptothecin is a residue of SN-38, and administration of the dendrimer provides between about 100 ng/h/mL and about 10000 ng/h/mL, or between about 1000 ng/h/mL and about 10000 ng/h/mL, or between about 2000 ng/h/mL and about 5000 ng/h/mL of free SN-38.

Example dendrimers of the present disclosure can release camptothecin active so as to achieve therapeutically effective concentrations of the active in vivo for sustained periods of time, without achieving high $C_{max}$ levels, thus reducing the likelihood of AEs.

The maximal concentration ($C_{max}$) of drug is the maximum (or peak) serum concentration that a drug achieves in a specified compartment or test area of the body after the drug has been administered and before the administration of a second dose. It will be appreciated that, whilst it is important to be able to dose a pharmaceutical agent at a level sufficient to achieve therapeutic concentration levels, if the maximum concentration levels reached are high, the risk of encountering off-target effects, side-effects and toxicity increase. This is particularly an issue for compounds which have a short half-life, since in such cases, in order to provide therapeutically effective levels of the active agent for a prolonged period of time, it may be necessary to increase the dose and thus the $C_{max}$ such that the likelihood of side-effects increases. Accordingly, it is highly desirable to be able to deliver a pharmaceutically active agent in a form which provides therapeutically effective levels for a sustained period of time, whilst at the same time avoiding dosing at levels that achieve very high maximum concentrations ($C_{max}$) in vivo.

In some embodiments, the dendrimers of the present disclosure comprise a residue of SN-38, and provide a reduced $C_{max}$ of free SN-38 in comparison to administration of an equivalent dose of SN-38. In some embodiments, the dendrimers of the present disclosure comprise a residue of SN-38, and provide a reduced $C_{max}$ of free SN-38 in comparison to administration of an equivalent dose of irinotecan. In some embodiments, the dendrimers of the present disclosure comprise a residue of SN-38, and provide less than 0.8 times, less than 0.75 times, less than 0.5 times the $C_{max}$ of free SN-38, in comparison to administration of an equivalent dose of SN-38. In some embodiments, the residue of camptothecin is a residue of SN-38, and administration of the dendrimer provides less than about 50 ng/mL, less than about 40 ng/mL, or less than about 30 ng/mL of free SN-38.

As discussed above, a dendrimer according to the present disclosure has been shown to have sustained exposure when administered in vivo. In some embodiments, the observed pharmacokinetic profile for camptothecin active released from the dendrimer has an increased terminal phase half-life ($t_{1/2}$) in comparison to the direct administration of an equivalent dose of free camptothecin active. In some embodiments, the residue of a camptothecin active is SN-38, and SN-38 released from the dendrimer has an increased terminal phase half-life ($t_{1/2}$) in comparison to the direct administration of an equivalent dose of irinotecan. In some embodiments, the dendrimers of the present disclosure comprise a residue of SN-38, and provide at least 2 times, at least 2.5 times, at least 3 times, at least 3.5 times, at least 4 times, at least 5 times, at least 10 times, or at least 15 times, the $t_{1/2}$ of free SN-38, in comparison to administration of an equivalent dose of SN-38. The half-life of a drug is the time it takes for the blood plasma concentration of the drug to halve. It will be appreciated that an increased (i.e., longer) half-life may be desirable since it results in exposure to therapeutically effective concentrations of drug for a longer period of time. It also results in the need for less frequent dosing. In some embodiments, the residue of camptothecin is a residue of SN-38, and administration of the dendrimer results in a pharmacokinetic profile for free SN-38 (i.e. SN-38 which has been released from the dendrimer) having a $t_{1/2}$ of least about 5 hours, at least about 10 hours, at least about 20 hours, at least about 25 hours, or at least about 30 hours. In some embodiments, the residue of camptothecin is a residue of SN-38, and administration of the dendrimer provides a pharmacokinetic profile for free SN-38 having a $T_{max}$ of at least about 0.5 hour, at least about 1 hour, at least about 2 hours, at least about 5 hours, at least about 10 hours.

In some embodiments, camptothecin active released from the dendrimer has an increased terminal phase half-life ($t_{1/2}$) in comparison to the direct administration of an equivalent dose of free camptothecin active when used in a method of treatment of cancer, such as colorectal cancer, gastric cancer, esophageal cancer, pancreatic cancer, breast cancer, ovarian cancer, prostate cancer, lung cancer or cervical cancer.

In some embodiments, the residue of a camptothecin active is SN-38, and SN-38 released from the dendrimer has an increased terminal phase half-life ($t_{1/2}$) in comparison to the direct administration of an equivalent dose of irinotecan when used in a method of treatment of cancer, such as colorectal cancer, gastric cancer, esophageal cancer, pancreatic cancer, breast cancer, ovarian cancer, prostate cancer, lung cancer or cervical cancer.

It will be appreciated that any one or more of improved therapeutic drug exposure (AUC), an increased half-life ($t_{1/2}$), and reduced toxicity of the drug, may provide better clinical efficacy in comparison to the direct administration of the free drug. In some embodiments, administration of the dendrimer provides enhanced clinical efficacy in comparison to administration of an equivalent dose of free camptothecin active. In some embodiments, the residue of a camptothecin active is a residue of SN-38, and administration of the dendrimer provides enhanced clinical efficacy in comparison to administration of an equivalent dose of irinotecan. In some embodiments, the dendrimer provides an improved efficacy property selected from the group consisting of progression free survival, time to progression, objective response rate (PR+CR), overall response rate, overall survival and duration of response, in comparison to direct administration of an equivalent dose of free camptothecin active. In some embodiments the residue of a camptothecin active is a residue of SN-38, and the dendrimer provides an improved efficacy property selected from the group consisting of progression free survival, time to progression, objective response rate (PR+CR), overall response rate, overall survival and duration of response, in comparison to direct administration of an equivalent dose of irinotecan.

Dendrimer Synthesis

The dendrimers of the present disclosure may be prepared by any suitable method, for example by reacting a camptothecin active intermediate with a dendrimeric intermediate already containing a PEG or PEOX group to introduce the pharmaceutically active agent, or by reacting an intermediate comprising the residue of a lysine group, a camptothecin active residue and a PEG or PEOX group with a dendrimeric intermediate. Accordingly, in a fifth aspect there is provided a process for producing a dendrimer as defined herein, comprising:

a)

a1) reacting a camptothecin active intermediate which is:

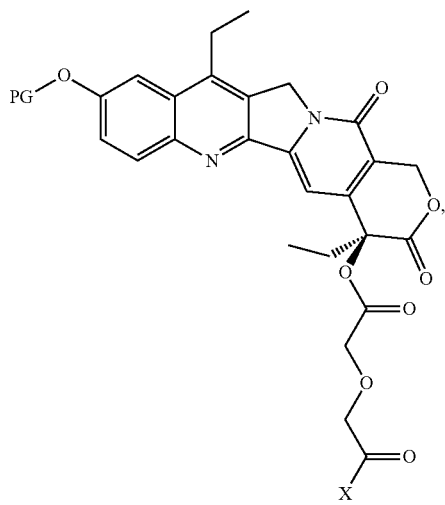

wherein X is —OH or a leaving group, or wherein X together with the C(O) group to which it is attached forms a carboxylate salt; and wherein PG is a protecting group;

with a dendrimeric intermediate which comprises:

i) a core unit (C); and ii) building units (BU), each building unit being a lysine residue or an analogue thereof;

wherein the core unit is covalently attached to two building units via amide linkages, each amide linkage being formed between a nitrogen atom present in the core unit and the carbon atom of an acyl group present in a building unit;

the dendrimer being a five generation building unit dendrimer;

wherein building units of different generations are covalently attached to one another via amide linkages formed between a nitrogen atom present in one building unit and the carbon atom of an acyl group present in another building unit;

the dendrimer further comprising:

a plurality of second terminal groups (T2) each comprising a PEG or PEOX group;

wherein at least one half of the outer building units have one nitrogen atom covalently attached to a second terminal group, and have one unsubstituted nitrogen atom available for reaction with the first intermediate;

or a salt thereof;

under amide coupling conditions; and a2) subjecting the product of step a1) to deprotection conditions to remove protecting group PG, or b)

b1) reacting a surface unit intermediate which is:

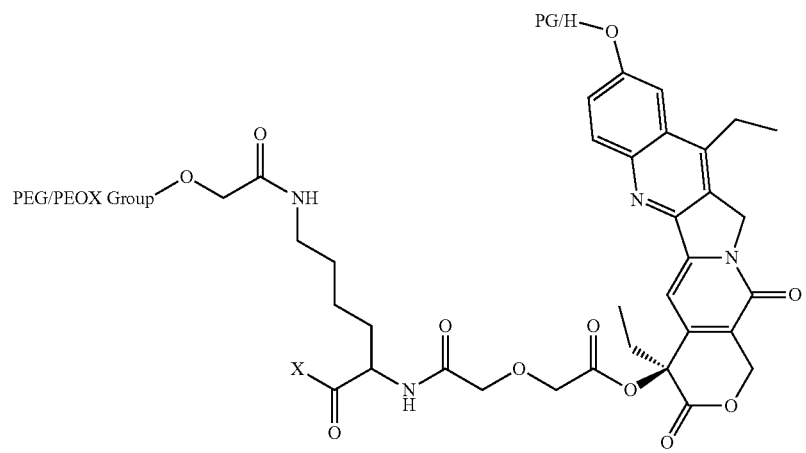

wherein PEG Group is a PEG-containing group, and PEOX Group is a PEOX containing group;

X is —OH or a leaving group, or wherein X together with the C(O) group to which it is attached forms a carboxylate salt; and wherein PG is a protecting group;

with a dendrimeric intermediate comprising:
i) a core unit (C); and
ii) building units (BU), each building unit being a lysine residue or an analogue thereof;

wherein the core unit is covalently attached to two building units via amide linkages, each amide linkage being formed between a nitrogen atom present in the core unit and the carbon atom of an acyl group present in a building unit;

the dendrimeric intermediate being a four generation building unit dendrimeric intermediate;

wherein building units of different generations are covalently attached to one another via amide linkages formed between a nitrogen atom present in one building unit and the carbon atom of an acyl group present in another building unit;

and wherein nitrogen atoms present in the outer building units of the dendrimeric intermediate are unsubstituted;

or a salt thereof;

under amide coupling conditions; and b2) where the surface unit intermediate comprises a protecting group PG, subjecting the product of step b1) to deprotection conditions to remove PG.

Process variants a) and b) involve formation of amide bonds by reaction of —C(O)X groups with amine groups present in the dendrimeric intermediates. Any suitable amide formation conditions may be used. Examples of typical conditions include the use of a suitable solvent (for example dimethylformamide) optionally a suitable base, and at a suitable temperature (for example ambient temperature, e.g., in the range of from 15 to 30° C.). Where X is a leaving group, any suitable leaving group may be used, for example an activated ester. Where X is an —OH group or where X together with the C(O) group to which it is attached forms a carboxylate salt, the group will typically be converted to a suitable leaving group prior to reaction with a dendrimeric intermediate, for example by use of a suitable amide coupling reagent such as PyBOP.

Where a protecting group PG is used, any suitable group may be utilised which is inert or substantially inert to the reaction conditions of step a1) or b1), but which can subsequently be removed under mild reaction conditions that do not result in significant levels of side-reactions occurring to the dendrimeric structure, i.e. so that good yields of the final dendrimer can be obtained. Protecting groups are known in the art, and examples include, for a hydroxyl group, a silyl ether such as TBDMS or TBDPS, an acid-labile ether protecting group such as a THP or MOM group, or a reducible ether protecting group such as a benzyl group.

Any suitable isolation and/or purification technique may be utilised, for example the dendrimer may be obtained by dissolution in a suitable solvent (e.g, THF) and precipitation by addition into an antisolvent (e.g, MTBE).

The camptothecin active intermediate used in variant a) may itself be obtained, for example, by reaction of camptothecin active (e.g, in protected form) with diglycolic anhydride.

The surface unit intermediate used in variant b) may itself be obtained, for example, by:
i) reacting a PEG or PEOX intermediate which is:

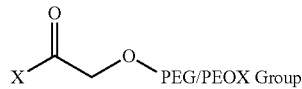

wherein PEG Group is a PEG-containing group and PEOX is a PEOX-containing group, and
X is —OH or a leaving group, or wherein X together with the C(O) group to which it is attached forms a carboxylate salt;
with

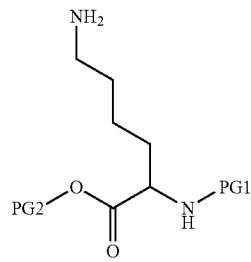

wherein PG1 is an amine protecting group (such as a Boc or Cbz group), and PG2 is an acid protecting group (such as a methyl or benzyl ester);
ii) deprotecting PG1;
iii) reacting the product of step ii) with a camptothecin active intermediate which is:

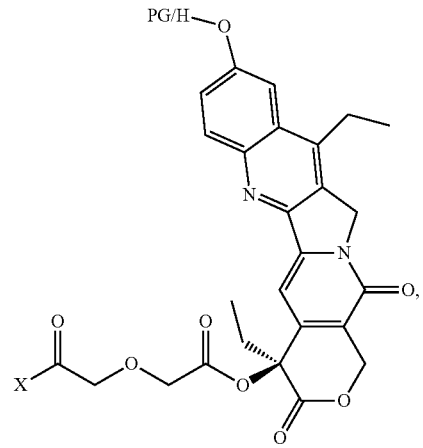

wherein X is —OH or a leaving group, or wherein X together with the C(O) group to which it is attached forms a carboxylate salt; and
iv) deprotecting PG2.

The dendrimeric intermediate used in variant a) may itself be obtained by, for example, a sequential process involving:
i) reaction of a core unit (C) containing amino groups, with building units which are protected lysines or analogues thereof, which contain a —C(O)X group, wherein X is —OH or a leaving group or —CO(X) forms a carboxylate salt, and in which the amino groups present in the lysines or analogues thereof are protected, to form amide linkages between the core unit and building units;

ii) deprotecting protecting groups present on the building units;
iii) reacting free amino groups present on the building units with further building units which are protected lysines or analogues thereof, which contain a —C(O)X group, wherein X is —OH or a leaving group or —CO(X) forms a carboxylate salt, and in which the amino groups present in the lysines or analogues thereof are protected, to form amide linkages between the different generations of building units;
iv) deprotecting protecting groups present on the building units;
v) repeating steps iii) and iv) until a four generation building unit is produced;
vi) reacting free amino groups present on the building units with

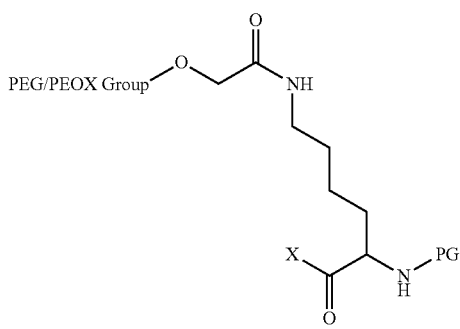

wherein PG is a protecting group, and wherein X is —OH or a leaving group, or wherein X together with the C(O) group to which it is attached forms a carboxylate salt, to form amide linkages therebetween; and
vii) deprotecting the protecting groups PG.

Alternatively, the dendrimeric intermediate used in variant a) may be obtained, for example, by carrying out steps i) to v) as described above, and:
vi) reacting free amino groups present on the building units with further building units which are protected lysines or analogues thereof, which contain a —C(O)X group, wherein X is —OH or a leaving group or —CO(X) forms a carboxylate salt, and in which the amino groups present in the lysines or analogues thereof are orthogonally protected, to form amide linkages between the different generations of building units;

vii) deprotecting a first set of amino protecting groups;
viii) reacting free amino groups present on the building units with

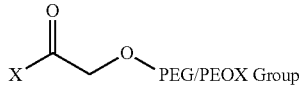

wherein PEG Group is a PEG-containing group, and X is —OH or a leaving group, or wherein X together with the C(O) group to which it is attached forms a carboxylate salt;
vii) deprotecting a second set of amino protecting groups.

The dendrimeric intermediate used in variant c) may itself be obtained, for example, by carrying out steps i) to v) as described above in relation to variant a).

The present disclosure also provides synthetic intermediates useful in producing the dendrimers. Accordingly, there is also provided an intermediate for producing a dendrimer which is

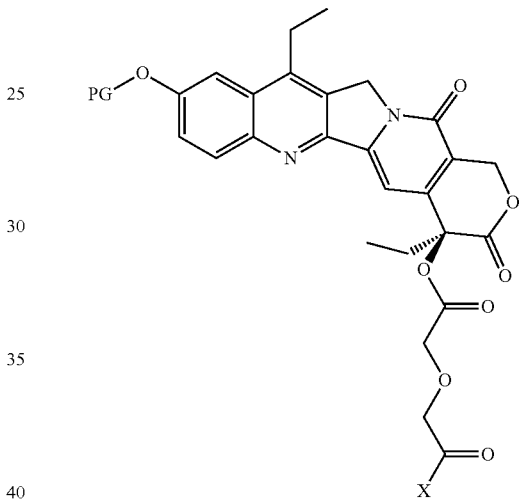

wherein X is —OH or a leaving group, or wherein X together with the C(O) group to which it is attached forms a carboxylate salt; and wherein PG is a protecting group.

There is also provided an intermediate for producing a dendrimer which is

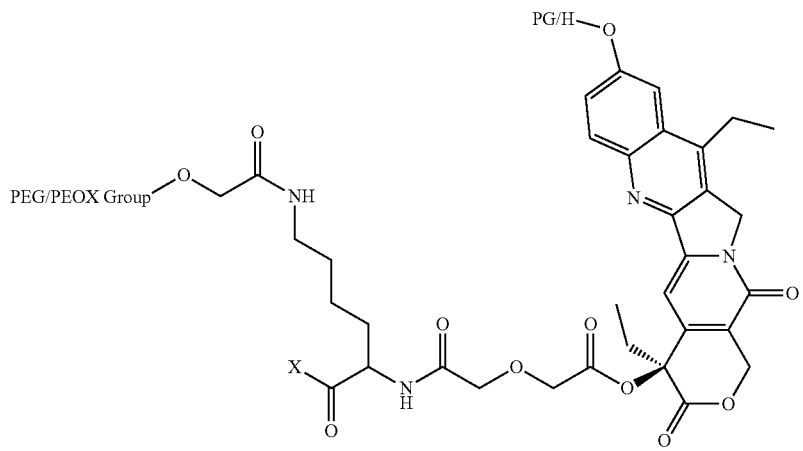

wherein PEG Group is a PEG-containing group, PEOX Group is a PEOX-containing group; X is —OH or a leaving group, or wherein X together with the C(O) group to which it is attached forms a carboxylate salt; and wherein PG is a protecting group. Such an intermediate may be produced, for example, as described above.

The present disclosure will now be described with reference to the following examples which illustrate some particular aspects of the present disclosure. However, it is to be understood that the particularity of the following description of the present disclosure is not to supersede the generality of the preceding description of the present disclosure.

EXAMPLES

Example 1: Synthesis and Characterization of BHALys[Lys]$_{32}$[α-NH$_2$TFA]$_{32}$[ε-PEG$_{~2300}$]$_{32}$‡

The dendrimers represented in the examples below include reference to the core and the building units in the outermost generation of the dendrimer. The subsurface generations are not depicted. The dendrimer BHALys[Lys]$_{32}$ is representative of a 5 generation dendrimer having the formula BHALys[Lys]$_2$[Lys]$_4$[Lys]$_8$[Lys]$_{16}$[Lys]$_{32}$.

32‡ relates to the theoretical number of s surface amino groups on the dendrimer available for substitution with PEG$_{~2100}$. The actual mean number of PEG$_{~2300}$ groups attached to the BHALys[Lys]$_{32}$ was determined experimentally by $^1$H NMR (see below section in the present Example entitled Characterization of BHALys[Lys]$_{32}$[α-NH$_2$-TFA]$_{32}$ [ε-PEG$_{~2300}$]$_{32}$‡).

BHALys[Boc]$_2$

Solid α,ε-(Boc)$_2$-(L)-lysine p-nitrophenol ester (2.787 kg, 5.96 mol) was added to a solution of aminodiphenylmethane (benzhydrylamine) (0.99 kg, 5.4 mol) in anhydrous acetonitrile (4.0 L), DMF (1.0 L) and triethylamine (1.09 kg) over a period of 15 min. The reaction mixture was agitated at 20° C. overnight. The reaction mixture was then warmed to 35° C. and aqueous sodium hydroxide (0.5 N, 10 L) was added slowly over 30 min. The mixture was stirred for an additional 30 min then filtered. The solid cake was washed with water and dried to a constant weight (2.76 kg, 5.4 mol) in 100% yield. $^1$H NMR (CD$_3$OD) δ 7.3 (m, 10H, Ph Calc 10H); 6.2 (s, 1H, CH-Ph$_2$ Calc 1H); 4.08 (m, α-CH, 1H) and 3.18 (br, ε-CH$_2$) and 2.99 (m, ε-CH$_2$ 2H); 1.7-1.2 (br, β,γ,δ-CH$_2$) and 1.43 (s, tBu) total for β,γ,δ-CH$_2$ and tBu 25H Calc 24H. MS (ESI +ve) found 534.2 [M+Na]$^+$ calc for C$_{29}$H$_{41}$N$_3$O$_5$Na [M+Na]$^+$ 534.7.

BHALys[HCl]$_2$

A solution of concentrated HCl (1.5 L) in methanol (1.5 L) was added slowly, in three portions, to a stirred suspension of BHALys[Boc]$_2$ (780.5 g, 1.52 mol) in methanol (1.5 L) at a rate to minimize excessive frothing. The reaction mixture was stirred for an additional 30 min, then concentrated under vacuum at 35° C. The residue was taken up in water (3.4 L) and concentrated under vacuum at 35° C. twice, then stored under vacuum overnight. Acetonitrile (3.4 L) was then added and the residue was again concentrated under vacuum at 35° C. to give BHALys[HCl]$_2$ as a white solid (586 g, 1.52 mol) in 100% yield. $^1$H NMR (D$_2$O) δ 7.23 (br m, 10H, Ph Calc 10H); 5.99 (s, 1H, CH-Ph$_2$ Calc 1H); 3.92 (t, J=6.5 Hz, α-CH, 1H, Calc 1H); 2.71 (t, J=7.8 Hz, ε-CH$_2$, 2H, Calc 2H); 1.78 (m, β,γ,δ-CH$_2$, 2H), 1.47 (m, β,γ,δ-CH$_2$, 2H), and 1.17 (m, β,γ,δ-CH$_2$, 2H, total 6H Calc 6H). MS (ESI +ve) found 312 [M+H]+ calc for C$_{19}$H$_{26}$N$_3$O [M+H]+ 312.

BHALys[Lys]$_2$[Boc]$_4$

To a suspension of BHALys[HCl]$_2$ (586 g, 1.52 mmol) in anhydrous DMF (3.8 L) was added triethylamine (1.08 kg) slowly to maintain the reaction temperature below 30° C. Solid α,ε-(Boc)$_2$-(L)-lysine p-nitrophenol ester (1.49 kg) was added in three portions, slowly and with stirring for 2 hours between additions. The reaction was allowed to stir overnight. An aqueous solution of sodium hydroxide (0.5 M, 17 L) was added slowly to the well stirred mixture, and stirring was maintained until the solid precipitate was freely moving. The precipitate was collected by filtration, and the solid cake was washed well with water (2×4 L) then acetone/water (1:4, 2×4 L). The solid was slurried again with water then filtered and dried under vacuum overnight to give BHALys[Lys]$_2$[Boc]$_4$ (1.51 kg) in 100% yield. $^1$H NMR (CD$_3$OD) δ 7.3 (m, 10H, Ph Calc 10H); 6.2 (s, 1H, CH-Ph$_2$ Calc 1H); 4.21 (m, α-CH), 4.02 (m, α-CH) and 3.93 (m, α-CH, total 3H, Calc 3H); 3.15 (m, ε-CH$_2$) and 3.00 (m, ε-CH$_2$ total 6H, Calc 6H); 1.7-1.3 (br, β,γ,ε-CH$_2$) and 1.43 (s, tBu) total for β,γ,ε-CH$_2$ and tBu 57H, Calc 54H. MS (ESI +ve) found 868.6 [M-Boc]$^+$; 990.7 [M+Na]$^+$ calc for C$_{51}$H$_{81}$N$_7$O$_{11}$Na [M+Na]+ 991.1.

BHALys[Lys]$_2$[HCl]$_4$

BHALys[Lys]$_2$[Boc]$_4$ (1.41 kg, 1.46 mol) was suspended in methanol (1.7 L) with agitation at 35° C. Hydrochloric acid (1.7 L) was mixed with methanol (1.7 L), and the resulting solution was added in four portions to the dendrimer suspension and left to stir for 30 min. The solvent was removed under reduced pressure and worked up with two successive water (3.5 L) strips followed by two successive acetonitrile (4 L) strips to give BHALys[Lys]$_2$[HCl]$_4$ (1.05 Kg, 1.46 mmol) in quant. yield. $^1$H NMR (D$_2$O) δ 7.4 (br m, 10H, Ph Calc 10H); 6.14 (s, 1H, CH-Ph$_2$ Calc 1H); 4.47 (t, J=7.5 Hz, α-CH, 1H), 4.04 (t, J=6.5 Hz, α-CH, 1H), 3.91 (t, J=6.8 Hz, α-CH, 1H, total 3H, Calc 3H); 3.21 (t, J=7.4 Hz, ε-CH$_2$, 2H), 3.01 (t, J=7.8 Hz, ε-CH$_2$, 2H) and 2.74 (t, J=7.8 Hz, ε-CH$_2$, 2H, total 6H, Calc 6H); 1.88 (m, β,γ,δ-CH$_2$), 1.71 (m, β,γ,δ-CH$_2$), 1.57 (m, β,γ,δ-CH$_2$) and 1.35 (m, β,γ,δ-CH$_2$ total 19H, Calc 18H).

BHALys[Lys]$_4$[Boc]$_8$

BHALys[Lys]$_2$[HCl]$_4$ (1.05 Kg, 1.47 mol) was dissolved in DMF (5.6 L) and triethylamine (2.19 L). The α,ε-(Boc)$_2$-(L)-lysine p-nitrophenol ester (2.35 kg, 5.03 mol) was added in three portions and the reaction stirred overnight at 25° C. A NaOH (0.5M, 22 L) solution was added and the resulting mixture filtered, washed with water (42 L) and then air dried. The solid was dried under vacuum at 45° C. to give BHALys[Lys]$_4$[Boc]$_8$ (2.09 Kg, 1.11 mol) in 76% yield. $^1$H NMR (CD$_3$OD) δ 7.3 (m, 10H, Ph Calc 10H); 6.2 (s, 1H, CH-Ph$_2$ Calc 1H); 4.43 (m, α-CH), 4.34 (m, α-CH), 4.25 (m, α-CH) and 3.98 (br, α-CH, total 7H, Calc 7H); 3.15 (br, ε-CH$_2$) and 3.02 (br, ε-CH$_2$ total 14H, Calc 14H); 1.9-1.2 (br, β,γ,δ-CH$_2$) and 1.44 (br s, tBu) total for β,γ,ε-CH$_2$ and tBu 122H, Calc 144H.

BHALys[Lys]$_4$[TFA]$_8$

To a stirred suspension of BHALys[Lys]$_4$[Boc]$_8$ (4 g, 2.13 mmol) in DCM (18 mL) was added TFA (13 mL) at 0° C. The solids dissolved, and the solution was stirred overnight under an atmosphere of argon. The solvents were removed under vacuum, and residual TFA was removed by trituration with diethyl ether (100 mL). The product was redissolved in water then freeze dried to give BHALys[Lys]$_4$[TFA]$_8$ as an off-white solid (4.27 g, 2.14 mmol) in quant. yield. $^1$H NMR (D$_2$O) δ 7.21 (br m, 10H, Ph Calc 10H); 5.91 (s, 1H, CH-Ph$_2$ Calc 1H); 4.17 (t, J=7.4 Hz, α-CH, 1H), 4.09 (t, J=7.1 Hz, α-CH, 1H), 4.02 (t, J=7.2 Hz, α-CH, 1H), 3.84 (t, J=6.5 Hz, α-CH, 2H), 3.73 (t, J=6.7 Hz, α-CH, 1H), 3.67 (t, J=6.7 Hz, α-CH, 1H, total 7H, Calc 7H); 3.0 (m, ε-CH$_2$), 2.93 (m, ε-CH$_2$) and 2.79 (b, ε-CH$_2$, total 15H, Calc 14H); 1.7 (br, β,γ,δ-CH$_2$), 1.5 (br, β,γ,δ-CH$_2$), 1.57 (m, β,γ,δ-CH$_2$) and 1.25 (br, β,γ,δ-CH$_2$ total 45H, Calc 42H). MS (ESI +ve) found 541.4 [M+2H]$^{2+}$; calc for C$_{55}$H$_{99}$N$_{15}$O$_7$ [M+2H]$^{2+}$ 541.2.

BHALys[Lys]$_8$[Boc]$_{16}$

A solution of α,ε-(Boc)$_2$-(L)-lysine p-nitrophenol ester (1.89 g, 4.05 mmol) in DMF (25 mL) was added to a solution of BHALys[Lys]$_4$[NH$_2$TFA]$_8$ (644 mg, 0.32 mmol) and triethylamine (0.72 mL, 5.2 mmol) in DMF (25 mL) and the reaction was left to stir overnight under an argon atmosphere. The reaction mixture was poured onto ice/water (500 mL) then filtered and the collected solid was dried overnight under vacuum. The dried solid was washed thoroughly with acetonitrile to give BHALys[Lys]$_8$[Boc]$_{16}$ as an off white solid (0.82 g, 0.22 mmol) in 68% yield. $^1$H NMR (CD$_3$OD) δ 7.3 (m, 10H, Ph Calc 10H); 6.2 (br s, 1H, CH-Ph$_2$ Calc 1H); 4.48 (br, α-CH), 4.30 (br, α-CH) and 4.05 (br, α-CH, total 16H Calc 15H); 3.18 (br, ε-CH$_2$) and 3.02 (m, ε-CH$_2$ total 31H, Calc 30H); 1.9-1.4 (br, β,γ,δ-CH$_2$) and 1.47 (br s, tBu) total for β,γ,δ-CH$_2$ and tBu 240H, Calc 234H. MS (ESI +ve) found 3509 [M+H−(Boc)$_2$]$^+$ calc for C$_{173}$H$_{306}$N$_{31}$O$_{43}$ [M+H−(Boc)$_2$]$^+$3508.5; 3408 [M+H−(Boc)$_3$]$^+$ calc for C$_{168}$H$_{298}$N$_{31}$O$_{41}$ [M+H−(Boc)$_3$]$^+$ 3408.4.

BHALys[Lys]$_8$[TFA]$_{16}$

A solution of TFA/DCM (1:1, 19 mL) was added slowly to a stirred suspension of BHALys[Lys]$_8$[Boc]$_{16}$ (800 mg, 0.22 mmol) in DCM (25 mL). The solids dissolved, and the solution was stirred overnight under an atmosphere of argon. The solvents were removed under vacuum, and residual TFA was removed by repetitive freeze drying of the residue, to give BHALys[Lys]$_8$[TFA]$_{16}$ as an off-white lyophylisate (848 mg, 0.22 mmol) in quant. yield. $^1$H NMR (D$_2$O) δ 7.3 (br m, 10H, Ph Calc 10H); 6.08 (s, 1H, CH-Ph$_2$ Calc 1H); 4.3 (m, α-CH), 4.18 (m, α-CH), 4.0 (m, α-CH) and 3.89 (m, α-CH, total 16H Calc 15H); 3.18 (br, ε-CH$_2$) and 2.94 (m, ε-CH$_2$ total 32H, Calc 30H); 1.9 (m, β,γ,δ-CH$_2$), 1.68 (m, β,γ,δ-CH$_2$) and 1.4 (m, β,γ,δ-CH$_2$ total 99H, Calc 90H). MS (ESI +ve) found 2106 [M+H]$^+$ calc for C$_{103}$H$_{194}$N$_{31}$O$_{15}$ [M+H]$^+$ 2106.9.

BHALys[Lys]$_{16}$[Boc]$_{32}$

A solution of α,ε-(Boc)$_2$-(L)-lysine-p-nitrophenol ester (1.89 g, 4.05 mmol) in DMF (25 mL) was added to a solution of BHALys[Lys]$_8$[TFA]$_{16}$ (644 mg, 0.32 mmol) and triethylamine (0.72 mL, 5.2 mmol) in DMF (25 mL) and the reaction was left to stir overnight under an argon atmosphere. The reaction was poured onto ice/water (500 mL) then filtered and the collected solid was dried overnight under vacuum. The dried solid was washed thoroughly with acetonitrile to give BHALys[Lys]$_{16}$[Boc]$_{32}$ as an off white solid (0.82 g, 0.2 2 mmol) in 68% yield. $^1$H NMR (CD$_3$OD) δ 7.28 (m, 9H, Ph Calc 10H); 6.2 (br s, 1H, CH-Ph$_2$ Calc 1H); 4.53 (br, α-CH), 4.32 (br, α-CH) and 4.05 (br, α-CH, total 35H, Calc 31H); 3.18 (br, ε-CH$_2$) and 3.04 (m, ε-CH$_2$ total 67H, Calc 62H); 1.9-1.5 (br, β,γ,δ-CH$_2$) and 1.47 (br s, tBu) total for β,γ,δ-CH$_2$ and tBu 474H Calc, 474H. MS (ESI +ve) found 6963 [M+H−(Boc)$_4$]$^+$ calc for C$_{339}$H$_{610}$N$_{63}$O$_{87}$ [M+H−(Boc)$_4$]$^+$ 6960.9; 6862 [M+H−(Boc)$_5$]$^+$ calc for C$_{334}$H$_{604}$N$_{63}$O$_{85}$ [M+H−(Boc)$_5$]$^+$ 6860.8.

BHALys[Lys]$_{16}$[TFA]$_{32}$

A solution of TFA/DCM (1:1, 19 mL) was added slowly to a stirred suspension of BHALys[Lys]$_{16}$[Boc]$_{32}$ (800 mg, 0.11 mmol) in DCM (25 mL). The solids dissolved, and the solution was stirred overnight under an atmosphere of argon. The solvents were removed under vacuum, and residual TFA was removed by repetitive freeze drying of the residue, to give BHALys[Lys]$_{16}$[TFA]$_{32}$ as an off-white lyophylate (847 mg, 0.11 mmol) in quant. yield. $^1$H NMR (D$_2$O) δ 7.3 (br m, 11H, Ph Calc 10H); 6.06 (s, 1H, CH-Ph$_2$ Calc 1H); 4.3 (m, α-CH), 4.19 (m, α-CH), 4.0 (m, α-CH) and 3.88 (m, α-CH, total 35H, Calc 31H); 3.15 (br, ε-CH$_2$) and 2.98 (m, ε-CH$_2$ total 69H, Calc 62H); 1.88 (m, β,γ,δ-CH$_2$), 1.7 (m, β,γ,δ-CH$_2$) and 1.42 (m, β,γ,δ-CH$_2$ total 215H, Calc 186H). MS (ESI +ve) found 4158 [M+H]$^+$ calc for C$_{199}$H$_{386}$N$_{63}$O$_{31}$ [M+H]+ 4157.6

HO-Lys(α-BOC)(ε-PEG$_{~2300}$)

DIPEA (0.37 mL, 2.10 mmol) was added to an ice-cooled mixture of NHS-PEG$_{~2300}$ (2.29 g, 1.05 mmol) (in which PEG$_{~2100}$ represents a methoxy-terminated PEG group having approximate average molecular weight of 2300 Da, and in which NHS represents NHS—C(O)CH$_2$), and N-α-BOC-L-lysine (0.26 g, 1.05 mmol) in DMF (20 mL). The stirred mixture was allowed to warm to room temperature overnight then any remaining solids were filtered (0.45 μm PALL acrodisc) before removing the solvent in vacuo. The residue was taken up in ACN/H$_2$O (1:3, 54 mL) and purified by PREP HPLC (Waters XBridge C18, 5 μm, 19×150 mm, 25 to 32% ACN (5-15 min), 32 to 60% ACN (15 to 20 min), no buffer, 8 mL/min, RT=17 min), providing 1.41 g (56%) of HO-Lys(Boc)(PEG$_{2100}$). $^1$H NMR (CD$_3$OD) δ 3.96-4.09 (m, 1H), 3.34-3.87 (m, 188H); 3.32 (s, 3H); 3.15 (q, J=6.0 Hz, 2H), 2.40 (t, J=6.2 Hz, 2H), 1.28-1.88 (m, 6H), 1.41 (s, 9H).

BHALys[Lys]$_{32}$[α-BOC]$_{32}$[ε-PEG$_{~2300}$]$_{32}$‡

To a stirred mixture of BHALys[Lys]$_{16}$[TFA]$_{32}$ (0.19 g, 24 μmol) in DMF (20 mL) was added DIPEA (0.86 mL, 4.86 mmol). This mixture was then added dropwise to a stirred mixture of PyBOP (0.62 g, 1.20 mmol) and HO-Lys(Boc) (PEG$_{~2300}$) (2.94 g, 1.20 mmol) in DMF (20 mL) at room temperature. The reaction mixture was left to stir overnight, then diluted with water (200 mL). The aqueous mixture was subjected to a centramate filtration (5 k membrane, 20 L water). The retentate was freeze dried, providing 1.27 g (73%) of desired dendrimer. HPLC (C8 XBridge, 3×100 mm, gradient: 5% ACN (0-1 min), 5-80% ACN/H$_2$O) (1-7 min), 80% ACN (7-12 min), 80-5% ACN (12-13 min), 5% ACN (13-15 min), 214 nm, 0.1% TFA) Rf (min)=8.52. 1H NMR (300 MHz, D$_2$O) δ (ppm): 1.10-2.10 (m, Lys CH$_2$ (β, χ, δ) and BOC, 666H), 3.02-3.36 (m, Lys CH$_2$ (ε), 110H), 3.40 (s, PEG-OMe, 98H), 3.40-4.20 (m, PEG-OCH$_2$, 5750H+Lys CH surface, 32H), 4.20-4.50 (m, Lys, CH internal 32H), 7.20-7.54 (m, BHA, 8H). $^1$H NMR indicates approximately 29 PEGs.

BHALyS[LyS]$_{32}$[α-NH$_2$TFA]$_{32}$[ε-PEG$_{~2300}$]$_{32}$‡

1.27 g (17.4 μmol) of BHALys[Lys]$_{32}$[α-BOC]32[ε-PEG$_{~2300}$]$_{32}$ was stirred in TFA/DCM (1:1, 20 mL) at room temperature overnight. The volatiles were removed in vacuo, then the residue was taken up in water (30 mL). The mixture was then concentrated. This process was repeated two more times before being freeze dried, providing 1.35 g (106%) of desired product as a viscous colourless oil. HPLC (C8 XBridge, 3×100 mm, gradient: 5% ACN (0-1 min), 5-80% ACN/H$_2$O) (1-7 min), 80% ACN (7-12 min), 80-5% ACN (12-13 min), 5% ACN (13-15 min), 214 nm, 0.1% TFA) Rf (min)=8.51. $^1$H NMR (300 MHz, D$_2$O) δ (ppm): 1.22-2.08 (Lys CH$_2$ ((β, χ, δ), 378H), 3.00-3.26 (Lys CH2 (ε), 129H), 3.40 (PEG-OMe, 96H), 3.45-4.18 (PEG-OCH$_2$, 5610H+Lys CH surface, 32H), 4.20-4.46 (Lys, CH internal, 33H), 7.24-7.48 (8H, BHA). $^1$H NMR indicates approximately 29 PEGs.

Characterization of BHALys[Lys]$_{32}$[α-NH$_2$TFA]$_{32}$[ε-PEG$_{\sim2300}$]$_{32}$‡

Table 1 illustrates the various batches of BHALys[Lys]$_{32}$[α-NH$_2$TFA]$_{32}$[ε-PEG$_{\sim2200}$]$_{32}$‡ synthesised. The actual number of PEG chains on the dendrimer is also calculated by $^1$H NMR.

TABLE 1

Various Batches of BHALys[Lys]$_{32}$[α-NH$_2$TFA]$_{32}$[ε-PEG$_{\sim2200}$]$_{32}$‡

| Batch | Used in Example | PEG length from CoA (Da) | Number of PEGs (‡) on BHALys[Lys]$_{32}$[α-NH$_2$·TFA]$_{32}$[ε-PEG$_{\sim2300}$]‡ (from proton NMR) |
|---|---|---|---|
| 1 | 2a, 2d, 2e, 2h, 2i | 2300 | 28 |
| 2 | 2c, 2f, 2g, 2k | 2100 | 32 |
| 3 | 2b, 2j | 2300 | 31 |

‡Number of PEGs is calculated from the proton NMR spectrum. For batch 1: Number of PEGs = Number (integration) of protons in PEG region of NMR spectrum (3.4-4.2 ppm)/number of protons from a single PEG chain (NMR spectrum)
=5594H/202H
=27.69 (approx. 28 PEG units)

PEG represents —C(O)CH$_2$-PEG$_{\sim2300}$ in which PEG$_{\sim2300}$ represents a methoxy-terminated PEG group having approximate average molecular weight of 2300 Daltons.

32† relates to the theoretical number of a surface amino groups on the dendrimer available for substitution with linker-SN-38. The actual mean number of linker-SN-38 groups attached to BHALys[Lys]$_{32}$ was determined experimentally by $^1$H NMR spectroscopy, by comparing the using integration of the PEG region with that of SN-38.

Example 2: Synthesis of Example Dendrimers

The following dendrimer constructs were prepared, where SN-38 is covalently attached, via either C-10 or C-20 position to a diacid linker, which is attached to the α-amino position on the outermost lysine layer on the dendrimer.

TABLE 2

| Compound | Linker | SN-38/ Irinotecan attachment | Average PEG length | Average number of PEG chain per dendrimer |
|---|---|---|---|---|
| 2a | Glu | C-10 | 2300 | 28 |
| 2b | Glu | C-20 | 2300 | 31 |
| 2c | TDA | C-10 | 2100 | 32 |
| 2d | TDA | C-20 | 2300 | 28 |
| 2e | DGA | C-10 | 2300 | 28 |
| 2f | DGA | C-20 | 2100 | 32 |
| 2g | modified-Glu | C-10 | 2100 | 32 |
| 2h | modified-TDA | C-10 | 2300 | 28 |
| 2i | 2,5-THF | C-20 | 2300 | 28 |
| 2j | DGA | C-20 | 2300 | 31 |
| 2k | TDA | C-20 | 2100 | 32 |

Shown below are the Glu (glutaric acid), TDA (thiodiacetic acid), DGA (diglycolic acid) and 2,5-THF (tetrohydrofuran-2,5-dicarboxylic acid) linkers used, along with SN-38, a representation of a dendrimer bearing PEG and SN-38 residues linked via DGA diacyl linkers, and the surface building units of compounds 2e/2f, for illustrative purposes:

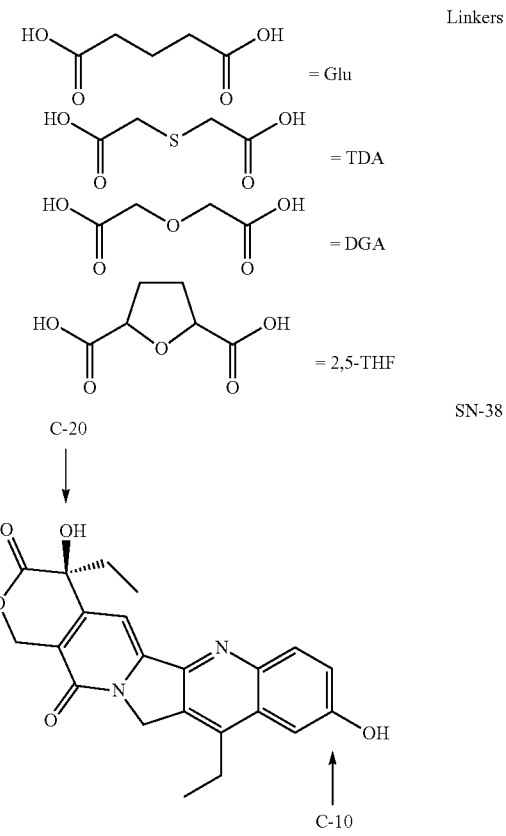

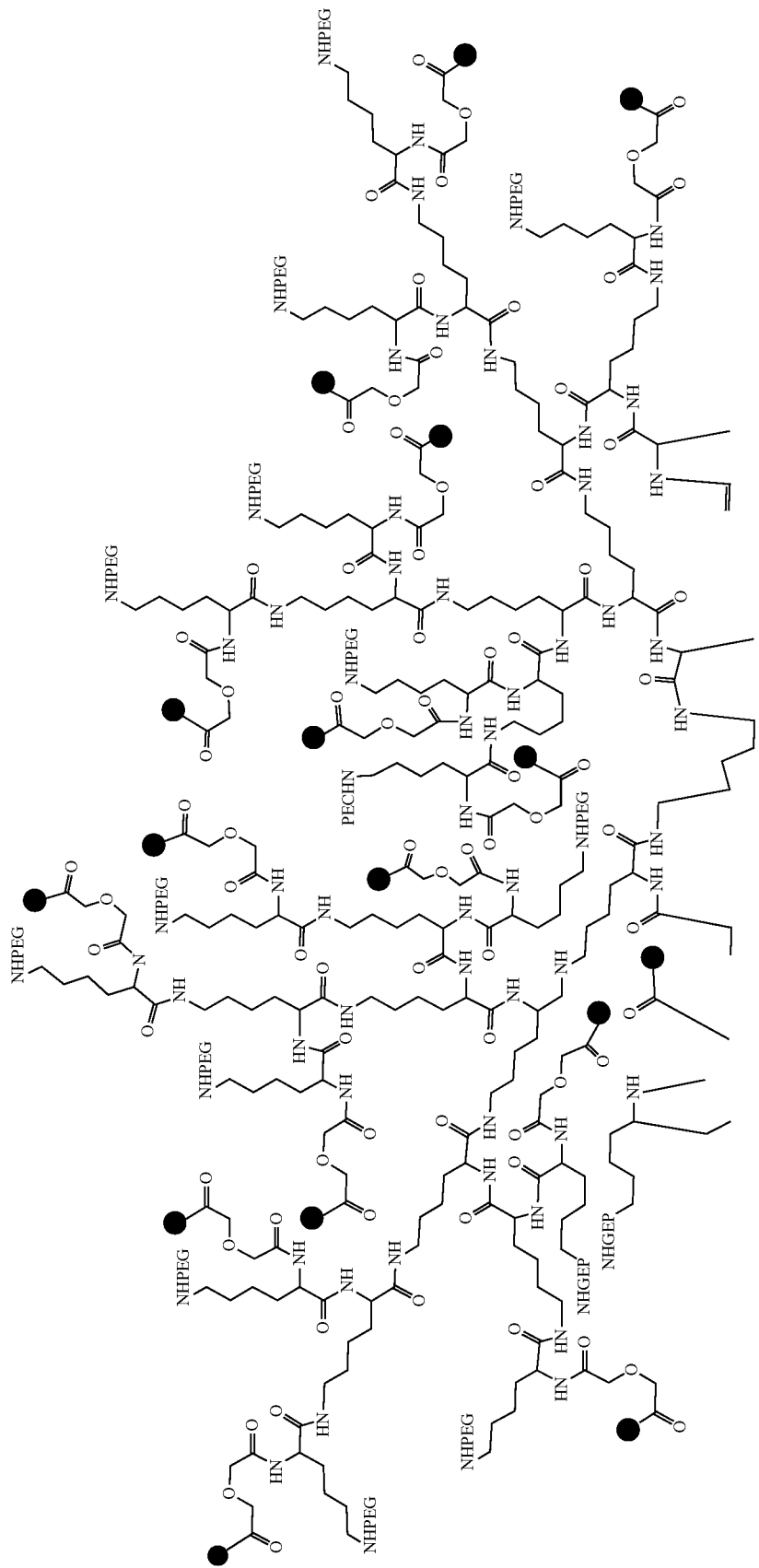

-continued
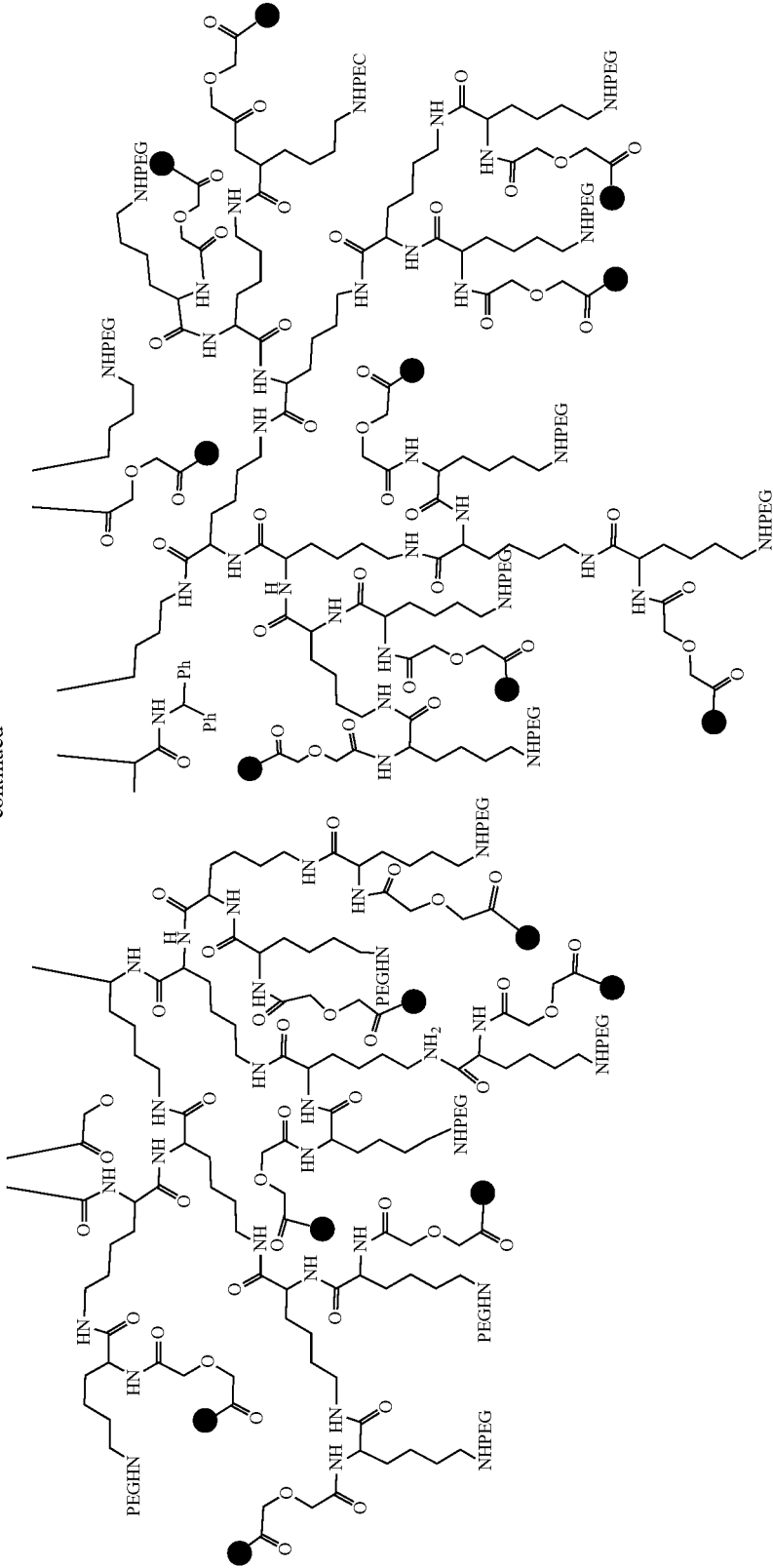

PEG represents —C(O)CH$_2$-PEG$_{\sim 2300}$ in which PEG$_{\sim 2300}$ represents a methoxy-terminated PEG group having approximate average molecular weight of 2300 Daltons. The DGA linker is attached to the α-amino on the outer Lysine layer in the example above (Example 2e).

● represents a residue of SN-38.

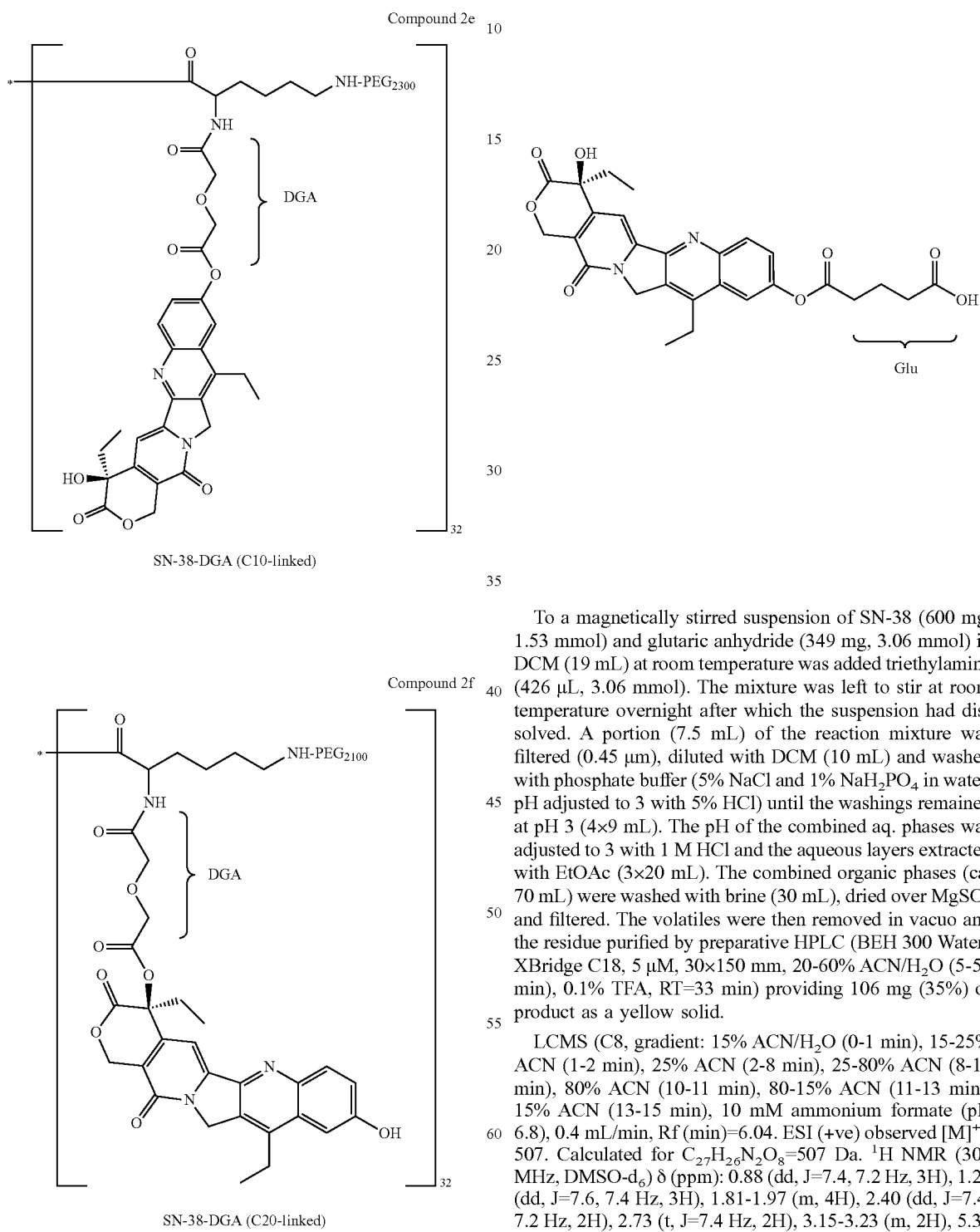

Example 2a Synthesis of BHALys[Lys]$_{32}$[α-Glu-C10-SN-38]$_{32\dagger}$[ε-PEG$_{\sim 2300}$]$_{32\ddagger}$ (i) Glu-C10-SN-38

To a magnetically stirred suspension of SN-38 (600 mg, 1.53 mmol) and glutaric anhydride (349 mg, 3.06 mmol) in DCM (19 mL) at room temperature was added triethylamine (426 µL, 3.06 mmol). The mixture was left to stir at room temperature overnight after which the suspension had dissolved. A portion (7.5 mL) of the reaction mixture was filtered (0.45 µm), diluted with DCM (10 mL) and washed with phosphate buffer (5% NaCl and 1% NaH$_2$PO$_4$ in water, pH adjusted to 3 with 5% HCl) until the washings remained at pH 3 (4×9 mL). The pH of the combined aq. phases was adjusted to 3 with 1 M HCl and the aqueous layers extracted with EtOAc (3×20 mL). The combined organic phases (ca. 70 mL) were washed with brine (30 mL), dried over MgSO$_4$ and filtered. The volatiles were then removed in vacuo and the residue purified by preparative HPLC (BEH 300 Waters XBridge C18, 5 µM, 30×150 mm, 20-60% ACN/H$_2$O (5-50 min), 0.1% TFA, RT=33 min) providing 106 mg (35%) of product as a yellow solid.

LCMS (C8, gradient: 15% ACN/H$_2$O (0-1 min), 15-25% ACN (1-2 min), 25% ACN (2-8 min), 25-80% ACN (8-10 min), 80% ACN (10-11 min), 80-15% ACN (11-13 min), 15% ACN (13-15 min), 10 mM ammonium formate (pH 6.8), 0.4 mL/min, Rf (min)=6.04. ESI (+ve) observed [M]$^+$= 507. Calculated for C$_{27}$H$_{26}$N$_2$O$_8$=507 Da. $^1$H NMR (300 MHz, DMSO-d$_6$) δ (ppm): 0.88 (dd, J=7.4, 7.2 Hz, 3H), 1.29 (dd, J=7.6, 7.4 Hz, 3H), 1.81-1.97 (m, 4H), 2.40 (dd, J=7.4, 7.2 Hz, 2H), 2.73 (t, J=7.4 Hz, 2H), 3.15-3.23 (m, 2H), 5.34 (s, 2H), 5.44 (s, 2H), 6.51 (br s, 1H), 7.33 (s, 1H), 7.68 (dd, J=9.1, 2.5 Hz, 1H), 8.02 (d, J=2.5 Hz, 1H), 8.21 (d, J=9.1 Hz, 1H), 12.18 (br s, 1H).

(ii) BHALys[Lys]$_{32}$[α-Glu-C10-SN-38]$_{32†}$[ε-PEG$_{~2300}$]$_{32‡}$

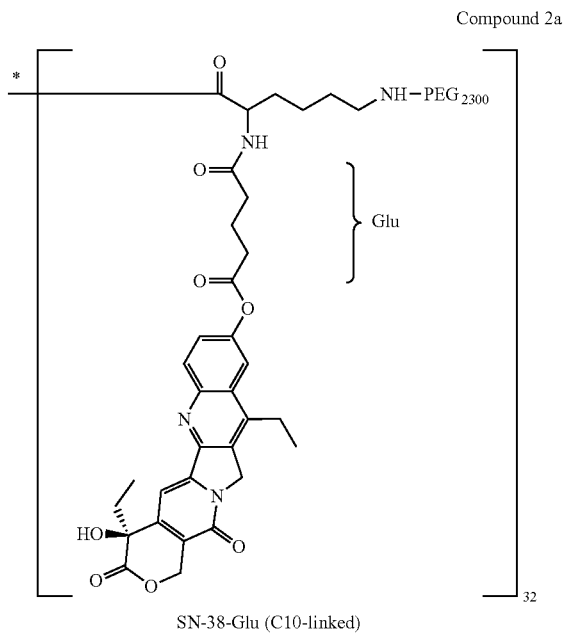

Compound 2a

SN-38-Glu (C10-linked)
* = BHALys[Lys]$_2$[Lys]$_4$[Lys]$_8$[Lys]$_{16}$

To a magnetically stirred mixture of Glu-C10-SN-38 (215 mg, 424 μmol) and PyBOP (221 mg, 424 μmol) in DMF (9 mL) at room temperature was added a mixture of BHALys [Lys]$_{32}$[α-NH$_2$.TFA]$_{32}$[ε-PEG$_{2300}$]$_{32‡}$ (757 mg, 10.2 μmol) and NMM (179 μL, 1.63 mmol), also in DMF (11 mL). After 16 hours at room temperature the reaction mixture was added to a chilled (0° C.) solution of 1% AcOH in 3:7 ACN/water (200 mL), filtered and concentrated to 30 mL by ultrafiltration (0.005 m$^2$, 10 kDa, regenerated cellulose filter membrane). The concentrate was subjected to further ultrafiltration with 13×30 mL diafiltrations (1% AcOH in 3:7 ACN/MQ water). The retentate was lyophilised, providing 931 mg of product. This material was dissolved in THF (4.5 mL) and added to chilled MTBE (20 mL) at 0° C. The mixture was stirred at 0° C. (1 h) and the resulting precipitate isolated via filtration. The product was dried under vacuum (16 h), providing 783 mg (89%) of the desired material as a yellow solid.

HPLC (C8 Xbridge, 3×100 mm) gradient: 5% ACN/H$_2$O (0-1 min), 5-80% ACN (1-7 min), 80% ACN (7-12 min), 80-5% ACN (12-13 min), 5% ACN (13-15 min), 243 nm, 0.1% TFA, 0.4 mL/min, Rf (min)=8.69. $^1$H NMR (300 MHz, CD$_3$OD) δ (ppm): 0.65-3.04 (m, 706H), 3.04-3.27 (m, 79H), 3.36 (s, 93H), 3.37-4.14 (m, 5,615H), 4.14-4.63 (m, 76H), 5.12-5.89 (m, 50H), 6.97-7.80 (m, 114H). SN-38 loading was determined by comparing the integration area of the aromatics of SN-38 (4H) with the integration area of PEG. In the example above the aromatic region is 104H (114H-10H from BHA portion of dendrimer). 104H/4H=26 SN-38 molecules per dendrimer. Theoretical molecular weight of conjugate with 28 PEG2300 chains and 26 DGA-SN-38 is 83,374 Da. Drug loading (% w/w) can then be calculated by multiplying the molecular weight of SN-38 (392) by the number of SN-38 molecules on the dendrimer, divided by the total molecular weight of the construct, i.e. (392×26)/83,374=12.2%.

Example 2b Synthesis of BHALys[Lys]$_{32}$[α-Glu-C20-SN-38]$_{32†}$[ε-PEG$_{~2300}$]$_{32‡}$ (i) OtBu-Glu-C20-SN-38-O(Boc)

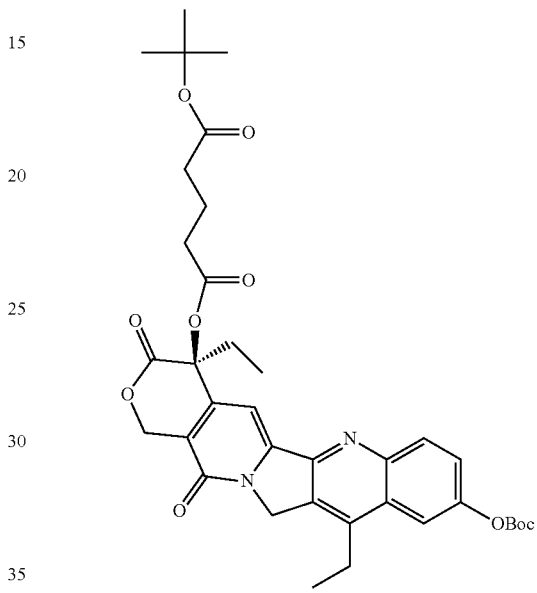

To a magnetically stirred suspension of Boc-C10-SN-38 (Zhao, H. et al, Bioconjugate Chem., 2008, 19, 849-859) (48 mg, 0.097 mmol) in DCM (1.8 mL) at room temperature was added a solution of mono-tert-butyl glutarate (25 mg, 0.14 mmol) in DCM (0.2 mL), EDC, (1-Ethyl-3-(3-dimethylaminopropyl)carbodiimide, 27 μL, 0.16 mmol) and DMAP (4-dimethylaminopyridine, 4 mg, 0.031 mmol). The mixture was left to stir at room temperature for 3 h until the reaction was judged >80% complete by HPLC. The reaction mixture was diluted with 8 mL DCM and washed successively with aqueous NaHCO$_3$ (1%, 2×2.5 mL), water (2.5 mL) and HCl (0.1 M, 2×2.5 mL), dried over MgSO$_4$ and filtered. The volatiles were then removed in vacuo and the residue dried under vacuum (2 h) providing 63 mg (98%) of product as a yellow solid.

LCMS (C8, gradient: 40% ACN/H$_2$O (0-1 min), 40-90% ACN (1-7 min), 90% ACN (7-9 min), 90-40% ACN (9-11 min), 40% ACN (11-15 min), 0.1% formic acid, 0.4 mL/min, Rf (min)=8.38. ESI (+ve) observed [M]$^+$=663. Calculated for C$_{36}$H$_{42}$N$_2$O$_{10}$=663 Da. $^1$H NMR (300 MHz, CDCl$_3$) δ (ppm): 0.97 (dd, J=7.4, 7.3 Hz, 3H), 1.37-1.48 (m, 3H), 1.41 (s, 9H), 1.61 (s, 9H), 1.83-1.97 (m, 2H), 2.06-2.37 (m, 4H), 2.46-2.67 (m, 2H), 3.12-3.20 (m, 2H), 5.25 (s, 2H), 5.41 (d, J=17.3 Hz, 1H), 5.68 (d, J=17.3 Hz, 1H), 7.17 (s, 1H), 7.67 (dd, J=9.2, 2.3 Hz, 1H), 7.90 (d, J=2.3 Hz, 1H), 8.22 (d, J=9.2 Hz, 1H).

(ii) Glu-C20-SN-38

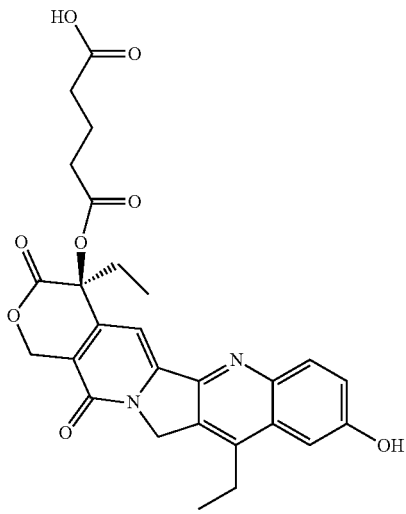 [SMILES: CCc1c2c(nc3ccc(O)cc13)-c1cc3c(c(=O)n1C2)COC(=O)[C@@]3(CC)OC(=O)CCCC(=O)O]

A solution of OtBu-Glu-C20-SN-38-O(Boc) (59 mg, 0.089 mmol) in TFA (4 mL) was magnetically stirred at room temperature overnight. The volatiles were then removed in vacuo and the residue azeotroped with DCM, mixed with water and lyophilised, providing 59 mg (>95%) of product as a white-yellow solid.

LCMS (C18, gradient: 5% ACN/H$_2$O (0-1 min), 5-60% ACN (1-10 min), 60% ACN (10-11 min), 60-5% ACN (11-13 min), 5% ACN (13-15 min), 0.1% formic acid, 0.4 mL/min, Rf (min)=9.41. ESI (+ve) observed [M]$^+$=507. Calculated for C$_{27}$H$_{26}$N$_2$O$_8$=507 Da. $^1$H NMR (300 MHz, DMSO-d$_6$) δ (ppm): 0.91 (dd, J=7.4, 7.3 Hz, 3H), 1.29 (dd, J=7.6, 7.4 Hz, 3H), 1.71-1.81 (m, 2H), 2.10-2.17 (m, 2H), 2.30 (t, J=7.4 Hz, 2H), 2.56 (t, J=7.4 Hz, 2H), 3.08 (dd, J=14.9, 7.4, 2H), 5.28 (s, 2H), 5.48 (s, 2H), 6.93 (s, 1H), 7.39-7.43 (m, 2H), 8.01-8.04 (m, 1H), 10.33 (brs, 1H).

(iii) BHALys[Lys]$_{32}$[α-Glu-C20-SN-38]$_{32\dagger}$[ε-PEG$_{\sim2300}$]$_{32\ddagger}$

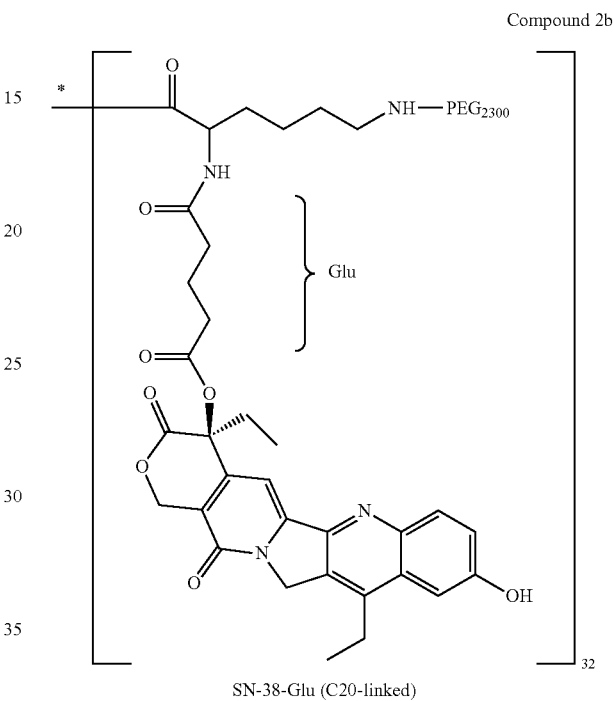

Compound 2b

SN-38-Glu (C20-linked)

* = BHALys[Lys]$_2$[Lys]$_4$[Lys]$_8$[Lys]$_{16}$

To a magnetically stirred mixture of Glu-C20-SN-38 (13 mg, 26 µmol) and PyBOP (14 mg, 26 µmol) in DMF (0.5 mL) at room temperature was added a mixture of BHALys[Lys]$_{32}$[α-NH$_2$·TFA]$_{32}$[ε-PEG$_{\sim2300}$]$_{32\ddagger}$ (50 mg, 0.60 µmol) and DIPEA (16 µL, 97 µmol) in DMF (1 mL). After 16 hours at room temperature the volatiles were removed and the residue purified by size exclusion chromatography (Sephadex, LH-20, ACN). The appropriate fractions, as judged by HPLC, were combined and concentrated. The residue was then taken up in water, filtered (0.45 µm) and lyophilised providing 45 mg (79%) of desired material as a yellow solid.

HPLC (C8 Xbridge, 3×100 mm), gradient: 5% ACN/H$_2$O (0-1 min), 5-80% ACN (1-7 min), 80% ACN (7-12 min), 80-5% ACN (12-13 min), 5% ACN (13-15 min), 214 nm, 0.1% formic acid, 0.4 mL/min, Rf (min)=8.13. $^1$H NMR (300 MHz, CD$_3$OD) δ (ppm): 0.62-3.26 (m, 1,010H), 3.36 (s, 103H), 3.37-4.10 (m, 6,100H), 4.11-4.50 (m, 72H), 4.57 (s, 38H), 5.17-5.88 (m, 50H), 6.92-8.11 (m, 144H). As per Example 2a, the number of SN-38 molecules was calculated as 32 and the drug loading 13.6% w/w.

Example 2c Synthesis of BHALys[Lys]$_{32}$[α-TDA-C10-SN-38]$_{32\dagger}$[ε-PEG$_{\sim 2100}$]$_{32\ddagger}$ (i) OtBu-TDA-C10-SN-38

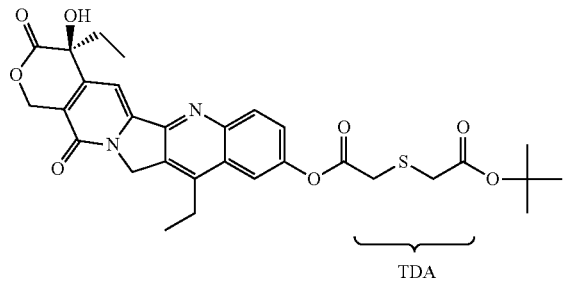 [SMILES: CCc1c2c(nc3ccc(OC(=O)CSCC(=O)OC(C)(C)C)cc13)-c1cc3c(c(=O)n1C2)COC(=O)[C@]3(O)CC ; "TDA"]

TDA

To a magnetically stirred suspension of SN-38 (100 mg, 0.26 mmol) in DCM (2 mL) at room temperature was added thiodiglycolic acid mono-tert-butyl ester (53 mg, 0.33 mmol), EDC (67 µL, 0.43 mmol) and a solution of DMAP (31 mg, 0.26 mmol) in DCM (0.5 mL). The mixture was left to stir at room temperature overnight. The volatiles were removed in vacuo and the residue purified by preparative HPLC (BEH 300 Waters XBridge C18, 5 µM, 30×150 mm, 35-70% ACN/water (5-40 min), 0.1% TFA) providing 10 mg (7%) of OtBu-TDA-C20-SN-38 (RT=35.8 min) and 10 mg (7%) of OtBu-TDA-C10-SN-38 (RT=37.5 min) as yellow solids.

LCMS (C8, gradient: 40% ACN/H$_2$O (0-1 min), 40-90% ACN (1-7 min), 90% ACN (7-9 min), 90-40% ACN (9-11 min), 40% ACN (11-15 min), 0.1% formic acid, 0.4 mL/min, Rf (min)=5.97. ESI (+ve) observed [M]$^+$=581. Calculated for C$_{30}$H$_{32}$N$_2$O$_8$S=581 Da.

(ii) TDA-C10-SN-38

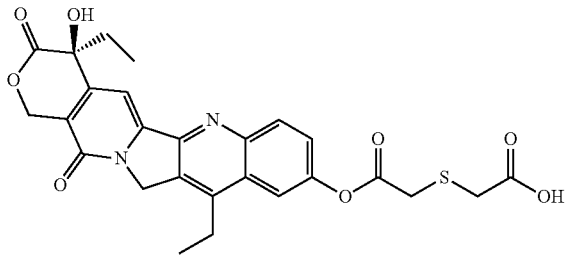 [SMILES: CCc1c2c(nc3ccc(OC(=O)CSCC(=O)O)cc13)-c1cc3c(c(=O)n1C2)COC(=O)[C@]3(O)CC]

Method A:

A solution of OtBu-TDA-C10-SN-38 (10 mg, 17.2 µmol) in TFA (2 mL) was magnetically stirred at room temperature overnight. The volatiles were then removed in vacuo and the residue azeotroped with DCM, mixed with water and lyophilised, providing 9 mg (>95%) of product as a yellow solid.

Method B:

To a magnetically stirred suspension of SN-38 (100 mg, 0.25 mmol) and thiodiglycolic anhydride (85%, 79 mg, 0.51 mmol) in DCM (3 mL) at room temperature was added triethylamine (71 µL, 0.51 mmol). The suspension dissolved quickly and the mixture was left to stir at room temperature overnight. After 16 hours the reaction was judged >80% complete by HPLC. The reaction mixture was diluted with 3 mL DCM and washed with phosphate buffer (5% NaCl and 1% NaH$_2$PO$_4$ in water, pH adjusted to 3 with 5% HCl) until the washings remained at pH 3 (3×6 mL). The pH of the combined aq. phases was adjusted to 3 with 1 M HCl and the aq. layers extracted with more DCM (2×20 mL). The combined organic phases were dried over MgSO$_4$, filtered and the volatiles removed in vacuo. The residue was dried under vacuum providing 81 mg (60%) of product as a yellow solid.

LCMS (C8, gradient: 15% ACN/H$_2$O (0-1 min), 15-25% ACN (1-2 min), 25% ACN (2-8 min), 25-80% ACN (8-10 min), 80% ACN (10-11 min), 80-15% ACN (11-13 min), 15% ACN (13-15 min), 10 mM ammonium formate (pH 6.8), 0.4 mL/min, Rf (min)=5.44. ESI (+ve) observed [M]$^+$=526. Calculated for C$_{26}$H$_{24}$N$_2$O$_8$S=525 Da. $^1$H NMR (300 MHz, DMSO-d$_6$) δ (ppm): 0.88 (dd, J=7.4, 7.2 Hz, 3H), 1.30 (dd, J=7.7, 7.4 Hz, 3H), 1.81-1.94 (m, 2H), 3.16-3.23 (m, 2H), 3.53 (s, 2H), 3.83 (s, 2H), 5.34 (s, 2H), 5.44 (s, 2H), 6.52 (s, 1H), 7.34 (s, 1H), 7.70 (dd, J=9.1, 2.5 Hz, 1H), 8.04 (d, J=2.5 Hz, 1H), 8.25 (d, J=9.1 Hz, 1H), 12.73 (br s, 1H).

(iii) BHALys[Lys]$_{32}$[α-TDA-C10-SN-38]$_{32\dagger}$[ε-PEG$_{\sim 2100}$]$_{32\ddagger}$ Compound 2c

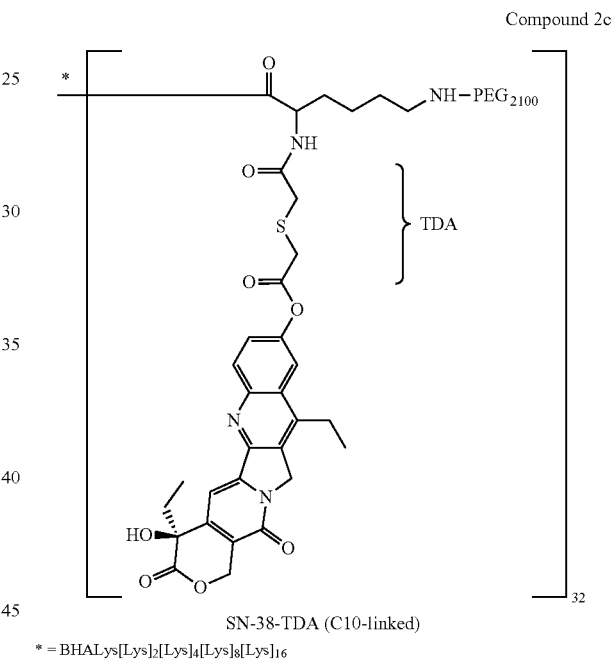

SN-38-TDA (C10-linked)

* = BHALys[Lys]$_2$[Lys]$_4$[Lys]$_8$[Lys]$_{16}$

To a magnetically stirred mixture of TDA-C10-SN-38 (8 mg, 15 µmol) and PyBOP (8 mg, 15 µmol) in DMF (0.3 mL) at room temperature was added a mixture of BHALys[Lys]$_{32}$[α-NH$_2$.TFA]$_{32}$[ε-PEG$_{\sim 2100}$]$_{32\ddagger}$ (28 mg, 0.37 µmol) and NMM (6.5 µL, 59 µmol), also in DMF (0.7 mL). After 16 hours at room temperature the volatiles were removed and the residue purified by size exclusion chromatography (Sephadex, LH-20, MeOH). The appropriate fractions, as judged by HPLC, were combined and concentrated, taken up in water, filtered (0.45 µm) and lyophilised, providing 29 mg (89%) of desired material as a yellow-orange solid.

HPLC (C8 Aeris WIDEPORE, 100×2.1 mm), gradient: 5% ACN/H$_2$O (0-1 min), 5-80% ACN (1-7 min), 80% ACN (7-12 min), 80-5% ACN (12-13 min), 5% ACN (13-15 min), 214 nm, 10 mM ammonium formate, 0.4 mL/min, Rf (min)=7.94. $^1$H NMR (300 MHz, CD$_3$OD) δ (ppm): 0.16-3.27 (m, 696H), 3.36 (s, 108H), 3.37-4.14 (m, 6,135H), 4.14-4.67 (m, 78H), 4.97-5.88 (m, 56H), 6.82-8.56 (m, 138H). As per example 2a, the number of SN-38 molecules was calculated as 32 and the drug loading 13.8%.

Example 2d Synthesis of BHALys[Lys]$_{32}$[α-TDA-C20-SN-38]$_{32\dagger}$[ε-PEG$_{\sim2300}$]$_{32\ddagger}$ (i) OtBu-TDA-C20-SN-38-O(Boc)

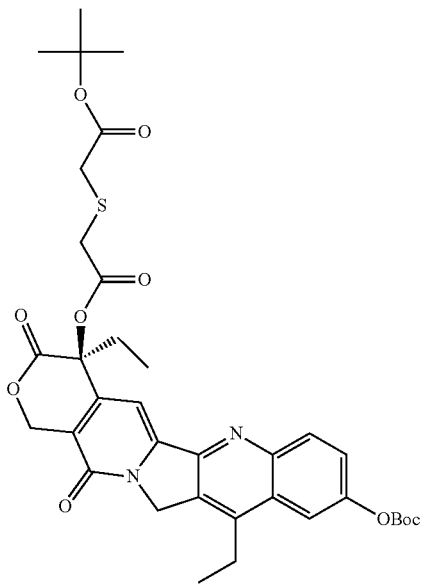

To a magnetically stirred suspension of Boc-C10-SN-38 (306 mg, 0.62 mmol) and thiodiglycolic acid mono-tert-butyl ester (192 mg, 0.93 mmol) in DCM (8 mL) at 0° C. was added EDC (187 μL, 1.05 mmol) and DMAP (23 mg, 0.19 mmol). The mixture was left to stir at 0° C. for 15 minutes, and then at room temperature for 3h until the reaction was judged >70% complete by HPLC. The reaction mixture was filtered (0.45 μm) and diluted with 7 mL DCM. 15 mL of phosphate buffer (5% NaCl and 1% NaH$_2$PO$_4$ in water, pH adjusted to 3 with 5% HCl) was added, followed by 15 mL EtOAc. After separation of the phases, the organic layer was dried over MgSO$_4$, filtered (0.7 μm) and concentrated. The residue was purified by preparative HPLC (BEH 300 Waters XBridge C18, 5 μM, 30×150 mm, 30-90% ACN/H$_2$O (5-40 min), 0.1% TFA, RT=44 min) providing 230 mg (54%) of product as a yellow solid.

LCMS (C8, gradient: 40% ACN/H$_2$O (0-1 min), 40-90% ACN (1-7 min), 90% ACN (7-9 min), 90-40% ACN (9-11 min), 40% ACN (11-15 min), 0.1% formic acid, 0.4 mL/min, Rf (min)=8.28. ESI (+ve) observed [M]$^+$=681. Calculated for C$_{35}$H$_{40}$N$_2$O$_{10}$S=681 Da. $^1$H NMR (300 MHz, DMSO-d$_6$) δ (ppm): 0.94 (dd, J=7.4, 7.3 Hz, 3H), 1.28 (dd, J=7.6, 7.5 Hz, 3H), 1.38 (s, 9H), 1.54 (s, 9H), 2.10-2.23 (m, 2H), 3.16-3.24 (m, 2H), 3.36-3.51 (m, 2H, partly hidden under DMSO-de peak), 3.70 (dd, J=19.6, 15.2 Hz, 2H), 5.35 (s, 2H), 5.52 (s, 2H), 7.16 (s, 1H), 7.74 (dd, J=9.2, 2.5 Hz, 1H), 8.10 (d, J=2.5 Hz, 1H), 8.18 (d, J=9.2 Hz, 1H).

(ii) TDA-C20-SN-38

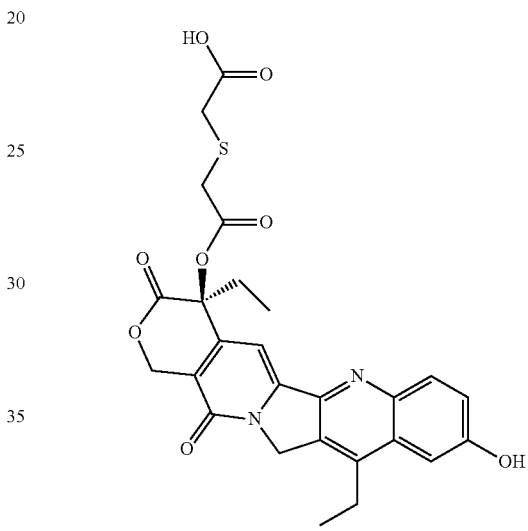

A solution of OtBu-TDA-C20-SN-38-O(Boc) (333 mg, 0.49 mmol) in TFA (20 mL) was magnetically stirred at room temperature for 4h. The volatiles were removed in vacuo and the residue azeotroped with DCM, cooled to 0° C., mixed with water and lyophilised, providing 337 mg (>95%) of product as a yellow-orange solid.

LCMS (C8, gradient: 15% ACN/H$_2$O (0-1 min), 15-25% ACN (1-2 min), 25% ACN (2-8 min), 25-80% ACN (8-10 min), 80% ACN (10-11 min), 80-15% ACN (11-13 min), 15% ACN (13-15 min), 10 mM ammonium formate (pH 6.8), 0.4 mL/min, Rf (min)=5.93. ESI (+ve) observed [M]$^+$= 525. Calculated for C$_{26}$H$_{24}$N$_2$O$_8$S=525 Da. $^1$H NMR (300 MHz, DMSO-d$_6$) δ (ppm): 0.94 (dd, J=7.3, 7.4 Hz, 3H), 1.29 (dd, J=7.6, 7.4 Hz, 3H), 2.08-2.21 (m, 2H), 3.09 (dd, J=14.9, 7.3 Hz, 2H), 3.42 (dd, J=17.6, 15.6 Hz, 2H), 3.68 (dd, J=21.5, 15.0 Hz, 2H), 5.29 (s, 2H), 5.50 (s, 2H), 7.07 (s, 1H), 7.38-7.42 (m, 2H), 8.00-8.03 (m, 1H), 10.31 (br s, 1H).

(iii) BHALys[Lys]$_{32}$[α-TDA-C20-SN-38]$_{32†}$[ε-PEG$_{~2300}$]$_{32‡}$

Compound 2d

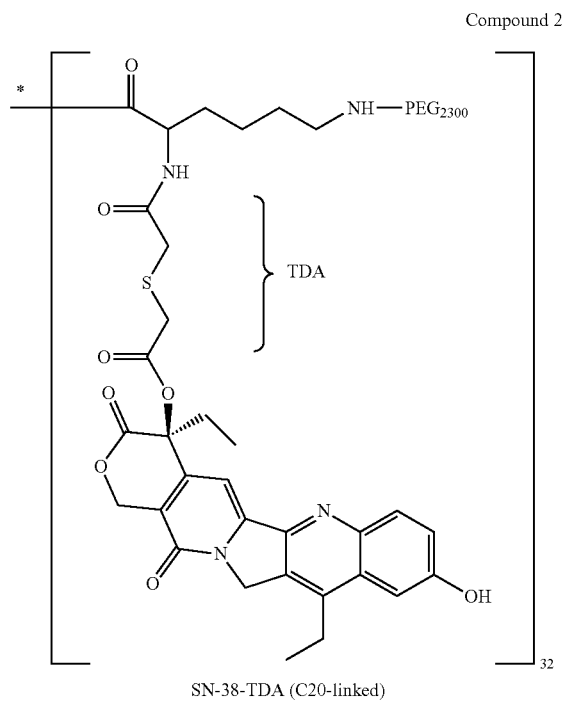

SN-38-TDA (C20-linked)
* = BHALys[Lys]$_2$[Lys]$_4$[Lys]$_8$[Lys]$_{16}$

To a magnetically stirred mixture of TDA-C20-SN-38 (250 mg, 476 μmol) and PyBOP (248 mg, 476 μmol) in DMF (10 mL) at room temperature was added a mixture of BHALys[Lys]$_{32}$[α-NH$_2$.TFA]$_{32}$[ε-PEG$_{~2300}$]$_{32‡}$ (851 mg, 11.5 μmol) and NMM (201 μL, 1.83 mmol) in DMF (12 mL). After 16 hours at room temperature the reaction mixture was added to a chilled (0° C.) solution of 1% AcOH in 3:7 ACN/water (220 mL), filtered and concentrated to 35 mL via ultrafiltration (0.005 m$^2$, 10 kDa, regenerated cellulose filter membrane). The concentrate was subjected to further ultrafiltration with 17×35 mL diafiltrations (1% AcOH in 3:7 ACN/water). The retentate was lyophilised, providing 983 mg of the product. This material was dissolved in THF (4.5 mL) and added to chilled (0° C.) MTBE (20 mL). The mixture was stirred at 0° C. (1 h) and the resulting precipitate isolated by filtration. The product was dried under vacuum (72 h), providing 816 mg (82%) of the desired material as a yellow solid.

HPLC (C8 Xbridge, 3×100 mm), gradient: 5% ACN/H$_2$O (0-1 min), 5-80% ACN (1-7 min), 80% ACN (7-12 min), 80-5% ACN (12-13 min), 5% ACN (13-15 min), 243 nm, 10 mM ammonium formate, 0.4 mL/min, Rf (min)=8.70. NMR (300 MHz, CD$_3$OD) δ (ppm): 0.65-2.48 (m, 532H), 2.52-3.26 (m, 122H), 3.36 (s, 102H), 3.37-4.13 (m, 5,803H), 4.13-4.66 (m, 99H), 5.15-5.99 (m, 60H), 6.84-7.99 (m, 183H). As per example 2a, the number of SN-38 molecules was calculated as 31 and the drug loading 14.1%.

Example 2e Synthesis of BHALys[Lys]$_{32}$[α-DGA-C10-SN-38]$_{32†}$[ε-PEG$_{~2300}$]$_{32‡}$ (i) DGA-C10-SN-38

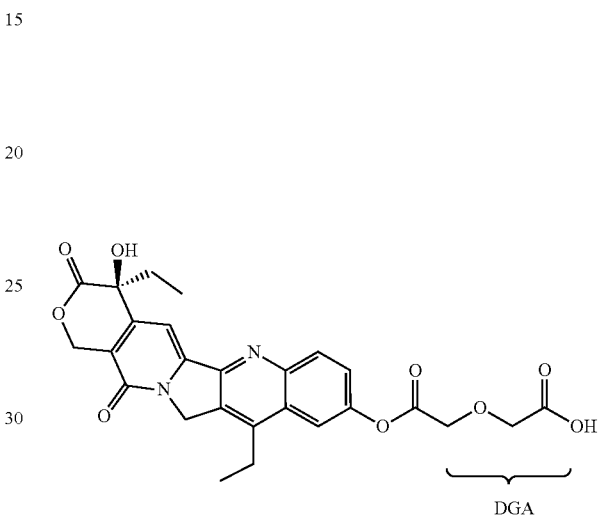

To a magnetically stirred suspension of SN-38 (100 mg, 0.26 mmol) and diglycolic anhydride (89 mg, 0.77 mmol) in DCM (3 mL) at room temperature was added triethylamine (106 μL, 0.77 mmol). The mixture was left to stir at room temperature. After 20 minutes the reaction was diluted with a DMF/acetonitrile (1:5 v/v, containing 0.1% TFA) and purified by preparative HPLC (BEH 300 Waters XBridge C18, 5 μM, 30×150 mm, 10-50% ACN/H$_2$O (5-40 min), 0.1% TFA, RT=36.3 min) providing 33 mg (25%) product as a yellow solid.

LCMS (C8, gradient: 15% ACN/H$_2$O (0-1 min), 15-25% ACN (1-2 min), 25% ACN (2-8 min), 25-80% ACN (8-10 min), 80% ACN (10-11 min), 80-15% ACN (11-13 min), 15% ACN (13-15 min), 10 mM ammonium formate (pH 6.8), 0.4 mL/min, Rf (min)=5.11. ESI (+ve) observed [M]$^+$= 509. Calculated for C$_{26}$H$_{24}$N$_2$O$_9$=508 Da. $^1$H NMR (300 MHz, DMSO-d$_6$) δ (ppm): 0.88 (dd, J=7.4, 7.2 Hz, 3H), 1.30 (dd, J=7.7, 7.5 Hz, 3H), 1.81-1.94 (m, 2H), 3.15-3.22 (m, 2H), 4.27 (s, 2H), 4.60 (s, 2H), 5.34 (s, 2H), 5.44 (s, 2H), 6.51 (br s, 1H), 7.33 (s, 1H), 7.72 (dd, J=9.1, 2.5 Hz, 1H), 8.08 (d, J=2.5 Hz, 1H), 8.23 (d, J=9.1 Hz, 1H), 12.79 (br s, 1H).

(ii) BHALys[Lys]$_{32}$[α-DGA-C10-SN-38]$_{32\dagger}$[ε-PEG$_{\sim2300}$]$_{32\ddagger}$ Example 2f Synthesis of BHALys[Lys]$_{32}$[α-DGA-C20-SN-38]$_{32\dagger}$[ε-PEG$_{\sim2100}$]$_{32\ddagger}$ (i) OtBu-DGA-C20-SN-38

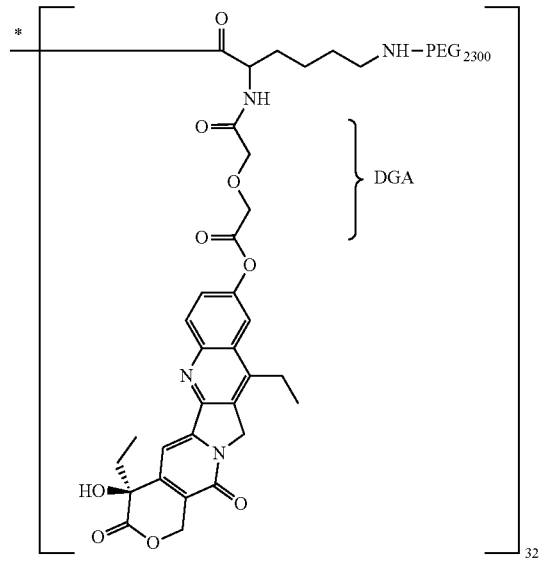

Compound 2e

SN-38-DGA (C10-linked)

* = BHALys[Lys]$_2$[Lys]$_4$[Lys]$_8$[Lys]$_{16}$

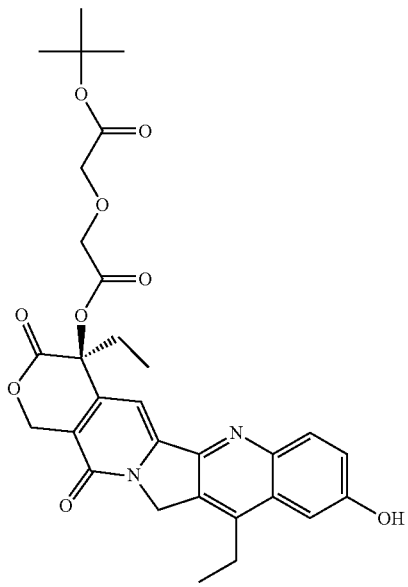 [SMILES: CCc1c2c(nc3ccc(O)cc13)-c1cc3c(c(=O)n1C2)COC(=O)[C@@]3(CC)OC(=O)COCC(=O)OC(C)(C)C]

To a magnetically stirred mixture of DGA-C10-SN-38 (63 mg, 124 μmol) and PyBOP (64 mg, 124 μmol) in DMF (2 mL) at room temperature was added a mixture of BHALys[Lys]$_{32}$[α-NH$_2$.TFA]$_{32}$[8-PEG$_{\sim2300}$]$_{32\ddagger}$ (213 mg, 2.87 μmol) and NMM (50 μL, 0.46 mmol), also in DMF (3 mL). After 16 hours at room temperature the volatiles were removed and the residue purified by size exclusion chromatography (Sephadex, LH-20, ACN). The appropriate fractions, as judged by HPLC, were combined and concentrated. The residue was then taken up in water, filtered (0.45 μm) and lyophilised, providing 211 mg (85%) of desired material as a yellow solid.

HPLC (C8 Xbridge, 3×100 mm), gradient: 5% ACN/H$_2$O (0-1 min), 5-80% ACN (1-7 min), 80% ACN (7-12 min), 80-5% ACN (12-13 min), 5% ACN (13-15 min), 243 nm, 0.1% TFA, 0.4 mL/min, Rf (min)=8.35. $^1$H NMR (300 MHz, CD$_3$OD) δ (ppm): 0.68-2.37 (m, 506H), 2.53-3.27 (m, 148H), 3.36 (s, 102H), 3.37-4.03 (m, 5,940H), 4.03-4.74 (m, 169H), 4.93-5.77 (m, 60H), 6.87-8.58 (m, 136H). As per example 2a, the number of SN-38 molecules was calculated as 31 and the drug loading 14.1%.

To a magnetically stirred suspension of SN-38 (100 mg, 0.26 mmol) and diglycolic acid mono-tert-butyl ester (63 mg, 0.33 mmol) in DCM (1.5 mL) at room temperature was added EDC (76 μL, 0.43 mmol) and a solution of DMAP (31 mg, 0.26 mmol) in DCM (1 mL). The mixture was left to stir at room temperature for 48 h. The reaction mixture was then filtered (0.22 μm) and the volatiles removed in vacuo. The residue was purified by preparative HPLC (BEH 300 Waters XBridge C18, 5 μM, 30×150 mm, 30-65% ACN/H$_2$O (5-40 min), 0.1% TFA, RT=37 min) providing 29 mg (20%) of product as a yellow solid.

LCMS (C18, gradient: 5% ACN/H$_2$O (0-1 min), 5-60% ACN (1-10 min), 60% ACN (10-11 min), 60-5% ACN (11-13 min), 5% ACN (13-15 min), 0.1% formic acid, 0.4 mL/min, Rf (min)=11.83. ESI (+ve) observed [M]$^+$=565. Calculated for C$_{30}$H$_{32}$N$_2$O$_9$=565 Da. $^1$H NMR (300 MHz, DMSO-d$_6$) δ (ppm): 0.92 (dd, J=7.4, 7.3 Hz, 3H), 1.29 (dd, J=7.6, 7.5 Hz, 3H), 1.40 (s, 9H), 2.08-2.21 (m, 2H), 3.09 (dd, J=15.0, 7.4 Hz, 2H), 4.08 (s, 2H), 4.39 (d, J=17.0 Hz, 1H), 4.56 (d, J=17 Hz, 1H), 5.29 (dd, J=20.5, 18.9 Hz, 2H), 5.51 (s, 2H), 7.00 (s, 1H), 7.40 (s, 1H), 7.41 (d, J=7.4, 2.6 Hz, 1H), 8.01-8.04 (m, 1H), 10.31 (br s, 1H).

(ii) DGA-C20-SN-38

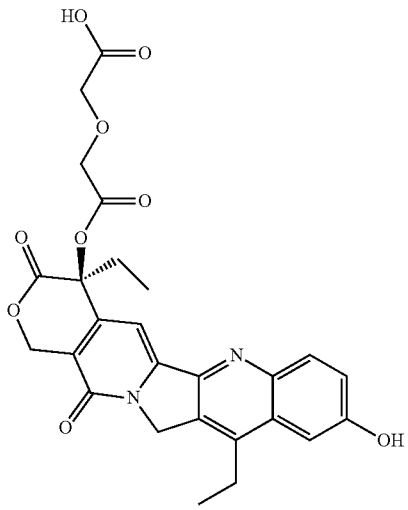 [SMILES: CCc1c2c(nc3ccc(O)cc13)-c1cc3c(c(=O)n1C2)COC(=O)[C@@]3(CC)OC(=O)COCC(=O)O]

A solution of OtBu-DGA-C20-SN-38 (29 mg, 0.051 mmol) in TFA (5 mL) was magnetically stirred at room temperature overnight. The volatiles were then removed in vacuo and the residue azeotroped with DCM, mixed with water and lyophilised, providing 23 mg (88%) of product as a yellow solid.

LCMS (C18, gradient: 5% ACN/H$_2$O (0-1 min), 5-60% ACN (1-10 min), 60% ACN (10-11 min), 60-5% ACN (11-13 min), 5% ACN (13-15 min), 0.1% formic acid, 0.4 mL/min, Rf (min)=9.12. ESI (+ve) observed [M+H]$^+$=509. Calculated for C$_{26}$H$_{24}$N$_2$O$_9$=508 Da. $^1$H NMR (300 MHz, DMSO-d$_6$) δ (ppm): 0.92 (dd, J=7.4, 7.3 Hz, 3H), 1.29 (dd, J=7.6, 7.4 Hz, 3H), 2.08-2.21 (m, 2H), 3.09 (dd, J=15.0, 7.4 Hz, 2H), 4.12 (s, 2H), 4.40 (d, J=17.0 Hz, 1H), 4.57 (d, J=17 Hz, 1H), 5.29 (s, 2H), 5.51 (s, 2H), 7.00 (s, 1H), 7.40 (s, 1H), 7.41 (dd, J=7.0, 2.5 Hz, 1H), 8.02-8.05 (m, 1H), 10.31 (s, 1H), 12.75 (br s, 1H).

(iii) BHALys[Lys]$_{32}$[α-DGA-C20-SN-38]$_{32†}$[ε-PEG$_{\sim 2100}$]$_{32‡}$

Compound 2f

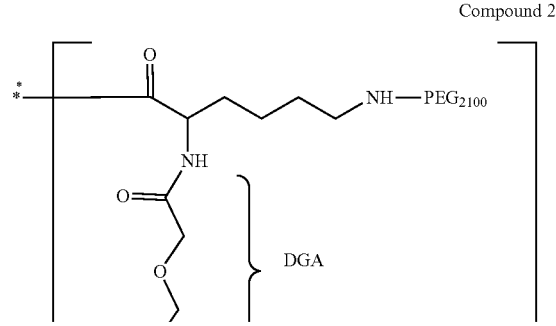

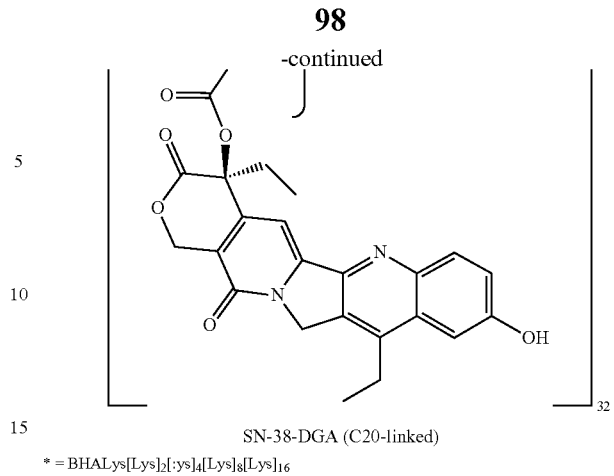

SN-38-DGA (C20-linked)

* = BHALys[Lys]$_2$[:ys]$_4$[Lys]$_8$[Lys]$_{16}$

To a magnetically stirred mixture of DGA-C20-SN-38 (20 mg, 39 μmol) and PyBOP (20 mg, 39 μmol) in DMF (0.6 mL) at room temperature was added a mixture of BHALys [Lys]$_{32}$[α-NH$_2$.TFA]$_{32}$[S-PEG$_{\sim 2100}$]$_{32‡}$ (70 mg, 0.91 μmol) and NMM (16 μL, 146 μmol) in DMF (1 mL). After 16 hours at room temperature the volatiles were removed and the residue purified by size exclusion chromatography (Sephadex, LH-20, MeOH). The appropriate fractions, as judged by HPLC, were combined and concentrated, then taken up in water, filtered (0.45 μm) and lyophilised, providing 72 mg (89%) of desired material as a yellow solid.

HPLC (C8 Aeris WIDEPORE, 100×2.1 mm), gradient: 5% ACN/H$_2$O (0-1 min), 5-80% ACN (1-7 min), 80% ACN (7-12 min), 80-5% ACN (12-13 min), 5% ACN (13-15 min), 214 nm, 10 mM ammonium formate, 0.4 mL/min, Rf (min)=7.96. $^1$H NMR (300 MHz, CD$_3$OD) δ (ppm): 0.53-3.24 (m, 813H), 3.36 (s, 106H), 3.37-4.04 (m, 6,070H), 4.04-4.65 (m, 155H), 5.18-5.91 (m, 53H), 6.75-8.37 (m, 137H). As per example 2a, the number of SN-38 molecules was calculated as 32 and the drug loading 13.9%.

2g BHALys[Lys]$_{32}$ [Modified-Glu-C10-SN-38]$_{32†}$ [ε-PEG$_{\sim 2100}$]$_{32‡}$ (i) OtBu-Modified-Glu-C10-SN-38

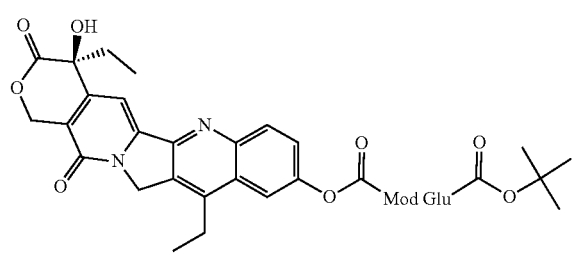

To a magnetically stirred suspension of SN-38 (100 mg, 0.26 mmol) and modified glutaric acid mono-tert-butyl ester (72 mg) in DCM (2 mL) at room temperature was added EDC (76 μL, 0.43 mmol) and a solution of DMAP (31 mg, 0.26 mmol) in DCM (0.5 mL). The mixture was left to stir at room temperature overnight, after which the reaction was judged 70% complete by HPLC. The mixture was filtered (0.2 μm), concentrated in vacuo to approximately 3 mL and diluted with 3 mL acetonitrile containing 0.1% TFA. The solvents were again removed in vacuo and the residue purified by preparative HPLC (BEH 300 Waters XBridge C18, 5 µM, 30×150 mm, 35% ACN/water (0-5 min), 35-70% ACN (5-40 min), 70% ACN (40-43 min), 70-80% ACN (43-44 min), 80% ACN (44-49 min), 80-35% ACN (49-50 min), 35% ACN (50-60 min), 0.1% TFA) providing 101 mg (67%) of OtBu-modified-Glu-C10-SN-38 (RT=48.9 min) as a yellow solid after lyophilisation.

LCMS (C8, gradient: 40% ACN/H$_2$O (0-1 min), 40-90% ACN (1-7 min), 90% ACN (7-9 min), 90-40% ACN (9-11 min), 40% ACN (11-15 min), 0.1% formic acid, 0.4 mL/min, Rf (min)=7.46. ESI (+ve) observed [M]$^+$=591. Calculated for compound 32 591 Da.

(ii) Modified-Glu-C10-SN-38

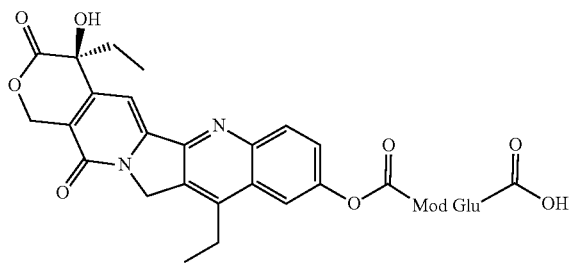

A solution of OtBu-modified-Glu-C10-SN-38 (95 mg) in TFA (10 mL) was magnetically stirred at room temperature overnight. The volatiles were removed in vacuo and the residue azeotroped with DCM, mixed with water and lyophilised, providing 90 mg (>95%) of modified-Glu-C10-SN-38 as a yellow-orange solid.

LCMS (C8, gradient: 40% ACN/H$_2$O (0-1 min), 40-90% ACN (1-7 min), 90% ACN (7-9 min), 90-40% ACN (9-11 min), 40% ACN (11-15 min), 0.1% formic acid, 0.4 mL/min, Rf (min)=3.72. ESI (+ve) observed [M]$^+$=535. Calculated for compound=535 Da.

(iii) BHALys[Lys]$_{32}$[α-Modified-Glu-C10-SN-38]$_{32\dagger}$[ε-PEG$_{~2100}$]$_{32\ddagger}$ Compound 2g

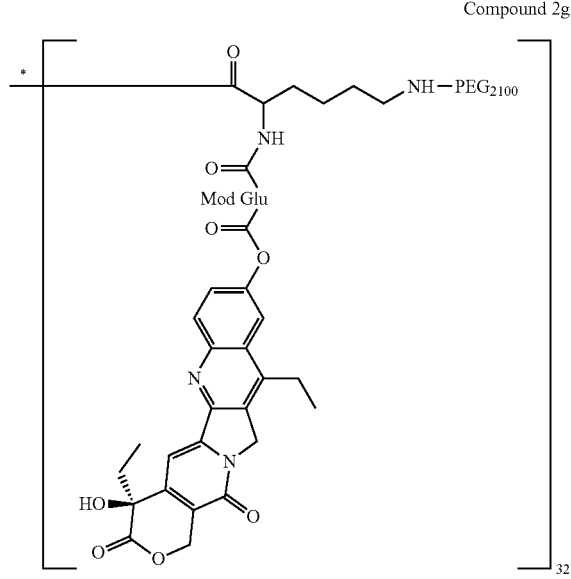

SN-38-modified-Glu (C10-linked)
* = BHALys[Lys]$_2$[Lys]$_4$[Lys]$_8$[Lys]$_{16}$ To a magnetically stirred mixture of modified-Glu-C10-SN-38 (33 mg) and PyBOP (32 mg, 61 µmol) in DMF (1 mL) at room temperature was added a mixture of BHALys[Lys]$_{32}$[α-NH$_2$.TFA]$_{32}$[ε-PEG$_{~2100}$]$_{32\ddagger}$ (110 mg, 1.42 µmol) and NMM (25 µL, 227 µmol) in DMF (2 mL). After 16 hours at room temperature the volatiles were removed in vacuo and the residue purified by size exclusion chromatography (Sephadex, LH-20, MeOH). The appropriate fractions, as judged by HPLC, were combined and concentrated. The residue was taken up in water, filtered (0.45 µm) and lyophilised, providing 120 mg (94%) of desired material as a yellow solid.

HPLC (Aeris WIDEPORE, 100×2.1 mm), gradient: 5% ACN/H$_2$O (0-1 min), 5-80% ACN (1-7 min), 80% ACN (7-12 min), 80-5% ACN (12-13 min), 5% ACN (13-15 min), 214 nm, 10 mM ammonium formate, 0.4 mL/min, Rf (min)=8.04. As per example 2a, the number of SN-38 molecules was calculated as 31 and the drug loading 13.4%.

Example 2h Synthesis of BHALys[Lys]$_{32}$[α-modified-TDA-C10-SN-38]$_{32\dagger}$[ε-PEG$_{~2300}$]$_{32\ddagger}$ (i) OtBu-Modified-TDA-C10-SN-38

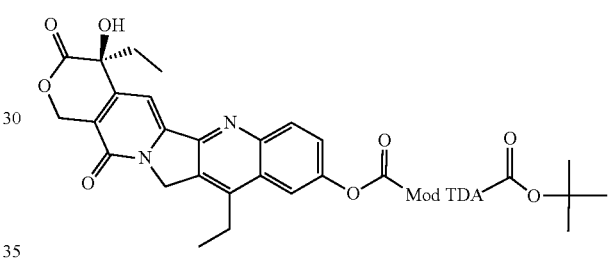

To a magnetically stirred suspension of SN-38 (35 mg, 0.089 mmol) and modified thiodiglycolic acid mono-tert-butyl ester (24 mg) in DCM (1 mL) at room temperature was added, EDC (24 µL, 0.13 mmol) and a solution of DMAP (10 mg, 0.079 mmol) in DCM (0.5 mL). The mixture was left to stir at room temperature overnight. The volatiles were removed in vacuo and the residue purified by preparative HPLC (BEH 300 Waters XBridge C18, 5 µM, 30×150 mm, 35% ACN/water (0-5 min), 35-70% ACN (5-40 min), 70% ACN (40-43 min), 70-80% ACN (43-44 min), 80% ACN (44-49 min), 80-35% ACN (49-50 min), 35% ACN (50-60 min), 0.1% TFA) providing 13 mg (24%) of OtBu-modified-TDA-C10-SN-38 (RT=44.3 min) as a yellow solid.

(ii) Modified-TDA-C10-SN-38

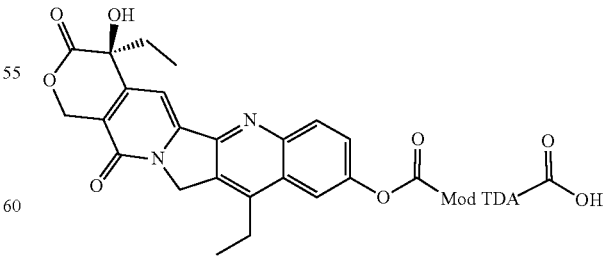

A solution of OtBu-modified-TDA-C10-SN-38 (13 mg, 0.021 mmol) in TFA (2 mL) was magnetically stirred at room temperature overnight. The volatiles were then removed in vacuo and the residue azeotroped with DCM, mixed with water and lyophilised, providing 14 mg (>95%) of modified-TDA-C10-SN-38 as a yellow-orange solid.

LCMS (C8, gradient: 15% ACN/H$_2$O (0-1 min), 15-25% ACN (1-2 min), 25% ACN (2-8 min), 25-80% ACN (8-10 min), 80% ACN (10-11 min), 80-15% ACN (11-13 min), 15% ACN (13-15 min), 10 mM ammonium formate, 0.4 mL/min, Rf (min)=6.47 and 6.57 (two isomer peaks). ESI (+ve) observed [M]$^+$=553. Calculated for compound=553 Da.

(iii) BHALys[Lys]$_{32}$[α-3,5-DM-TDA-C10-SN-38]$_{32\dagger}$[ε-PEG$_{\sim2300}$]$_{32\ddagger}$

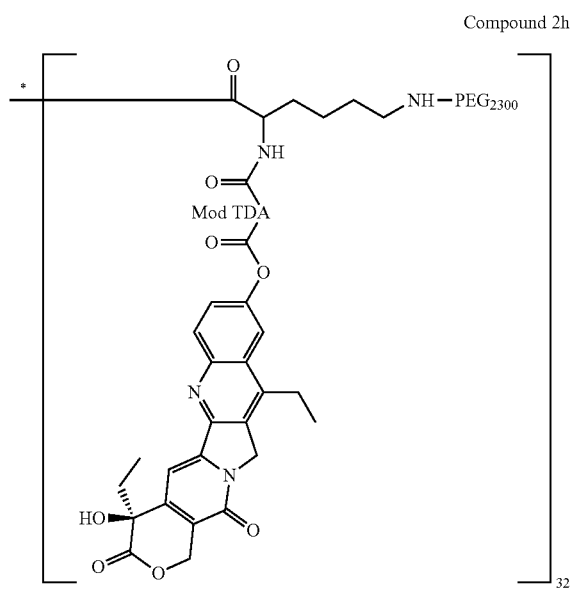

Compound 2h

SN-38-modified-TDA (C10-linked)
* = BHALys[Lys]$_2$[Lys]$_4$[Lys]$_8$[Lys]$_{16}$ To a magnetically stirred mixture of modified-TDA-C10-SN-38 (64 mg, 116 μmol) and PyBOP (60 mg, 116 μmol) in DMF (2.5 mL) at room temperature was added a mixture of BHALys[Lys]$_{32}$[α-NH$_2$.TFA]$_{32}$[ε-PEG$_{\sim2300}$]$_{32\ddagger}$ (199 mg, 2.68 μmol) and NMM (47 μL, 428 μmol) in DMF (2.5 mL). After 16 hours at room temperature, the volatiles were removed in vacuo and the residue purified by size exclusion chromatography (Sephadex, LH-20, MeOH). The appropriate fractions, as judged by HPLC, were combined and concentrated. The residue was dissolved in water, filtered (0.45 μm) and lyophilised, providing 225 mg (96%) of desired material as a yellow solid.

HPLC (C8 Xbridge, 3×100 mm), gradient: 5% ACN/H$_2$O (0-1 min), 5-80% ACN (1-7 min), 80% ACN (7-12 min), 80-5% ACN (12-13 min), 5% ACN (13-15 min), 243 nm, 0.1% TFA, 0.4 mL/min, Rf (min)=8.54. As per Example 2a, the number of SN-38 molecules was calculated as 32 and the drug loading 14.3%.

Example 2i Synthesis of BHALys[Lys]$_{32}$[α-THF-C20-SN-38]$_{32\dagger}$[ε-PEG$_{\sim2300}$]$_{32\ddagger}$ (i) 2,5-THF-C20-SN-38-O(Boc)

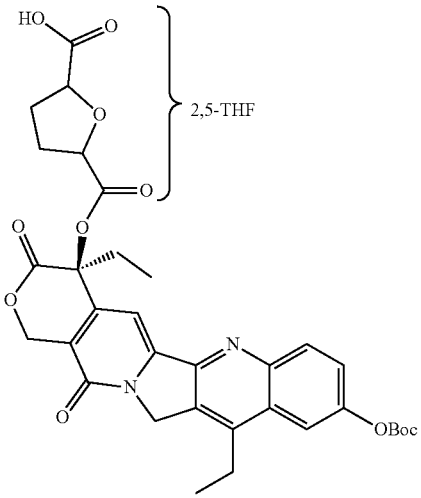

To a magnetically stirred suspension of Boc-C10-SN-38 (Zhao, H. et al, Bioconjugate Chem., 2008, 19, 849-859) (188 mg, 0.38 mmol) and 3,8-dioxabicyclo[3.2.1]octane-2,4-dione (217 mg, 1.53 mmol) in DCM (7.5 mL) at 0° C. was added triethylamine (265 μL, 1.91 mmol) and DMAP (12 mg, 95 μmol). The mixture was left to stir at 0° C. for 1 h until the reaction was judged >80% complete by HPLC. The volatiles were removed in vacuo and the residue purified by preparative HPLC (BEH 300 Waters XBridge C18, 5 μM, 30×150 mm, 35-75% ACN/H$_2$O (5-50 min), 0.1% TFA) providing 151 mg (62%) of 2,5-THF-C20-SN-38 (RT=34.5 min) after lyophilisation as a yellow solid.

LCMS (C8, gradient: 40% ACN/H$_2$O (0-1 min), 40-90% ACN (1-7 min), 90% ACN (7-9 min), 90-40% ACN (9-11 min), 40% ACN (11-15 min), 0.1% formic acid, 0.4 mL/min, Rf (min)=6.25. ESI (+ve) observed [M]$^+$=635. Calculated for C$_{33}$H$_{34}$N$_2$O$_{11}$=635 Da.

(ii) 2,5-THF-C20-SN-38

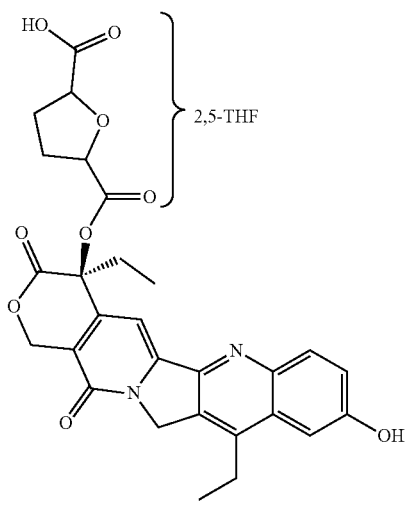 [SMILES: CCc1c2c(nc3ccc(O)cc13)-c1cc3c(c(=O)n1C2)COC(=O)[C@@]3(CC)OC(=O)C1CCC(C(=O)O)O1]

To a magnetically stirred solution of 2,5-THF-C20-SN-38-O(Boc) (151 mg, 0.24 mmol) in dichloromethane (1.4 mL) at 0° C. was added TFA (0.7 mL). The mixture was stirred 0° C. for 5 mins, then at room temperature. After 2.5 h the reaction was diluted with dichloromethane (20 mL). The volatiles were removed in vacuo and the residue azeotroped with DCM, cooled to 0° C., mixed with water and lyophilised, providing 151 mg (>95%) of 2,5-THF-C20-SN-38 as a yellow-orange solid.

HPLC (C8 Xbridge, 3×100 mm), gradient: 5% ACN/H$_2$O (0-1 min), 5-80% ACN (1-7 min), 80% ACN (7-12 min), 80-5% ACN (12-13 min), 5% ACN (13-15 min), 243 nm, 10 mM ammonium formate, 0.4 mL/min, Rf (min)=6.54. $^1$H NMR (300 MHz, DMSO-d$_6$) δ (ppm): 0.92 (dd, J=7.4, 7.3 Hz, 3H), 1.29 (dd, J=7.6, 7.5 Hz, 3H), 2.04-2.43 (m, 6H), 3.09 (dd, J=15.0, 7.3 Hz, 2H), 4.51-4.58 (m, 1H), 4.61-4.68 (m, 1H), 5.29 (s, 2H), 5.49 (s, 2H), 6.96 (s, 1H), 7.38-7.43 (m, 2H), 8.03-8.08 (m, 1H), 10.31 (br s, 1H).

(iii) BHALys[Lys]$_{32}$[α-2,5-THF-C20-SN-38]$_{32\dagger}$[ε-PEG$_{\sim 2300}$]$_{32\ddagger}$ Compound 2i

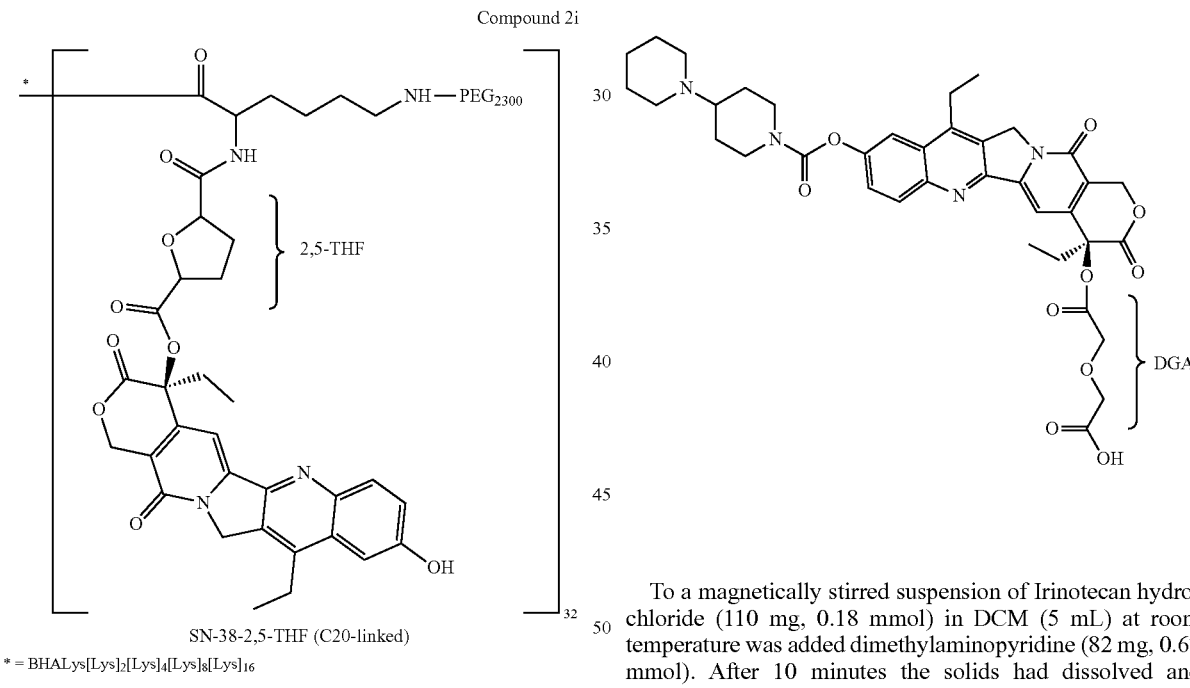

SN-38-2,5-THF (C20-linked)

* = BHALys[Lys]$_2$[Lys]$_4$[Lys]$_8$[Lys]$_{16}$

To a magnetically stirred mixture of 2,5-THF-C20-SN-38 (125 mg, 233 μmol) and PyBOP (121 mg, 234 μmol) in DMF (8 mL) at room temperature was added a mixture of BHALys[Lys]$_{32}$[α-NH$_2$.TFA]$_{32}$[8-PEG$_{\sim 2300}$]$_{32\ddagger}$ (417 mg, 5.6 μmol) and NMM (99 μL, 899 μmol) in DMF (7 mL). After 2 hours at room temperature the reaction mixture was added to a chilled (0° C.) solution of 1% AcOH in 3:7 ACN/water (150 mL), filtered (P3 sinter) and concentrated to approximately 15 mL via ultrafiltration (0.005 m$^2$, 10 kDa, regenerated cellulose filter membrane). The concentrate was subjected to ultrafiltration with 40×15 mL diafiltrations (1% AcOH in 3:7 ACN/MQ water). The retentate was lyophilised, providing 486 mg of product. This material was dissolved in THF (3.8 mL) and added to chilled (0° C.) MTBE (16 mL). The mixture was stirred at 0° C. (1 h) and the resulting precipitate isolated through filtration. The product was dried under vacuum (16 h), providing 388 mg (79%) of the desired material as a yellow solid.

HPLC (C8 Xbridge, 3×100 mm), gradient: 5% ACN/H$_2$O (0-1 min), 5-80% ACN (1-7 min), 80% ACN (7-12 min), 80-5% ACN (12-13 min), 5% ACN (13-15 min), 243 nm, 0.1% TFA, 0.4 mL/min, Rf (min)=8.29. NMR (300 MHz, CD$_3$OD) δ (ppm): 0.27-3.27 (m, 837H), 3.36 (s, 100H), 3.37-3.90 (m, 5,784H), 3.37-4.65 (m, 167H), 4.88-6.02 (m, 94H), 6.83-8.18 (m, 140H). As per Example 2a, the number of SN-38 molecules was calculated as 32 and the drug loading 14.4%.

Example 2j Synthesis of BHALys[Lys]$_{32}$[α-DGA-C20-Irinotecan]$_{32\dagger}$[ε-PEG$_{\sim 2300}$]$_{32\ddagger}$ (i) DGA-C20-Irinotecan To a magnetically stirred suspension of Irinotecan hydrochloride (110 mg, 0.18 mmol) in DCM (5 mL) at room temperature was added dimethylaminopyridine (82 mg, 0.67 mmol). After 10 minutes the solids had dissolved and diglycolic anhydride (51 mg, 0.44 mmol) was added. After 6 hours at room temperature further portions of dimethylaminopyridine (82 mg, 0.67 mmol) and diglycolic anhydride (51 mg, 0.44 mmol) were added. After stirring overnight at room temperature the solvent was removed and the residue was taken up in acetonitrile and purified by preparative HPLC (BEH 300 Waters XBridge C18, 5 μM, 30×150 mm, 5-80% ACN/H$_2$O (5-40 min), 0.1% ammonium formate, RT=37 min) providing 48 mg (39%) of product as a yellow solid.

LCMS (C8, gradient: 40% ACN/H$_2$O (0-1 min), 40-90% ACN (1-7 min), 90% ACN (7-9 min), 90-40% ACN (9-11 min), 40% ACN (11-15 min), 0.1% formic acid, 0.4 mL/min, Rf (min)=7.77. ESI (+ve) observed [M]$^+$=703. Calculated for C$_{37}$H$_{42}$N$_4$O$_{10}$=703 Da.

(ii) BHALys[Lys]$_{32}$[α-DGA-C20-Irinotecan]$_{32\dagger}$[ε-PEG$_{2300}$]$_{32\ddagger}$

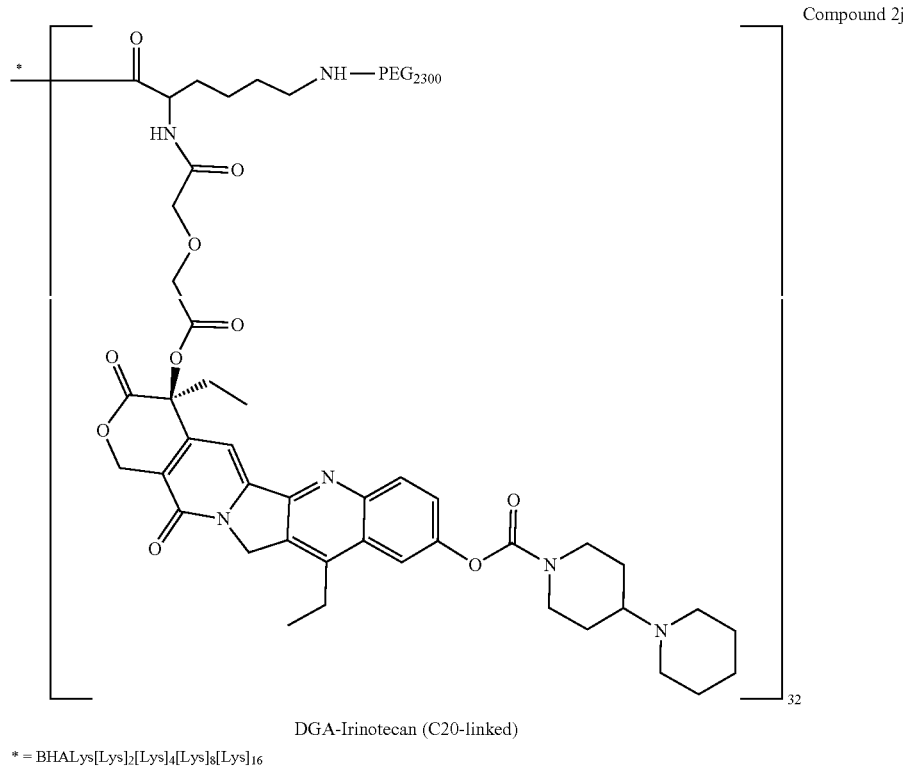

Compound 2j

DGA-Irinotecan (C20-linked)

* = BHALys[Lys]$_2$[Lys]$_4$[Lys]$_8$[Lys]$_{16}$

To a magnetically stirred solution of DGA-Irinotecan (30 mg, 43 µmol) and PyBOP (22 mg, 43 µmol) in DMF (1 mL) was added a solution of BHALys[Lys]$_{32}$[α-NH$_2$.TFA]$_{32}$[ε-PEG$_{2300}$]$_{32\ddagger}$ (92 mg, 1.1 µmol) in DMF (2 mL), followed by NMM (19 µL, 173 µmol). After 16 hours at room temperature the reaction mixture was concentrated in vacuo then dissolved in MeOH (1.5 mL) and purified by SEC (Sephadex, LH-20, MeOH). The product containing fractions were combined and concentrated in vacuo and the resulting residue dissolved in MQ water, filtered (0.2 µm acrodisc) and lyophilised to give the desired product as a pale yellow solid (85 mg, 76%).

HPLC (C8 Xbridge, 3×100 mm), gradient: 5% ACN/H$_2$O (0-1 min), 5-80% ACN (1-7 min), 80% ACN (7-12 min), 80-5% ACN (12-13 min), 5% ACN (13-15 min), 243 nm, 0.1% TFA, 0.4 mL/min, Rf (min)=8.37 min. $^1$H NMR (300 MHz, CD$_3$OD-A) δ (ppm): 0.83-2.43 (m, 1073), 2.84-3.24 (m, 324H), 3.36 (s, 113H), 3.44-3.99 (m, 5900H), 4.03-4.67 (m, 224H), 5.04-6.13 (m, 100H), 7.23-7.94 (m, 139H). As per example 2a, the number of Irinotecan molecules was calculated as 32 and the drug loading as 19.1% w/w.

Example 2k Synthesis of BHALys[Lys]$_{32}$[α-TDA-C20-Irinotecan]$_{32\dagger}$[ε-PEG$_{\sim2100}$]$_{32\ddagger}$ (i) TDA-C20-Irinotecan

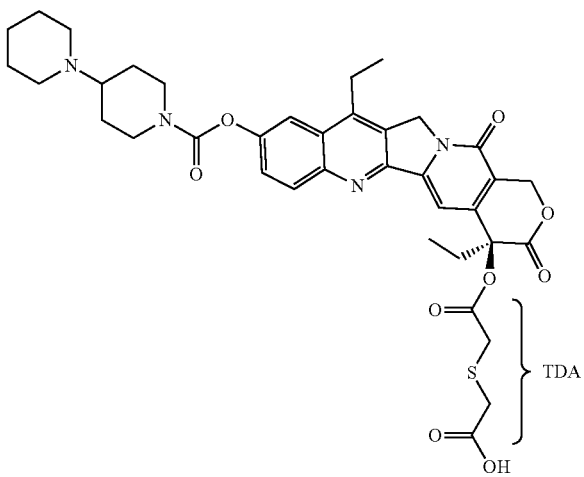

To a magnetically stirred suspension of Irinotecan hydrochloride (112 mg, 0.18 mmol) in DCM (5 mL) at room temperature was added dimethylaminopyridine (89 mg, 0.73 mmol). After 10 minutes the solids had dissolved and thiodiglycolic anhydride (60 mg, 0.45 mmol) was added. After 16 hours at room temperature further portions of dimethylaminopyridine (83 mg, 0.68 mmol) and thiodiglycolic anhydride (63 mg, 0.48 mmol) were added. After stirring a further 3 hours at room temperature the solvent was removed and the residue was taken up in acetonitrile and purified by preparative HPLC (BEH 300 Waters XBridge C18, 5 µM, 30×150 mm, 5-80% ACN/H$_2$O (5-40 min), 0.1% formic acid, RT=33 min) providing 94 mg (73%) of product as a yellow solid.

LCMS (C8, gradient: 40% ACN/H$_2$O (0-1 min), 40-90% ACN (1-7 min), 90% ACN (7-9 min), 90-40% ACN (9-11 min), 40% ACN (11-15 min), 0.1% formic acid, 0.4 mL/min, Rf (min)=6.94. ESI (+ve) observed [M]$^+$=719. Calculated for $C_{37}H_{42}N_4O_9S$=719 Da.

(ii) BHALys[Lys]$_{32}$[α-TDA-C20-Irinotecan]$_{32}$[ε-PEG$_{2100}$]$_{32}$‡

HPLC (C8 Xbridge, 3×100 mm), gradient: 5% ACN/H$_2$O (0-1 min), 5-80% ACN (1-7 min), 80% ACN (7-12 min), 80-5% ACN (12-13 min), 5% ACN (13-15 min), 214 nm, 0.1% TFA, 0.4 mL/min. Rt=8.54 min. $^1$H NMR (300 MHz, CD$_3$OD-d$_4$) δ (ppm): 0.65-2.72 (m, 816H), 2.98-3.32 (m, 231H), 3.36 (s, 137H), 3.38-4.10 (m, 6112H), 4.12-4.71 (m, 144H), 5.04-5.99 (m, 63H), 6.80-8.46 (m, 104H). As per example 2a, the number of Irinotecan molecules was calculated as 24 and the drug loading as 15.4% w/w.

Example 3: Comparative Linker Release Rates in PBS at 37° C. and pH 7.4 and Plasma A study was carried out to determine the rate of SN-38 release from certain dendrimeric compounds in 9:1 PBS (phosphate-buffered saline): DMA at 37° C. and pH 7.4. Results indicating the % SN-38 released at 6 and 18 hours are shown in the table below.

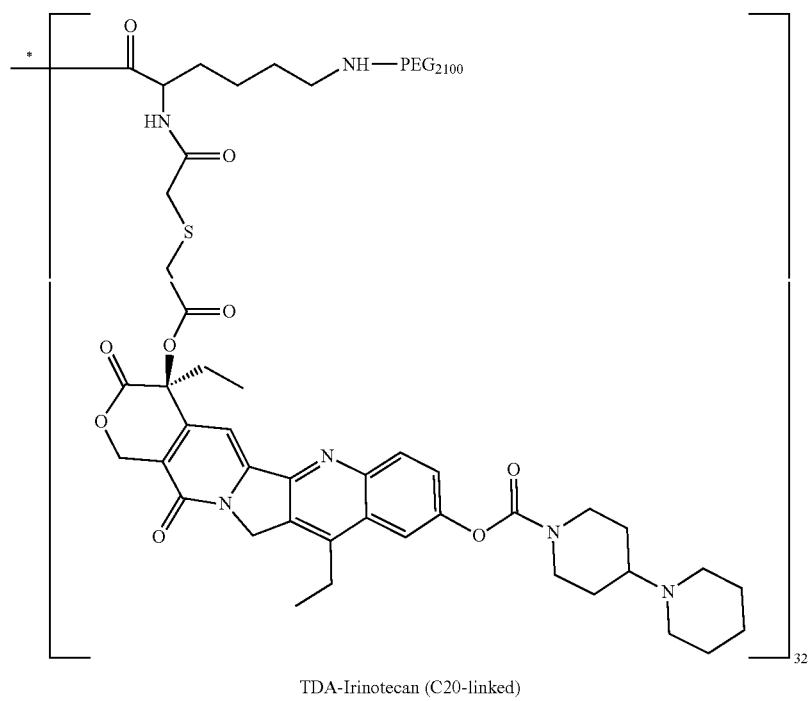

TDA-Irinotecan (C20-linked)

* = BHALys[Lys]$_2$[Lys]$_4$[Lys]$_8$[Lys]$_{16}$

To a magnetically stirred solution of TDA-Irinotecan (38 mg, 52 µmol) and PyBOP (27 mg, 52 µmol) in DMF (1 mL) was added a solution of BHALys[Lys]$_{32}$[α-NH$_2$.TFA]$_{32}$[ε-PEG$_{2100}$]$_{32}$‡ (105 mg, 1.4 µmol) in DMF (2 mL), followed by NMM (23 µL, 210 µmol). After 16 hours at room temperature the reaction mixture was concentrated in vacuo then dissolved in MeOH (1.5 mL) and purified by SEC (Sephadex, LH-20, MeOH). The product containing fractions were combined and concentrated in vacuo, and the resulting residue dissolved in MQ water, filtered (0.2 µm acrodisc) and lyophilised to provide the desired product as a yellow solid (110 mg, 85%).

TABLE 3

| Dendrimer No. | % Release at 6 h in 9:1 PBS/DMA at 37° C. | % Release at 18 h in 9:1 PBS/DMA at 37° C. |
| --- | --- | --- |
| 2a | 9 | 38 |
| 2b | 0 | 3 |
| 2c | 54 | 55 |
| 2d | 5 | 13 |
| 2e | 64 | 71 |
| 2f | 24 | 55 |
| 2h | 31 | 62 |
| 2i | 40 | 60 |

The PBS release study was conducted by preparing 1 mg/mL solutions of dendrimer in 9:1 v/v (PBS/DMA) immediately prior to incubation at 37° C. Samples were analysed at 6 h and 18 h and other timepoints by HPLC, comparing the % peak area of SN-38 to the % peak area of dendrimer construct. HPLC (C8 Xbridge, 3×100 mm), gradient: 5% ACN/H2O (0-1 min), 5-80% ACN (1-7 min), 80% ACN (7-12 min), 80-5% ACN (12-13 min), 5% ACN (13-15 min), 243 nm, 10 mM ammonium formate buffer, 0.4 mL/min.

Figure 13:
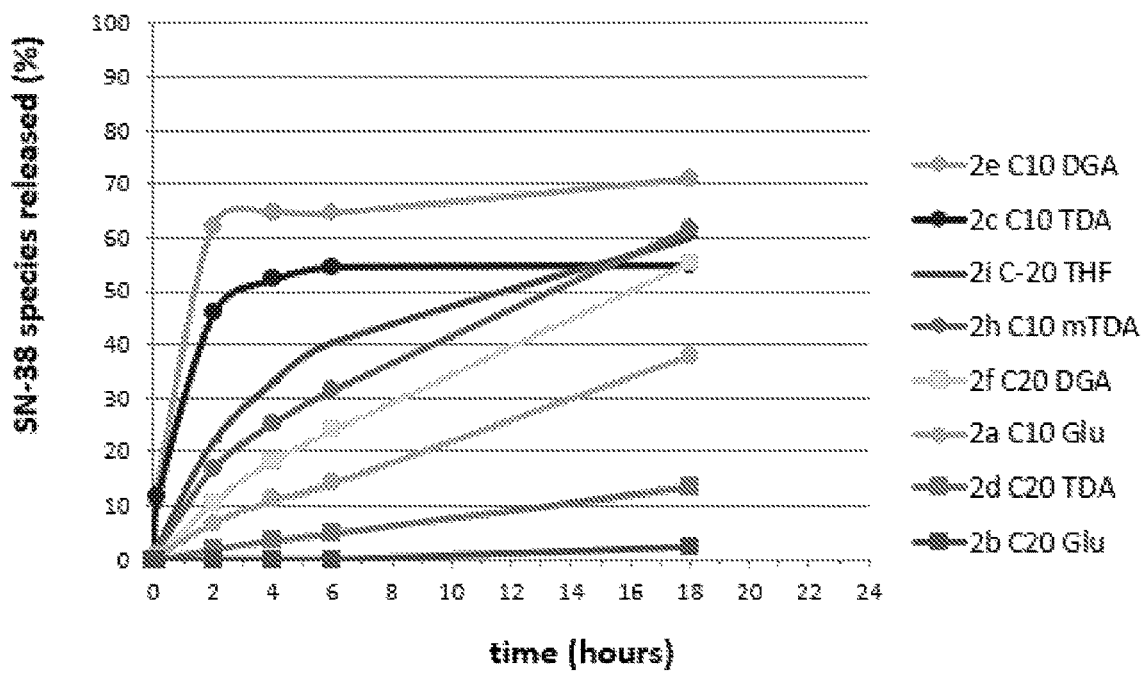
FIG. 13 shows the release of SN-38 species from dendrimers in PBS/DMA over hours.

Release at further time points are shown in FIGS. 13 and 14.

TABLE 4

| time | % SN-38 released | | | | | | | |
|---|---|---|---|---|---|---|---|---|
| (h) | 2a | 2b | 2c | 2d | 2e | 2f | 2g | 2h |
| 0.5 | 1.59 | 0.93 | 20.52 | 1.87 | 30.58 | 5.06 | 0.5 | 4.93 |
| 2 | 4.47 | 1.27 | 38.32 | 5.47 | 57.54 | 24.56 | 0.95 | 12.69 |
| 4 | 7.57 | 1.94 | 48.79 | 9.50 | 67.96 | 45.36 | 1.69 | 20.00 |
| 6 | 11.28 | 2.73 | 53.42 | 14.92 | 75.16 | 61.81 | 2.46 | 27.99 |
| 22 | 42.46 | 12.17 | 69.8 | 46.69 | 95.38 | 95.61 | 11.04 | 69.08 |

The plasma release study was conducted by adding 0.8 mL of rat plasma (centifuged and filtered) to 0.16 mL of dendrimer solution (approximately 2 mg/mL SN-38 equivalent in saline). The mixtures were vortexed (30 s) then incubated at 37° C. At various timepoints aliquots (0.1 mL) were removed and added to ACN (0.2 mL, 5% formic acid). The resulting mixtures were vortexed (30s), centrifuged (10 min, 4° C.), filtered and analysed by HPLC ($C_8$ Xbridge, 3×100 mm, 0.4 mL/min., gradient: 5% ACN/$H_2O$) (0-1 min), 5-80% ACN (1-7 min), 80% ACN (7-12 min), 80-5% ACN (12-13 min), 5% ACN (13-15 min), 243 nm, 0.1% TFA, RT (SN-38)=7.0 min, RT (conjugate)=8.5 min.

Figure 12:
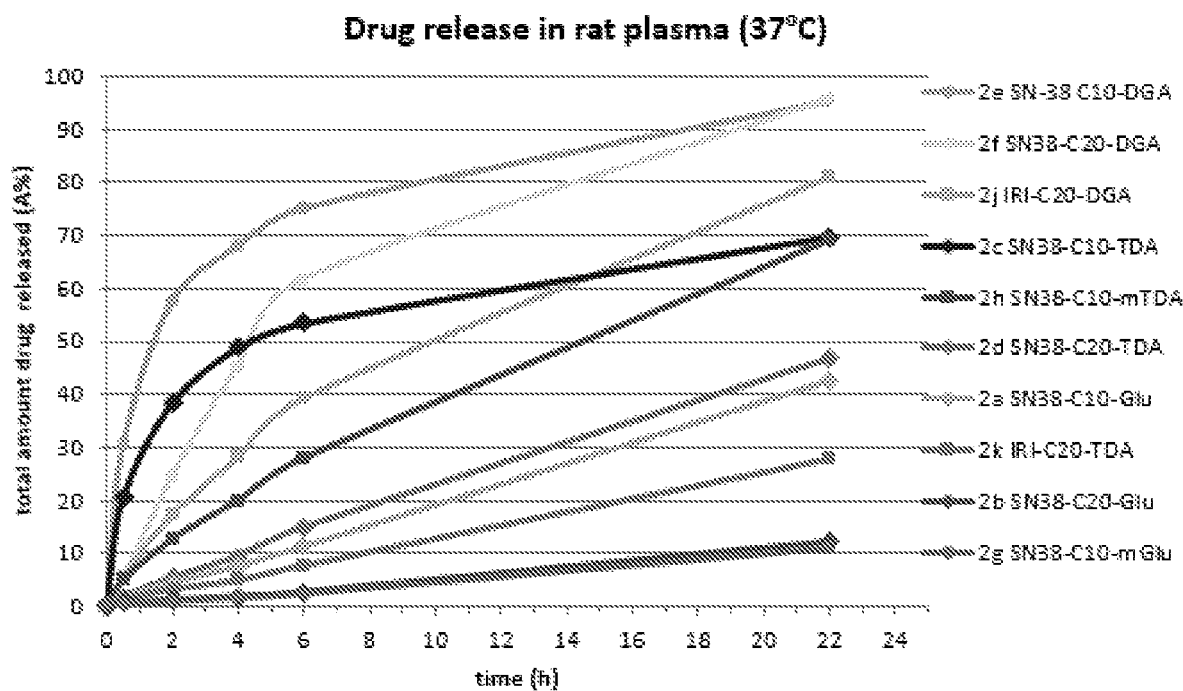
FIG. 12 shows the release of SN-38 species from dendrimers in plasma.

Release data is shown in FIG. 12.

Example 4: In-Vitro Anti-Cancer Drug Screening Assay

A study was carried out to determine the ability of example dendrimers to inhibit growth of HT-29 cells (human colon cancer cell line) using a cell counting (SRB) assay. $GI_{50}$ is the concentration required to inhibit net cell growth by 50%.

TABLE 6

| Dendrimer No./compound | $GI_{50}$ μM |
|---|---|
| 2a | 0.13, 0.13 |
| 2e | <0.01, <0.01 |
| 2f | 0.05, 0.04 |
| 2d | 0.14 |
| 2c | 0.03 |
| 2h | 0.02 |
| 2g | 0.8 |
| 2j | 12 |
| 2k | 46 |
| Irinotecan | 7 |
| SN-38 | <0.01 |

Example 5: Tolerability of Example Dendrimers in Balb/C Nude Mice

The tolerability of four example dendrimers (2a, 2f, 2i and 2h) in Balb/C nude mice was investigated.
Preparation of Samples
The dendrimer constructs were stored at −20° C. until use. Constructs were dissolved in saline immediately prior to dosing. All dendrimers were administered as mg/kg SN-38 equivalents. Irinotecan was diluted in saline each day of dosing.
Experimental Methods
Female Balb/c nude mice (Age 6-8 weeks) were administered an intravenous injection of dendrimer (0.1 ml/10 g body weight) once weekly for 3 weeks (day 1, 8 and 15). Mice were weighed daily and observed for any signs of toxicity (weight loss, poor general health). Animals were monitored for 3-4 weeks following the final drug dose. Any mice exceeding ethical endpoints (≥20% body weight loss, poor general health) were immediately euthanised. The animals were given a small dish of feed supplement (ensure mixed with food dust) daily. Animal body weight changes were assessed every 1-2 days following weekly doses of drug over three weeks. The maximum tolerated drug dose (MTD) is defined as that causing not more than 10% body weight loss and from which the animals recovered weight to baseline levels within 7-10 days.
Results and Discussion
The tolerability of the four SN-38 dendrimers and irinotecan was tested in 1-2 Balb/c mice. The maximum body weight loss associated with each drug and dose tested is summarised in Table 7. On the basis of the body weight loss observed in the SN-38 groups the final doses selected for efficacy studies were 15 mg/kg for 2f and 2i, 25 mg/kg for 2h and 30 mg/kg for 2a. As mice treated at 100 mg/kg irinotecan demonstrated pale extremities and lethargy a dose of 90 mg/kg was selected.

TABLE 7

Drug doses tested for tolerability in Balb/c nude mice

| Compound | Doses tested (mg/kg) | Max. body weight loss (%) |
|---|---|---|
| Irinotecan | 75, 90, 100 | 4, 3, 10 |
| 2a | 10, 30 | 0, 10 |
| 2h | 0.5, 5, 15, 30 | 0, 1, 0, 14 |
| 2f | 15, 20, 30 | 4, 10, 22 |
| 2i | 15, 20, 30 | 8, 15, 15 |

Weight loss was determined as a percentage of baseline body weight.
Conclusions
The dendrimers 2f (15 mg/kg), 2i (15 mg/kg), 2h (25 mg/kg) and 2a (30 mg/kg) given IV. once weekly for three weeks are well tolerated in Balb/c nude mice.

Example 6: Efficacy of Example Dendrimers in SW620 Xenograft Model in Mice

The in vivo anti-tumour activity of four example dendrimers (2f, 2i, 2h & 2a) in the SW620 (human colon carcinoma cell line) xenograft model was investigated.
Preparation of Samples
The dendrimer constructs were stored at −20° C. until use. Constructs were dissolved in saline immediately prior to dosing. All dendrimers were administered as mg/kg SN-38 equivalents. Irinotecan was diluted in saline each day of dosing.

Experimental Methods

Female Balb/c nude mice (Age 7-8 weeks) were inoculated subcutaneously on the flank with $4\times10^6$ SW620 cells in PBS:Matrigel (1:1). Mice were weighed and tumours measured 2-3 times weekly using electronic callipers. Tumour volume (mm$^3$) was calculated as length (mm)/2×width (mm)$^2$. On day twelve after implantation mice with similar sized tumours (mean tumour volume 135 mm$^3$) were randomised into 6 groups of 6 animals (Day 1). Treatment groups were saline, irinotecan (90 mg/kg), 2f (15 mg/kg), 2i (15 mg/kg), 2h (25 mg/kg) and 2a (25 mg/kg). All compounds were given intravenously by tail vein injection on days 1, 8 and 15 at 0.1 ml/10 g body weight. Mice received a small dish containing a food supplement (mixed with food dust) daily. The experiment was ended on day 119 or earlier if an ethical endpoint was met.

Results and Discussion

Figure 1:
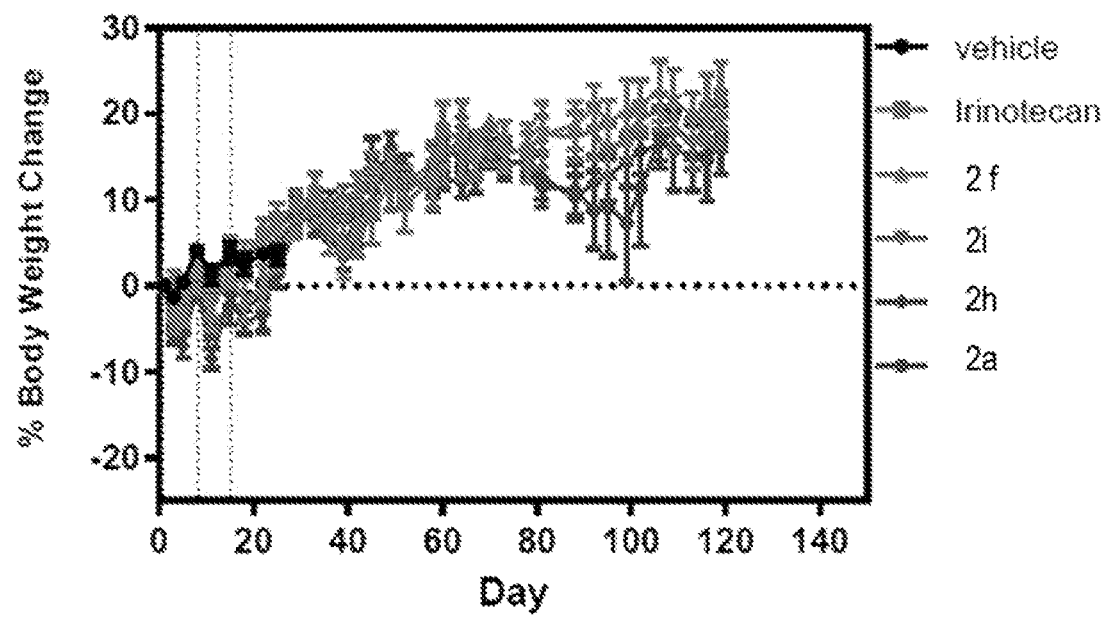
FIG. 1 shows the effect of vehicle, irinotecan, and example dendrimers on SW620 tumour bearing mouse body weight in a colon cancer model study.

Drug toxicity: All compounds were well tolerated and mean weight loss did not exceed 10% in any of the treatment groups. One animal from the 2a group was euthanized during the study due to weight loss on Day 99. The mean animal body weight changes for each group are summarised in FIG. 1 below. The data represent the
mean percent weight change from baseline (day 1) for each group; bars SEM. Graphs are shown for each group until no fewer than 4 animals remained in the group.

Figure 2:
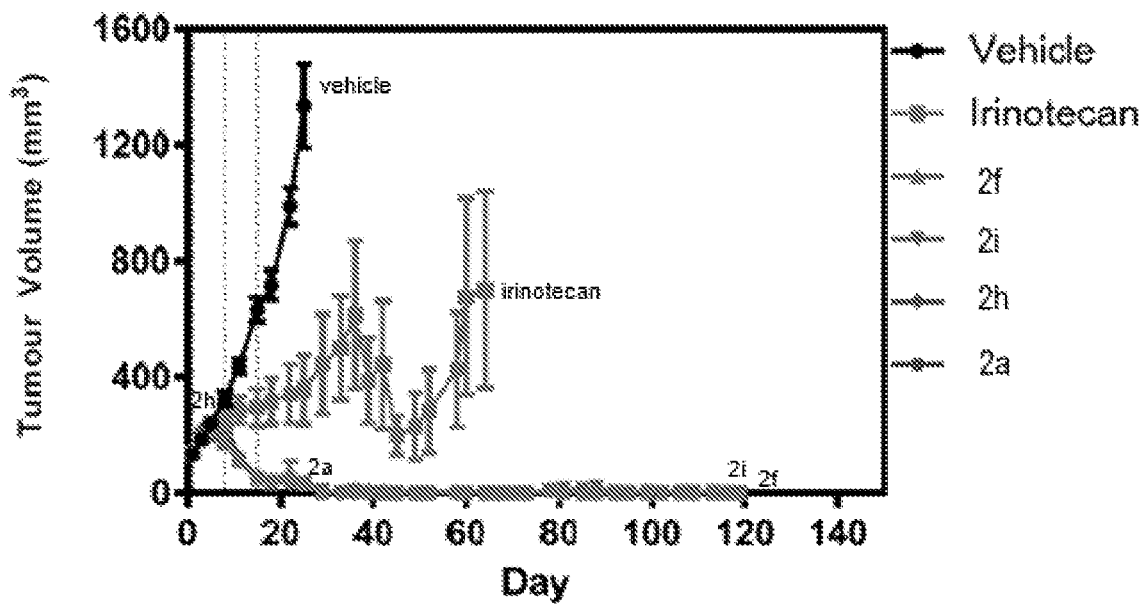
FIG. 2 shows the efficacy of vehicle, irinotecan, and example dendrimers against SW620 tumour xenografts in mice.
Figure 3:
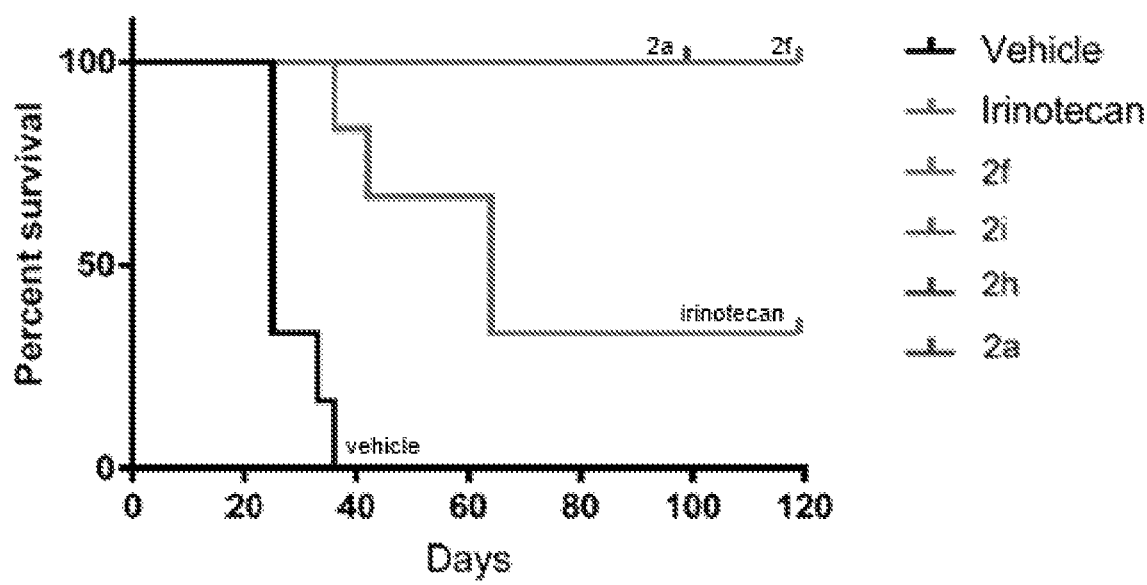
FIG. 3 shows a Kaplan-Meier survival curve of data shown in FIG. 2.

Antitumour Efficacy: FIGS. 2 and 3 summarise the effect of the drug treatments on SW620 tumour growth and survival, respectively. Each of the test drugs induced complete tumour regression with no regrowth observed in any group on Day 119 when the experiment was concluded. In contrast, irinotecan treatment induced a delay of tumour growth with the exception of one tumour, which completely regressed after day 25. Graphs are shown until no fewer than 4 animals remained in a group. FIG. 3 shows a Kaplan-Meier survival curve of data in FIG. 2. The endpoint for the analysis was a tumour volume of 1200 mm$^3$. Mice euthanised due to illness were censored.

Conclusions

The dendrimers 2f (15 mg/kg), 2i (15 mg/kg), 2h (25 mg/kg) and 2a (25 mg/kg) given IV. once weekly for three weeks are well tolerated and induce regression of SW620 tumours in Balb/c nude mice.

Example 7: Efficacy of Example Dendrimers in HT-29 Xenograft Model in Mice

The in vivo anti-tumour activity of three example dendrimers (2f, 2i and 2h) in the HT-29 (human colon carcinoma cell line) xenograft model was investigated.

Preparation of Samples

The dendrimer constructs were stored at −20° C. until use. Constructs were dissolved in saline immediately prior to dosing. All dendrimers were administered as mg/kg SN-38 equivalents. Irinotecan was diluted in saline each day of dosing.

Experimental Methods

Female Balb/c nude mice (Age 7-8 weeks) were inoculated subcutaneously on the flank with $5\times10^6$ HT-29 cells in PBS:Matrigel (1:1). Mice were weighed and tumours measured 2-3 times weekly using electronic callipers. Tumour volume (mm$^3$) was calculated as length (mm)/2×width (mm)$^2$. On day fifteen after implantation mice with similar sized tumours (mean tumour volume 100 mm$^3$) were randomised into 5 groups of 10 animals (Day 1). Treatment groups were saline, irinotecan (90 mg/kg), 2f (15 mg/kg), 2i (15 mg/kg) and 2h (25 mg/kg). All compounds were given intravenously
by tail vein injection on days 1, 8 and at 0.1 ml/10 g body weight. Mice received a small dish containing a food supplement (mixed with food dust) daily. The experiment was ended on day 130 or earlier if an ethical endpoint was met.

Tumour growth data was analysed in GraphPad Prism for ANOVA followed by Dunnett's post-hoc test. Survival curves were analysed using the Mantel Cox log rank test.

Gut Toxicity Analysis

Tumour bearing mice (n=1) were administered with a single iv dose of saline, 90 mg/kg irinotecan or 15 mg/kg 2f. 24 hours later the mice were euthanised, the gut removed and rinsed before being coiled in a cassette before being formalin fixed and paraffin embedded. The tumour from each mouse was harvested, cut into two and half-fixed in formalin and half frozen in OCT freezing medium, µm sections were cut and H&E stained. The slides were imaged on a BX-61 microscope and images taken.

Tissue Samples for Immunohistochemistry and Fluorescence Analysis

Tumour bearing mice (n=2) were treated with 2f (15 mg/kg), 2i (15 mg/kg), 2h (25 mg/kg) and irinotecan (90 mg/kg) once weekly for three weeks. Three days after the final dose the mice were killed, tumours harvested (half formalin fixed and half fixed in OCT), gut prepared as above and a section of muscle fixed in OCT. One untreated animal was harvested as described above.

Results and Discussion

Drug Toxicity

Figure 4:
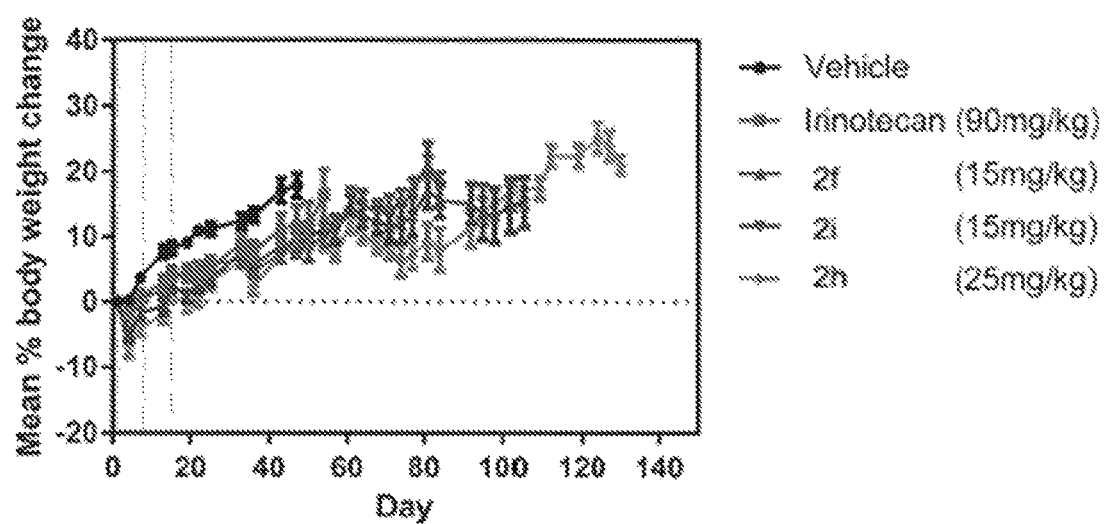
FIG. 4 shows the effect of vehicle, irinotecan, and example dendrimers on HT-29 tumour bearing mouse body weight in a colon cancer model study

All compounds were well tolerated and mean weight loss did not exceed 7% in any of the treatment groups. No animals were euthanised due to toxicity. The mean animal body weight changes for each group are summarised in FIG. 4. The data represent the mean percent weight change from baseline (day 1) for each group; bars SEM. Graphs are shown for each group until no fewer than 6 animals remained in the group.

Antitumour Efficacy

Figure 5:
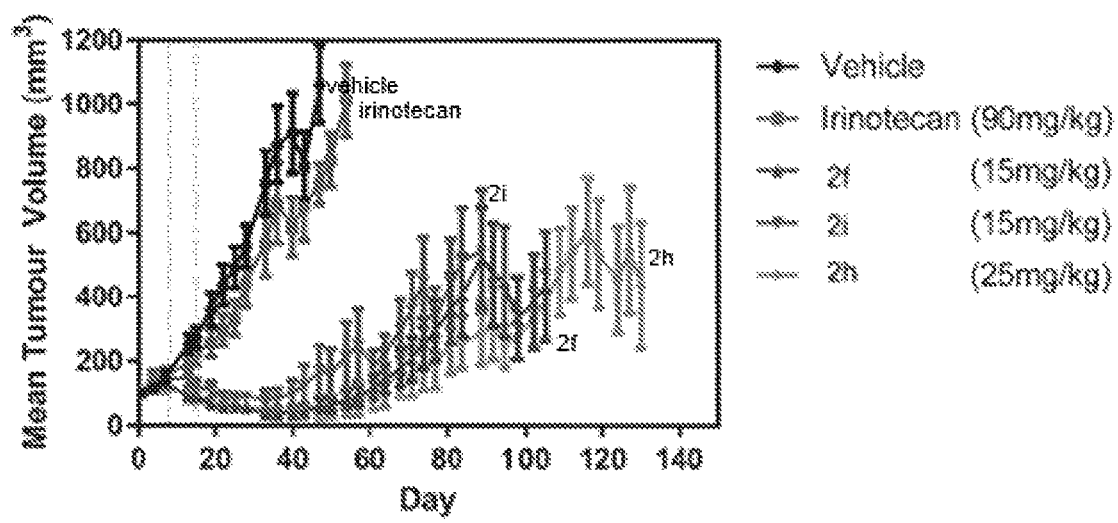
FIG. 5 shows the efficacy of vehicle, irinotecan, and example dendrimers against HT-29 cell line xenografts in mice.
Figure 6:
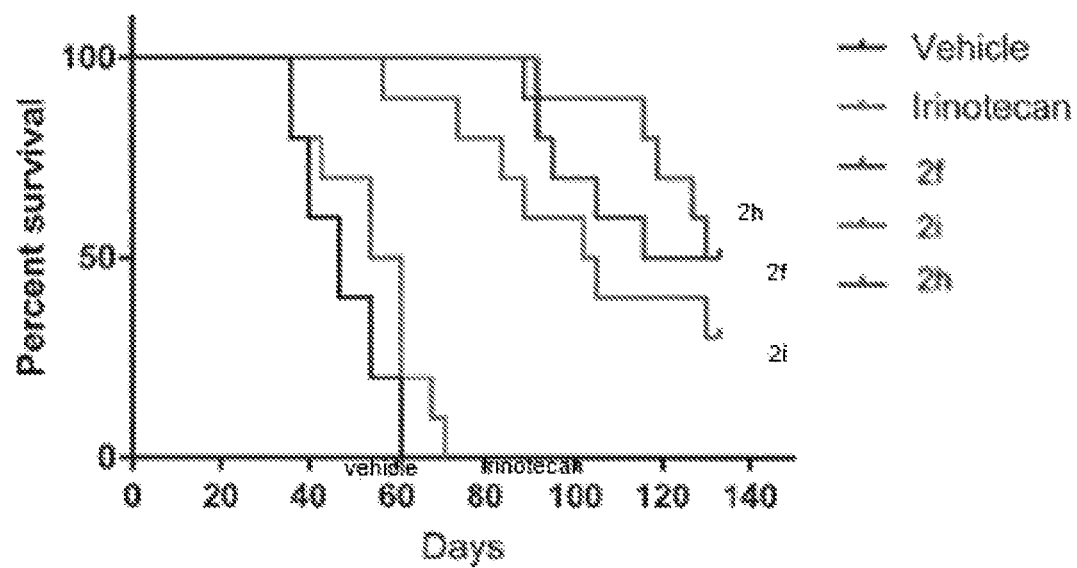
FIG. 6 shows a Kaplan-Meier survival curve of data shown in FIG. 5.

FIGS. 5 and 6 summarise the effects of each drug on HT-29 tumour growth and survival respectively. The endpoint for the analysis in FIG. 6 was a tumour volume of 1200 mm$^3$. Each of the three test drugs transiently induced tumour regression with regrowth evident in all groups by Day 40. Tumour growth in the irinotecan, 2f, 2i and 2h groups was inhibited by 23% (P=n.s. vs vehicle), 108% (P<0.001 vs vehicle), 103% (P<0.0001) and 108% (P<0.0001) respectively on day 36. All three test drugs significantly prolonged survival versus irinotecan (all P<0.0001).

Conclusions

The example dendrimers of Examples 2f (15 mg/kg), 2i (15 mg/kg) and 2h (25 mg/kg) induce transient regression of HT-29 tumours in Balb/c nude mice.

Example 8: Efficacy of Example Dendrimers in MDA-MB-231 Xenograft Model in Mice

The in vivo anti-tumour activity of two example dendrimers (2f and 2h) in the MDA-MB-231 (human breast carcinoma cell line) xenograft model was investigated.

Preparation of Samples

The dendrimer constructs were stored at −20° C. until use. Constructs were dissolved in saline immediately prior to dosing. All dendrimers were administered as mg/kg SN-38 equivalents. Irinotecan was diluted in saline each day of dosing.

Experimental Methods

Female Balb/c nude mice (Age 7 weeks) were inoculated subcutaneously on the flank with $3.5\times10^6$ MDA-MB-231 cells in PBS:Matrigel (1:1). Mice were weighed and tumours measured 2-3 times weekly using electronic callipers. Tumour volume (mm$^3$) was calculated as length (mm)/2×width (mm)$^2$. On day fourteen after implantation mice with similar sized tumours (mean tumour volume 110 mm$^3$) were randomised into 3 groups of 4 animals (Day 1). Treatment groups were saline, irinotecan (90 mg/kg), 2f (15 mg/kg) and 2h (25 mg/kg). All compounds were given intravenously by tail vein injection on days 1, 8 and at 0.1 ml/10 g body weight. Mice received a small dish containing a food supplement (mixed with food dust) daily. The experiment was ended on day 70 or earlier if an ethical endpoint was met.

Results and Discussion

Drug Toxicity

Figure 7:
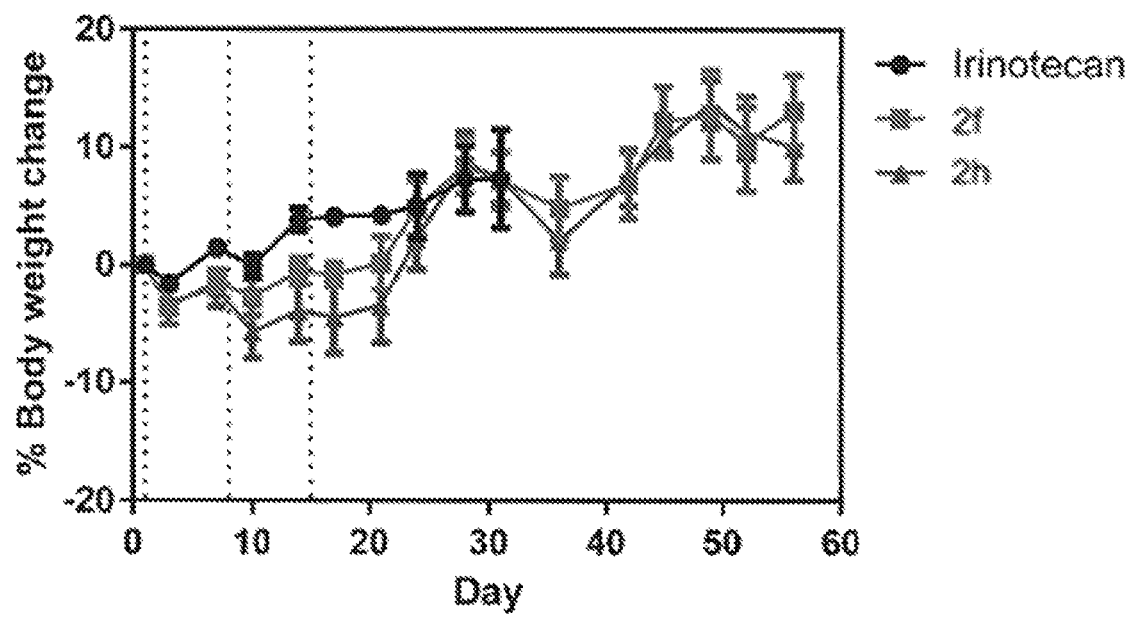
FIG. 7 shows the effect of irinotecan, and example dendrimers on MDA-MB-231 tumour bearing mouse body weight in a breast cancer model study

All compounds were well tolerated and mean weight loss did not exceed 6% in any of the treatment groups. The mean animal body weight changes for each group are summarised in FIG. 7. The data represent the mean percent weight change from baseline (day 1) for each group; bars SEM. Graphs are shown for each group until no fewer than 2 animals remained in the group.

Antitumour Efficacy

Figure 8:
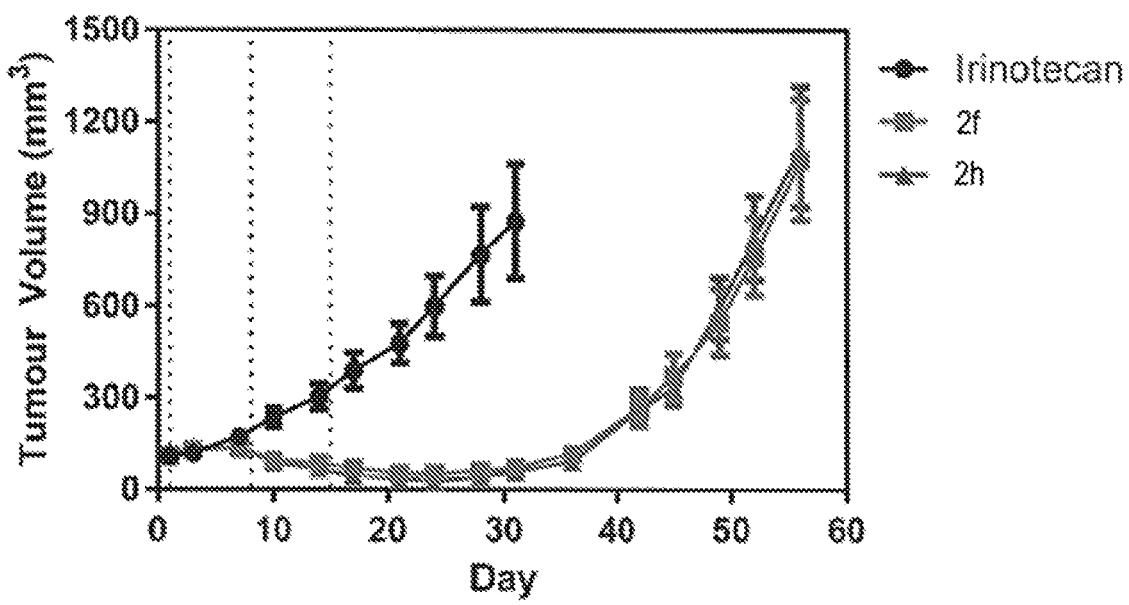
FIG. 8 shows the efficacy of irinotecan, and example dendrimers against MDA-MB-231 cell line xenografts in mice.
Figure 9:
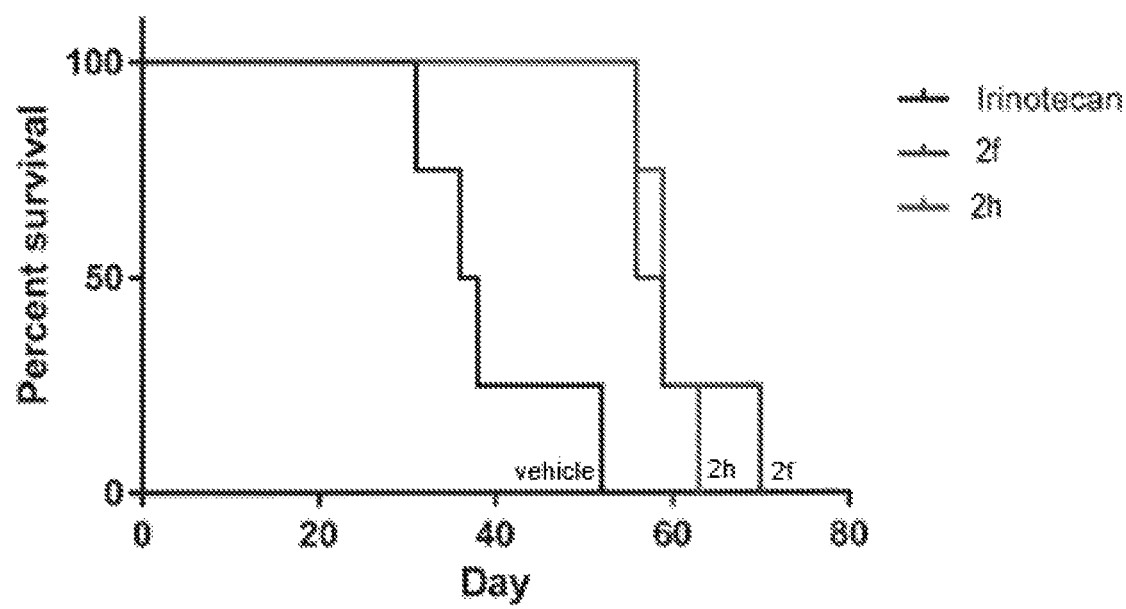
FIG. 9 shows a Kaplan-Meier survival curve of data shown in FIG. 8.

FIGS. 8 and 9 summarise the effects of each drug on MDA-MB-231 tumour growth and survival respectively. Tumour volumes are expressed as mean tumour volume (±SEM). Graphs are shown until no fewer than 2 animals remained in a group. The endpoint for the analysis in FIG. 8 was a tumour volume of 1200 mm$^3$.

The two SN-38 dendrimers exerted identical effects on the tumours, initially inducing tumour regression to day 24 which was followed by tumour regrowth. The tumours in the irinotecan group continued to grow during drug treatment.

Conclusions

The example dendrimers of Examples 2f (15 mg/kg) and 2h (25 mg/kg) induce MDA-MB-231 tumour regression in Balb/c nude mice when given IV once weekly for three weeks.

Example 9: Efficacy of Example Dendrimer in CAP AN-1 Xenograft Model in Mice

The in vivo anti-tumour activity of an example dendrimers (2f) administered intravenously and intraperitoneally in the CAPAN-1 (pancreatic cancer cell line) xenograft model was investigated.

Preparation of Samples

The dendrimer constructs were stored at −20° C. until use. The construct was dissolved in saline immediately prior to dosing. The dendrimer were administered as mg/kg SN-38 equivalents.

Experimental Methods

Mice were inoculated subcutaneously on the hip with CAPAN-1 cells. Mice were weighed and tumours measured 2-3 times weekly using electronic callipers. Tumour volume (mm$^3$) was calculated as length (mm)/2×width (mm)$^2$. On day fourteen after implantation mice with similar sized tumours were randomised into 3 groups of 3 animals (Day 1). Treatment groups were saline, 2f administered intravenously, and 2f administered intraperitoneally. Mice received a small dish containing a food supplement (mixed with food dust) daily.

Results and Discussion

Drug Toxicity

Figure 10:
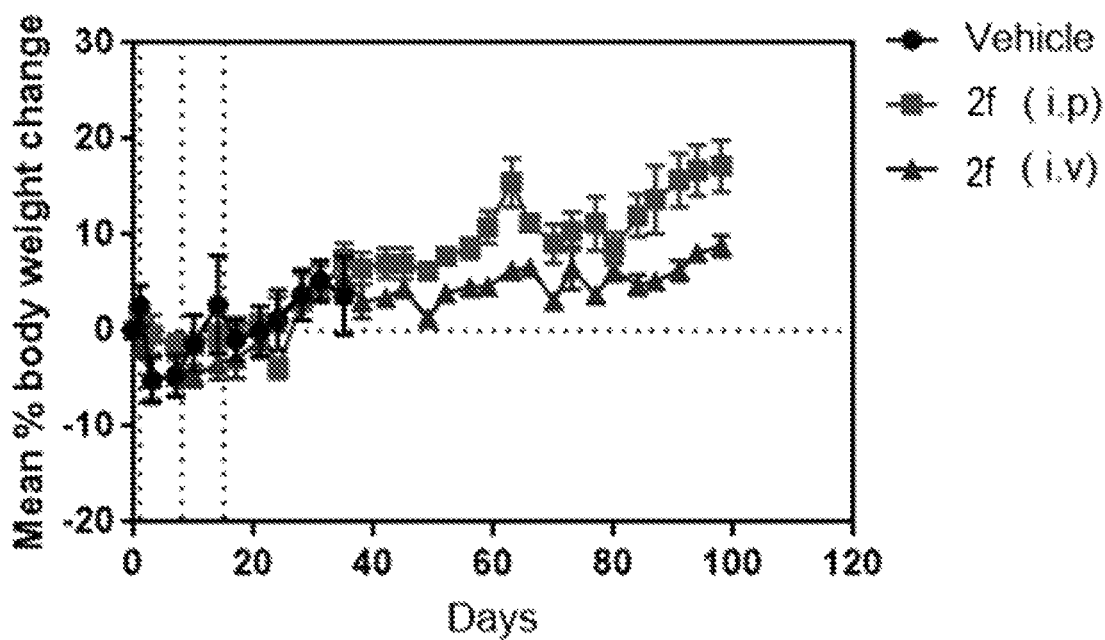
FIG. 10 shows the effect of vehicle, and an example dendrimer administered both intravenously and intraperitoneally on CAPAN-1 tumour bearing mouse body weight in a pancreatic cancer model study

The mean animal body weight changes for each group are summarised in FIG. 10. The data represent the mean percent weight change from baseline (day 1) for each group; bars SEM.

Antitumour Efficacy

Figure 11:
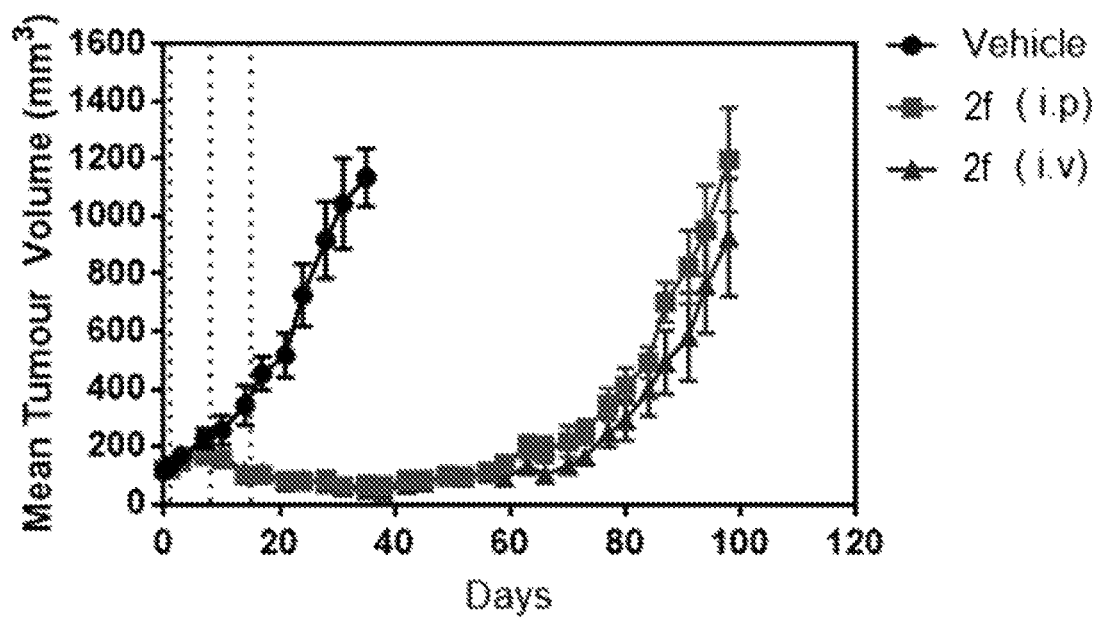
FIG. 11 shows the efficacy of vehicle, and an example dendrimer administered both intravenously and intraperitoneally, against CAPAN-1 cell line xenografts in mice.

FIG. 11 summarises the effects of 2f administered IV and IP on CAP AN-1 tumour growth and survival.

Conclusions

The example dendrimer of Example 2f administered intravenously, or administered intraperitoneally, induces CAPAN-1 tumour regression in mice when given once weekly for three weeks.

Example 10: Efficacy of Example of Dendrimer Dosed Alone or in Combination with Cetuximab in HT-29 Xenograft Model in Mice The in vivo anti-tumour activity of dendrimer (2f) at lower doses as well as in combination with the EGFR agent cetuximab (Erbitux®) was explored in the HT-29 (human colon carcinoma cell line) xenograft model.

Preparation of Samples

The dendrimer constructs were stored at −20° C. until use. Constructs were dissolved in saline immediately prior to dosing. All dendrimers were administered as mg/kg SN-38 equivalents. Irinotecan was diluted in saline each day of dosing.

Experimental Methods

Female Balb/c nude mice (Age 7-8 weeks) were inoculated subcutaneously on the flank with 5×10$^6$ HT-29 cells in PBS:Matrigel (1:1). Mice were weighed and tumours measured 2-3 times weekly using electronic callipers. Tumour volume (mm$^3$) was calculated as length (mm)/2×width (mm)$^2$. On day fifteen after implantation mice with similar sized tumours (mean tumour volume 100 mm$^3$) were randomised into 7 groups of 8 animals (Day 1). Treatment groups were saline, irinotecan (35 mg/kg), cetuximab (25 mg/kg), dendrimer 2f alone (10 mg/kg and 5 mg/kg), dendrimer 2f (10 mg/kg and 5 mg/kg) in combination with cetuximab (25 mg/kg). All compounds were given intravenously by tail vein injection on days 1,8, 15 and 22 at 0.1 ml/10 g body weight. Mice received a small dish containing a food supplement (mixed with food dust) daily. Mice were culled if an ethical endpoint was met. The endpoint for the analysis was either a tumour volume of 1200 mm$^3$ or day 55 which ever came earlier.

Tumour growth data was analysed in GraphPad Prism for ANOVA followed by Dunnett's post-hoc test. Survival curves were analysed using the Mantel Cox log rank test.

Results and Discussion

Drug Toxicity

All compounds were well tolerated and mean weight loss did not exceed 9% in any of the treatment groups. No animals were euthanised due to toxicity.

Antitumour Efficacy

FIGS. 15 and 16 summarise the effects of each drug when dosed alone on HT-29 tumour growth and survival respectively. Irinotecan had little effect on this cell line (irinotecan resistant cell line), whilst cetuximab had only a modest effect. In comparison the dendrimer 2f displayed a clear dose repose with statistically significant tumour regression. Example 2f significantly prolonged survival versus irinotecan (P<0.0001) as previously shown in Example 7 above. Example 2f also prolonged survival versus cetuximab.

The higher dose of 10 mg/kg demonstrated virtually the same effect as shown in FIGS. 1 to 10 above indicating a wide therapeutic window between efficacy and safety.

FIGS. 17 and 18 summarise the effects of combining Irinotecan or dendrimer with cetuximab on HT-29 tumour growth and survival respectively. The combination of Irinotecan and cetuximab displayed only a very modest effect compared to administration of each drug alone, whereas the combination of cetuximab and low dose (5 mg/kg) 2f provided an unexpected benefit to efficacy and survival clearly indicating the potentiation effect of the dendrimer on the activity of cetuximab.

Example 11: Efficacy of Example of Dendrimer Dosed Alone or in Combination with Olaparib in HT-29 Xenograft Model in Mice The in vivo anti-tumour activity of dendrimer (2f) at lower doses as well as in combination with the PARP inhibitor olaparib was explored in the HT-29 (human colon carcinoma cell line) xenograft model.

Preparation of Samples

The dendrimer constructs were stored at −20° C. until use. Constructs were dissolved in saline immediately prior to dosing. All dendrimers were administered as mg/kg SN-38 equivalents. Irinotecan clinical preparation (DBL™-Irinotecan, Hospira Australia Pty Ltd) was diluted in saline each day of dosing. Olaparib solid powder obtained from MedChemExpress was solubilised in DMSO and an oral formulation was prepared at a final concentration of 5 mg/ml in 10% DMSO: 15% (2-Hydroxypropyl)-β-cyclodextrin in sterile water.

Experimental Methods

Female Balb/c nude mice (Age 7-8 weeks) were inoculated subcutaneously on the flank with $5 \times 10^6$ HT-29 cells in PBS:Matrigel (1:1). Mice were weighed and tumours measured 2-3 times weekly using electronic callipers. Tumour volume ($mm^3$) was calculated as length (mm)/2×width $(mm)^2$. On day thirteen after implantation mice with similar sized tumours (mean tumour volume 100 $mm^3$) were randomised into 8 groups of 10 animals (Day 1). Treatment groups were saline, irinotecan (80 mg/kg) or in combination with olaparib, olaparib (50 mg/kg), dendrimer 2f alone (5 mg/kg and 8 mg/kg), dendrimer 2f (5 mg/kg and 8 mg/kg) in combination with olaparib (50 mg/kg). All compounds were given intravenously by tail vein injection on days 1, 8, and 15 at 0.1 ml/10 g body weight, except (i) olaparib was given orally 5 days on/2 days off for 3 weeks, (ii) groups receiving dendrimer 8 mg/kg were administered the third dose on day 16 and (iii) in the dendrimer 8 mg/kg+olaparib group–3/10 mice missed 1-2 olaparib doses during weeks 2 and/or 3. Mice received a small dish containing a food supplement (mixed with food dust) daily. Mice were culled if an ethical endpoint was met. The endpoint for the analysis was a tumour volume of 1200 $mm^3$.

Statistical analysis of tumour growth was performed on day 28 when the first study animals reached endpoint criteria for tumour burden.

TABLE

Percent tumour growth inhibition analysis.

| Treatment | Percent TGI | P (vs vehicle) |
|---|---|---|
| Olaparib | 0 | 0.9999 |
| Irinotecan | 33 | 0.0446 |
| Irinotecan + Olaparib | 37 | 0.0171 |
| 5 mg/kg 2f | 62 | <0.0001 |
| 5 mg/kg 2f + Olaparib | 100 | <0.0001 |

TABLE-continued

Percent tumour growth inhibition analysis.

| Treatment | Percent TGI | P (vs vehicle) |
|---|---|---|
| 8 mg/kg 2f | 97 | <0.0001 |
| 8 mg/kg 2f + Olaparib | 107 | <0.0001 |

Results and Discussion

Drug Toxicity

All compounds were well tolerated and mean weight loss did not exceed 8% in any of the treatment groups. No animals were euthanised due to toxicity with all animals remaining in the study until day 28.

Antitumour Efficacy

FIG. 19 summarises the effects of each drug when dosed alone on HT-29 tumour growth. Olaparib alone has no effect on tumour growth in this model. Irinotecan had a moderate effect on tumour growth (33% TGI at day 28). In comparison the dendrimer 2f displayed a clear dose dependent repose with statistically significant inhibition of tumour growth (62% and 94% TGI at day 28 for 5 mg/kg and 8 mg/kg, respectively). Example 2f significantly inhibited tumour growth and prolonged tumour regression versus irinotecan (P <0.0001) as previously shown in Examples 7 and 10 above. Example 2f also prolonged tumour regression versus olaparib.

FIG. 19 also summarises the effects of combining irinotecan or dendrimer with olaparib on HT-29 tumour growth. The combination of irinotecan and olaparib was better than each drug alone, whereas the combination of olaparib and low dose (5 mg/kg) 2f provided an unexpected benefit to efficacy with complete tumour growth suppression (100% TGI on day 28 clearly indicating that olaparib potentiates the anti-tumour activity of 2f Likewise the combination of olaparib with 8 mg/kg 2f also enhanced activity with tumour regression evident by day 28 (% TGI was >100%).

Example 12: Efficacy of Example of Dendrimer Dosed Alone or in Combination with PD-1 Inhibitor in CT26 Model in Mice The in vivo anti-turn our activity of dendrimer (2f) in combination with a PD-1 inhibitor will be explored in the CT26.WT (ATCC) (colon carcinoma cell line) syngeneic model.

Preparation of Samples

The dendrimer constructs were stored at −20° C. until use. Constructs will be dissolved in saline immediately prior to dosing. All dendrimers to be administered as mg/kg SN-38 equivalents. PD-1 antibody (InVivoMAb anti-mouse PD-1 (CD279) (Clone: RMP1-14)) and Isotype control (InVivoMAb rat IgG2a isotype control, anti-trinitrophenol) are diluted in saline each day of dosing.

Experimental Methods

Female Balb/c mice (age 7-8 weeks) are inoculated subcutaneously on the flank with $5 \times 10^6$ CT26 cells in PBS:Matrigel (1:1). Mice are weighed and tumours measured 2-3 times weekly using electronic callipers. Tumour volume ($mm^3$) is calculated as length (mm)/2×width $(mm)^2$. On day thirteen after implantation, mice with similar sized tumours (mean tumour volume 100 $mm^3$) are randomised into groups of 6 animals (Day 1). Treatment groups are saline and compound 2f (15 mg/kg), alone or in combination with antibody (200 μg i.p. on day 1, 100 μg i.p. on days 4, 8 and 12). All dendrimer treatments are given intravenously by tail vein injection on days 1, 8, and 15 at 0.1 ml/10 g body weight. Mice are culled if an ethical endpoint is met. The endpoint for the analysis is a tumour volume of 1200 mm³. Analysis of tumour growth is performed when the first study animals reach endpoint criteria for tumour burden.

TABLE

Anticipated Percentage tumour growth inhibition (TGI) analysis.

| Treatment | Percentage TGI |
| --- | --- |
| Vehicle + isotype control | 0 |
| Anti PD-1 | About 20% |
| 15 mg/kg 2f + isotype control | About 60% (as above) |
| 15 mg/kg 2f + anti PD-1 | About 100% |

Example 13: Pharmacokinetic Study

Single dose toxicity study of 2f was conducted in rats to compare to irinotecan. 5 groups of Sprague-Dawley rats each received single slow bolus IV injection of vehicle, low (approx. 1.3 mg/kg SN-38 equivalents), medium (approx. 7.5 mg/kg SN-38 equiv) or high dose (approx. 16.5 mg/kg SN-38 equivalents) of 2f, or irinotecan 70 mg/kg (approx. 40 mg/kg SN-38 equivalents). (n=18 per group except vehicle n=6)

Blood samples were collected from alternating subgroups of 6 animals at 5 m, 30 m, 2 h, 4 h, 8 h, 24 h, 72 h and 120 h post dose and analysed for total and free SN-38 by LC-MS/MS), and the pharmacokinetic properties determined. The results are summarised in the below tables.

TABLE

Pharmacokinetic parameters for free SN-38.

| Group | $C_{max}$ (ng/mL) | $T_{max}$ (h) | $AUC_{0-\infty}$ (ng·hr/mL) | $t_{1/2}$ (h) | Free SN-38 at 120 hours (ng/mL) |
| --- | --- | --- | --- | --- | --- |
| low | 93 | 2.25 | 1,196 | 21 | 0.8 |
| mid | 164 | 1.25 | 3,179 | 26 | 3.7 |
| high | 289 | 0.50 | 6,677 | 26 | 10.8 |
| irinotecan 70 mg/kg | 185 | 0.08 | 381 | 4 | Not detectable after 24 hours |

TABLE

Pharmacokinetic parameters for total SN-38.

| Group | $C_{max}$ (ng/mL) | $T_{max}$ (h) | $AUC_{0-\infty}$ (ng·hr/mL) | $t_{1/2}$ (h) | Total SN-38 at 120 hours (ng/mL) |
| --- | --- | --- | --- | --- | --- |
| low | 32,767 | 0.08 | 352,719 | 15 | 111.5 |
| mid | 150,334 | 0.29 | 1,816,383 | 15 | 498 |
| high | 306,500 | 0.08 | 3,688,375 | 14 | 792.5 |

The invention claimed is:

1. A dendrimer comprising:
   i) a core unit (C), wherein the core unit is:

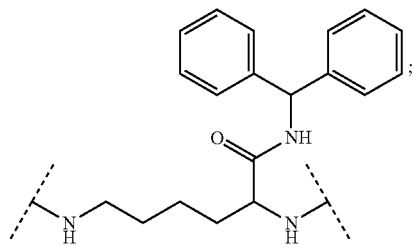

and
   ii) building units (BU), each building unit being a lysine residue or an analogue thereof;
   wherein the core unit is covalently attached to two building units via amide linkages, each amide linkage being formed between a nitrogen atom present in the core unit and the carbon atom of an acyl group present in a building unit;
   the dendrimer being a five generation building unit dendrimer;
   wherein building units of different generations are covalently attached to one another via amide linkages formed between a nitrogen atom present in one building unit and the carbon atom of an acyl group present in another building unit;
   the dendrimer further comprising:
   iii) a plurality of first terminal groups (T1) comprising a residue of a camptothecin active covalently attached to a diacyl linker group of formula

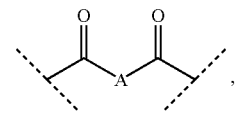

wherein A is a $C_2$-$C_{10}$ alkylene group which is optionally interrupted by O, S, NH, or N(Me), or in which A is a heterocycle selected from the group consisting of tetrahydrofuran, tetrahydrothiophene, pyrrolidine and N-methylpyrrolidine; and
   iv) a plurality of second terminal groups (T2) comprising a PEG or PEOX group;
   wherein at least one half of the outer building units have one nitrogen atom covalently attached to a first terminal group and have one nitrogen atom covalently attached to a second terminal group;
   or a pharmaceutically acceptable salt thereof.

2. The dendrimer of claim 1, wherein the building units are each:

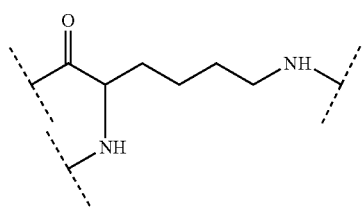

wherein the acyl group of each building unit provides a covalent attachment point for attachment to the core or to a previous generation building unit; and wherein each nitrogen atom provides a covalent attachment point for covalent attachment to a subsequent generation building unit, a first terminal group, or a second terminal group.

3. The dendrimer of claim 1, wherein the diacyl linker is selected from the group consisting of:

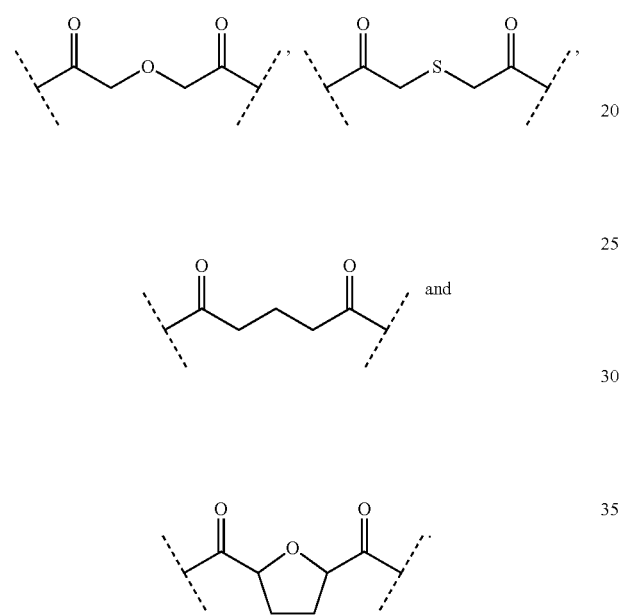

4. The dendrimer of claim 1, wherein the residue of a camptothecin active is a residue of SN-38 which is attached to the diacyl linker through the C-10 or C-20 position.

5. The dendrimer of claim 4, wherein the residue of SN-38 is

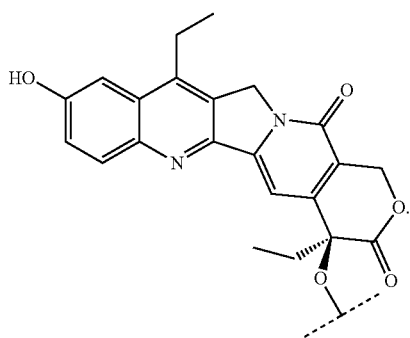

6. The dendrimer of claim 1, wherein each first terminal group (T1) is:

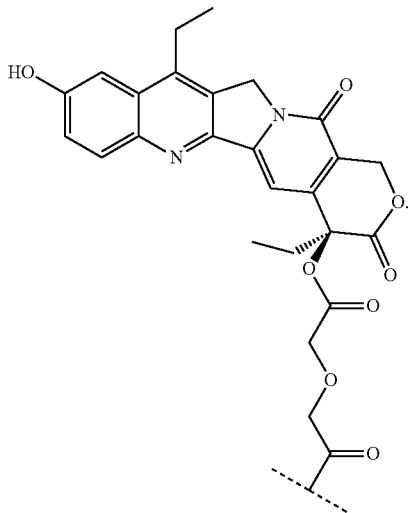

7. The dendrimer of claim 1, wherein the residue of a camptothecin active has the substructure:

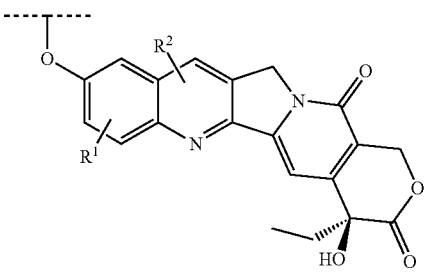

in which
R$^1$ is selected from the group consisting of hydrogen, C$_{1-6}$ alkyl, —OR$^3$, and —C$_{1-6}$ alkyl-N(R$^3$)$_2$;
R$^2$ is selected from the group consisting of hydrogen, C$_{1-6}$ alkyl, —OR$^3$, and —C$_{1-6}$ alkyl-N(R$^3$)$_2$;
each R$^3$ is independently selected from hydrogen and C$_1$-6 alkyl;
wherein the residue of a camptothecin active is covalently attached to the diacyl linker group via the oxygen atom present on the phenyl ring; and wherein the diacyl linker is

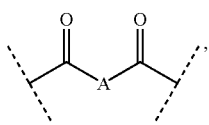

wherein A is a C$_2$-C$_6$ alkylene group.

8. The dendrimer of claim 1, wherein the second terminal groups comprise PEG groups having an average molecular weight in the range of from 1500 to 2500 Daltons.

9. The dendrimer of claim 1, wherein the dendrimer has from 26 to 32 surface units, the surface units comprising an outer building unit attached to a first terminal group and attached to a second terminal group.

10. The dendrimer of claim 1, wherein the % release of camptothecin active from the dendrimer in PBS at pH 7.4 and at 37° C. following incubation for 6 hours is in the range of from 10 to 50%.

11. The dendrimer of claim 1, in combination with a further active.

12. The dendrimer of claim 11, wherein the further active is an immunotherapy agent, a PD-1 or PD-L1 inhibitor, a PARP inhibitor, or an EGFR inhibitor.

13. The dendrimer of claim 12, wherein the further active is selected from the group consisting of pembrolizumab, nivolumab, atezolizumab, avelumab, durvalumab, and cemiplimab.

14. A composition comprising a plurality of dendrimers or pharmaceutically acceptable salts thereof,
   wherein the dendrimers are as defined in claim 1,
   the mean number of first terminal groups per dendrimer in the composition is in the range of from 24 to 32, and
   the mean number of second terminal groups per dendrimer in the composition is in the range of from 24 to 32.

15. The composition of claim 14, wherein the composition is a pharmaceutical composition, and wherein the composition comprises a pharmaceutically acceptable excipient.

16. A method of treating cancer comprising administering to a subject in need thereof a therapeutically effective amount of the dendrimer of claim 1 or the pharmaceutical composition of claim 15.

17. The method of claim 16, wherein the cancer is selected from the group consisting of colorectal cancer, pancreatic cancer, breast cancer, ovarian cancer, prostate cancer, lung cancer and cervical cancer.

18. The method of claim 16, wherein the therapeutically effective amount of the dendrimer is in the range of from 2 to 50 mg/m² body surface area.

19. The method of claim 16, wherein administration of the dendrimer provides enhanced clinical efficacy in comparison to administration of an equivalent dose of free camptothecin active.

20. A process for producing the dendrimer of claim 1, comprising:
a)
   a1) reacting a camptothecin active intermediate which is:

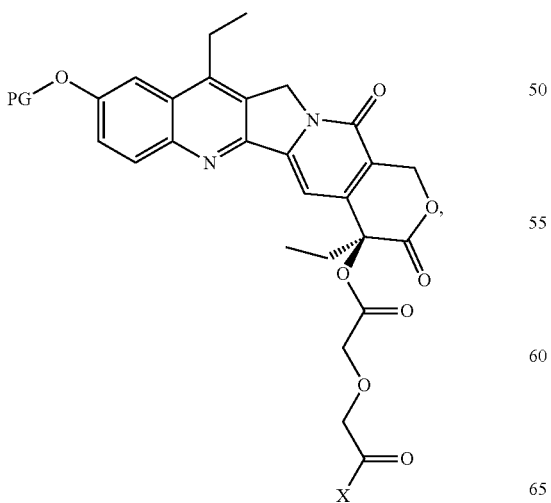

wherein X is —OH or a leaving group, or wherein X together with the C (O) group to which it is attached forms a carboxylate salt; and wherein PG is a protecting group;

with a dendrimeric intermediate which comprises:

i) a core unit (C), wherein the core unit is:

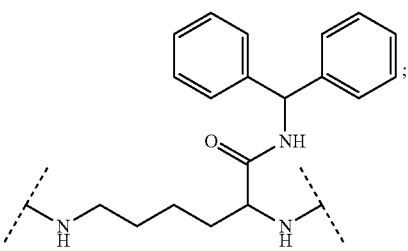

and ii) building units (BU), each building unit being a lysine residue or an analogue thereof;

wherein the core unit is covalently attached to two building units via amide linkages, each amide linkage being formed between a nitrogen atom present in the core unit and the carbon atom of an acyl group present in a building unit;

the dendrimer being a five generation building unit dendrimer;

wherein building units of different generations are covalently attached to one another via amide linkages formed between a nitrogen atom present in one building unit and the carbon atom of an acyl group present in another building unit;

the dendrimer further comprising:

a plurality of second terminal groups (T2) each comprising a PEG or PEOX group;

wherein at least one half of the outer building units have one nitrogen atom covalently attached to a second terminal group, and have one unsubstituted nitrogen atom available for reaction with the first intermediate;

or a salt thereof;

under amide coupling conditions; and a2) subjecting the product of step a1) to deprotection conditions to remove protecting group PG, or b)
b1) reacting a surface unit intermediate which is:

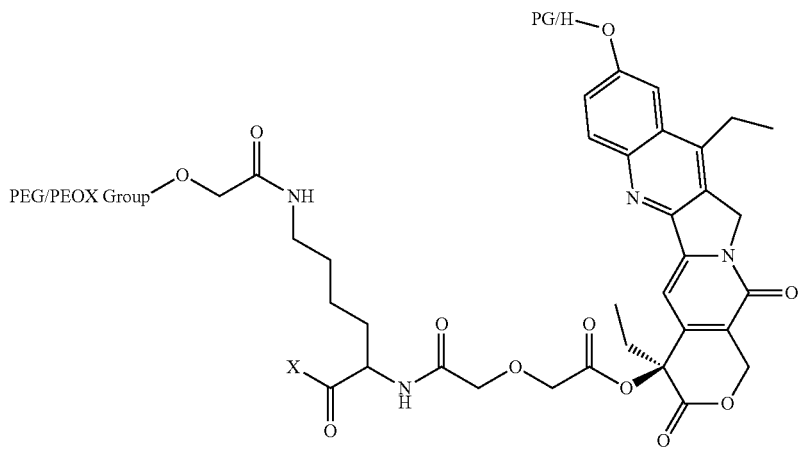

wherein PEG Group is a PEG-containing group, PEOX is a PEOX-containing group;

X is —OH or a leaving group, or wherein X together with the C (O) group to which it is attached forms a carboxylate salt; and wherein PG is a protecting group;

with a dendrimeric intermediate comprising:
i) a core unit (C), wherein the core unit is:

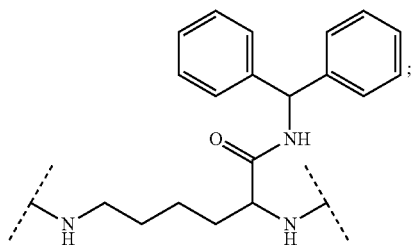

and
ii) building units (BU), each building unit being a lysine residue or an analogue thereof;
wherein the core unit is covalently attached to two building units via amide linkages, each amide linkage being formed between a nitrogen atom present in the core unit and the carbon atom of an acyl group present in a building unit;
the dendrimeric intermediate being a four generation building unit dendrimeric intermediate;
wherein building units of different generations are covalently attached to one another via amide linkages formed between a nitrogen atom present in one building unit and the carbon atom of an acyl group present in another building unit;
and wherein nitrogen atoms present in the outer building units of the dendrimeric intermediate are unsubstituted;
or a salt thereof;
under amide coupling conditions; and
b2) where the surface unit intermediate comprises a protecting group PG, subjecting the product of step b1) to deprotection conditions to remove PG.

21. The dendrimer of claim 1, wherein the diacyl linker is:

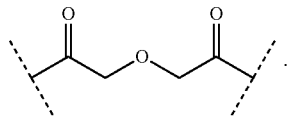

22. The dendrimer of claim 1, wherein the dendrimer is:

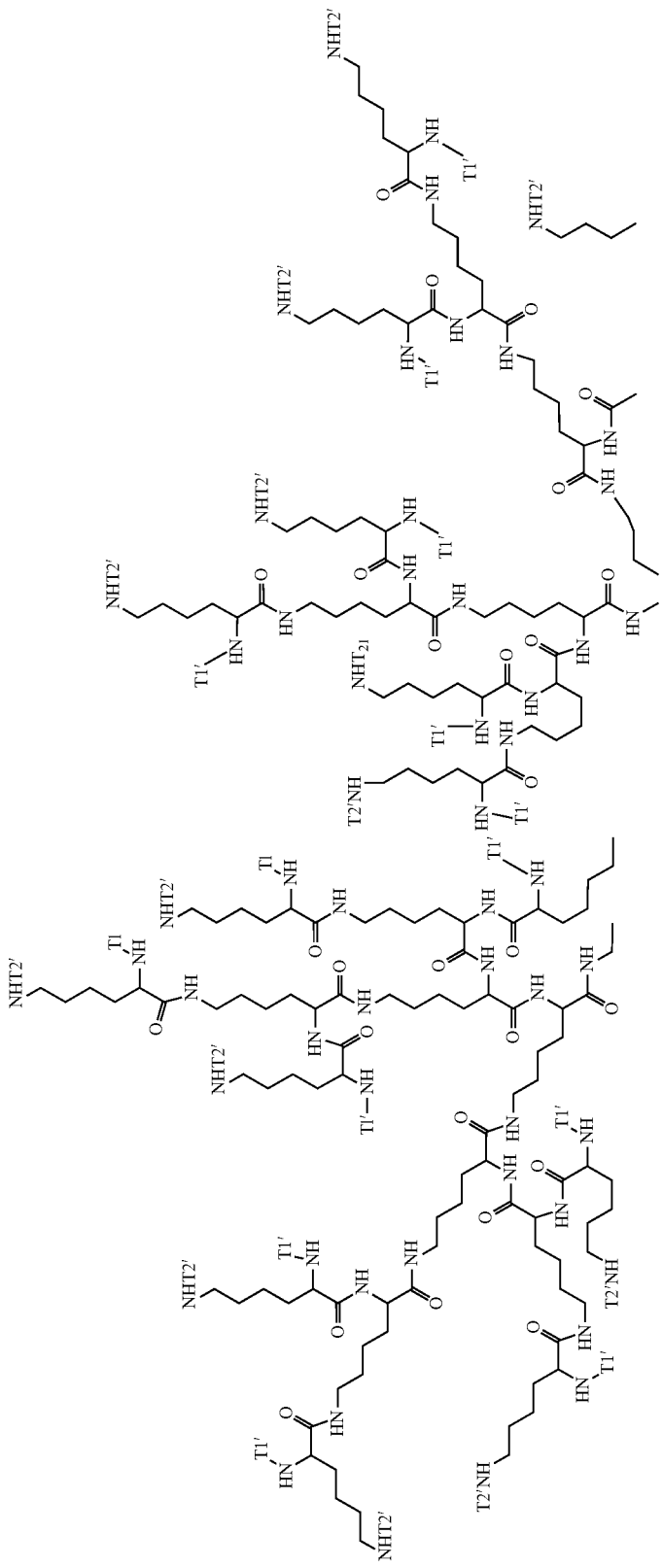

-continued
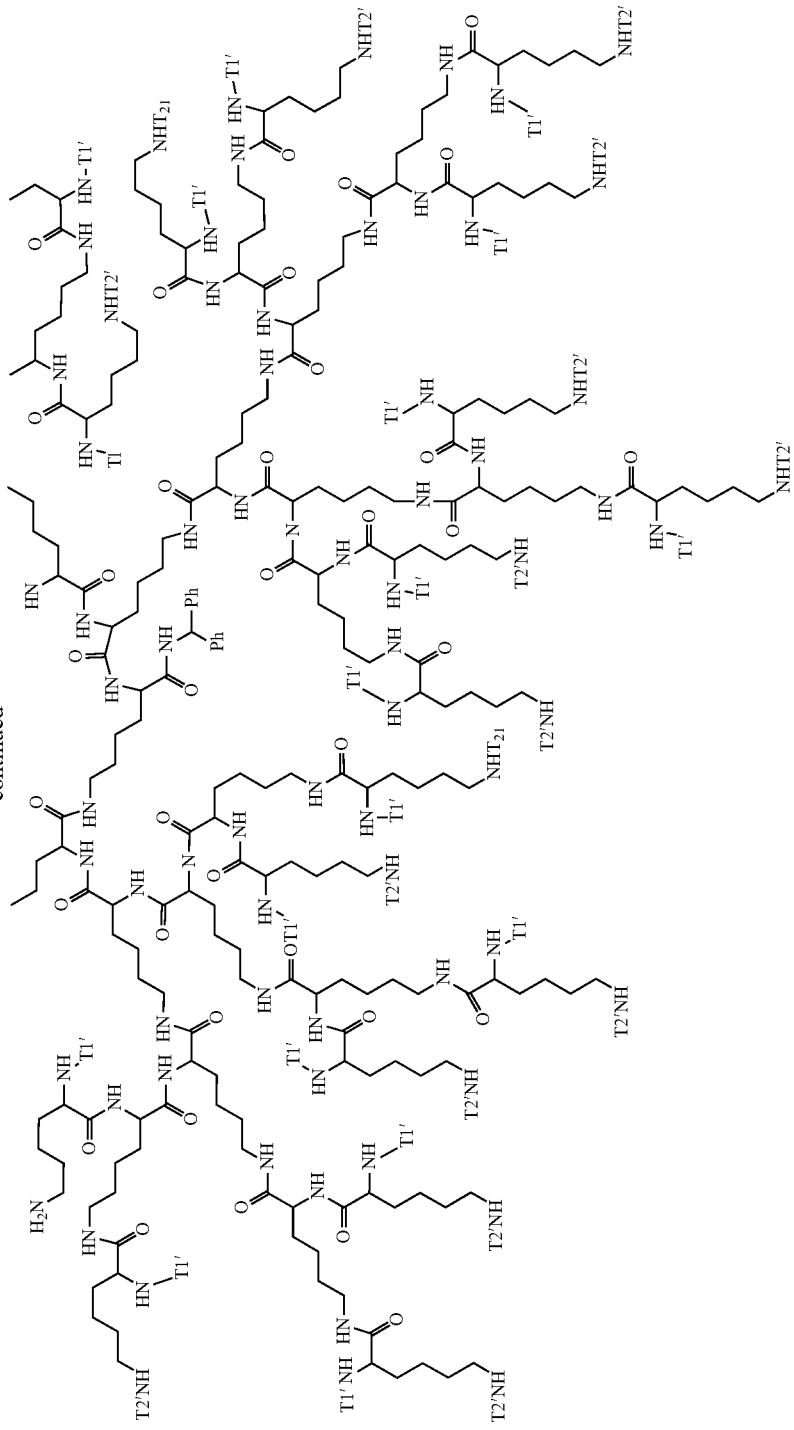

in which T1' represents a first terminal group which is:
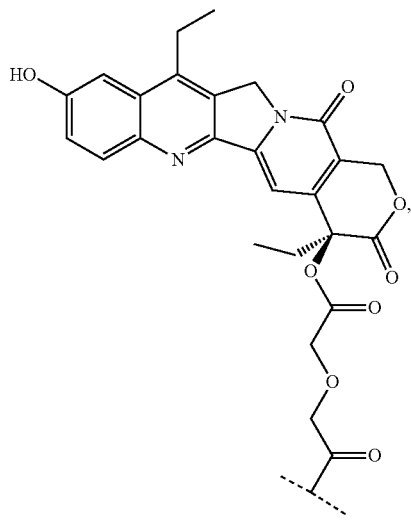
or T1' represents H, wherein less than 5 of T1' are H; and
T2' represents a second terminal group which is:
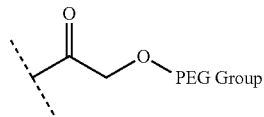
wherein the PEG groups are methoxy-terminated PEG groups having an average molecular weight in the range of from 2000 to 2200 Daltons, or T2' represents H, and wherein less than 5 of T2' are H.
* * * * *